(12) United States Patent
Yoneyama et al.

(10) Patent No.: US 12,081,994 B2
(45) Date of Patent: Sep. 3, 2024

(54) COMMUNICATION DEVICE, COMMUNICATION METHOD, COMMUNICATION PROGRAM, TRANSMISSION DEVICE, AND COMMUNICATION SYSTEM

(71) Applicant: Sony Semiconductor Solutions Corporation, Kanagawa (JP)

(72) Inventors: Yusuke Yoneyama, Kanagawa (JP); Toshihiro Fujiki, Kanagawa (JP); Katsuyuki Tanaka, Kanagawa (JP); Seiji Kobayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 422 days.

(21) Appl. No.: 17/432,493

(22) PCT Filed: Feb. 3, 2020

(86) PCT No.: PCT/JP2020/003855
§ 371 (c)(1),
(2) Date: Aug. 20, 2021

(87) PCT Pub. No.: WO2020/175018
PCT Pub. Date: Sep. 3, 2020

(65) Prior Publication Data
US 2022/0150714 A1 May 12, 2022

(30) Foreign Application Priority Data
Feb. 28, 2019 (JP) .................... 2019-036909

(51) Int. Cl.
H04W 16/14 (2009.01)
H04L 5/00 (2006.01)
(Continued)

(52) U.S. Cl.
CPC ............. *H04W 16/14* (2013.01); *H04L 5/003* (2013.01); *H04W 56/0015* (2013.01); *H04W 72/0453* (2013.01)

(58) Field of Classification Search
CPC ............. H04W 16/14; H04W 56/0015; H04W 72/0453; H04L 5/003
See application file for complete search history.

(56) References Cited

U.S. PATENT DOCUMENTS

2014/0274103 A1* 9/2014 Steer ................. H04W 76/36
455/454
2016/0278033 A1* 9/2016 Wu ................. H04W 56/0015
(Continued)

FOREIGN PATENT DOCUMENTS

JP  2017-522757 A  8/2017
JP  2017-522758 A  8/2017
(Continued)

OTHER PUBLICATIONS

International Search Report and Written Opinion dated Feb. 25, 2020, received for PCT Application PCT/JP2020/003855, Filed on Feb. 3, 2020, 9 pages including English Translation.

*Primary Examiner* — Nizam U Ahmed
(74) *Attorney, Agent, or Firm* — XSENSUS LLP

(57) ABSTRACT

A communication device includes an acquisition unit configured to acquire first information for communication in which a first frequency band has been used, the first frequency band being an unlicensed band in which a plurality of communication schemes can be mixed, from a second frequency band different from the first frequency band, and a communication control unit configured to control communication in a predetermined communication scheme in which the first frequency band has been used, on the basis of the first information.

15 Claims, 32 Drawing Sheets

(51) Int. Cl.
*H04W 56/00* (2009.01)
*H04W 72/0453* (2023.01)

(56) References Cited

U.S. PATENT DOCUMENTS

2017/0086214 A1* 3/2017 Kalhan ................ H04W 16/14
2018/0288765 A1* 10/2018 Chrisikos ............. H04W 4/90
2020/0305123 A1* 9/2020 Takeda ................. H04W 8/24

FOREIGN PATENT DOCUMENTS

| JP | 6259550 B1 | 1/2018 | |
| JP | 2018-532330 A | 11/2018 | |
| JP | 2020107107 A * | 7/2020 | ............ H04W 4/021 |

* cited by examiner

COMMUNICATION DEVICE, COMMUNICATION METHOD, COMMUNICATION PROGRAM, TRANSMISSION DEVICE, AND COMMUNICATION SYSTEM

CROSS-REFERENCE TO RELATED APPLICATIONS

The present application is based on PCT filing PCT/JP2020/003855, filed Feb. 3, 2020, which claims priority to JP 2019-036909 filed Feb. 28, 2019, the entire contents of each are incorporated herein by reference.

TECHNICAL FIELD

The present disclosure relates to a communication device, a communication method, a communication program, a transmission device, and a communication system.

BACKGROUND ART

Various wireless communication technologies are being developed to make effective use of wireless resources. For example, in recent years, development of a low power wide area (LPWA) communication technology has become active.

CITATION LIST

Patent Literature

[PTL 1] JP 6259550 B

SUMMARY

Technical Problem

Effective use of radio wave resources cannot always be realized simply by using existing technologies. For example, in an unlicensed band, a plurality of communication standards are likely to coexist, but when a plurality of communication devices with different communication standards freely perform communication, there is concern that a communication error due to communication collision or the like, deterioration of communication quality, or the like may frequently occur, and as a result, effective use of radio wave resources cannot be realized.

Therefore, the present disclosure proposes a communication device, a communication method, a communication program, a transmission device, and a communication system capable of realizing effective use of radio wave resources.

Solution to Problem

In order to solve the above problem, a communication device of one form according to the present disclosure includes an acquisition unit configured to acquire first information for communication in which a first frequency band has been used, the first frequency band being an unlicensed band in which a plurality of communication schemes can be mixed, from a second frequency band different from the first frequency band; and a communication control unit configured to control communication in a predetermined communication scheme in which the first frequency band has been used, on the basis of the first information.

DESCRIPTION OF EMBODIMENTS

Figure 1:
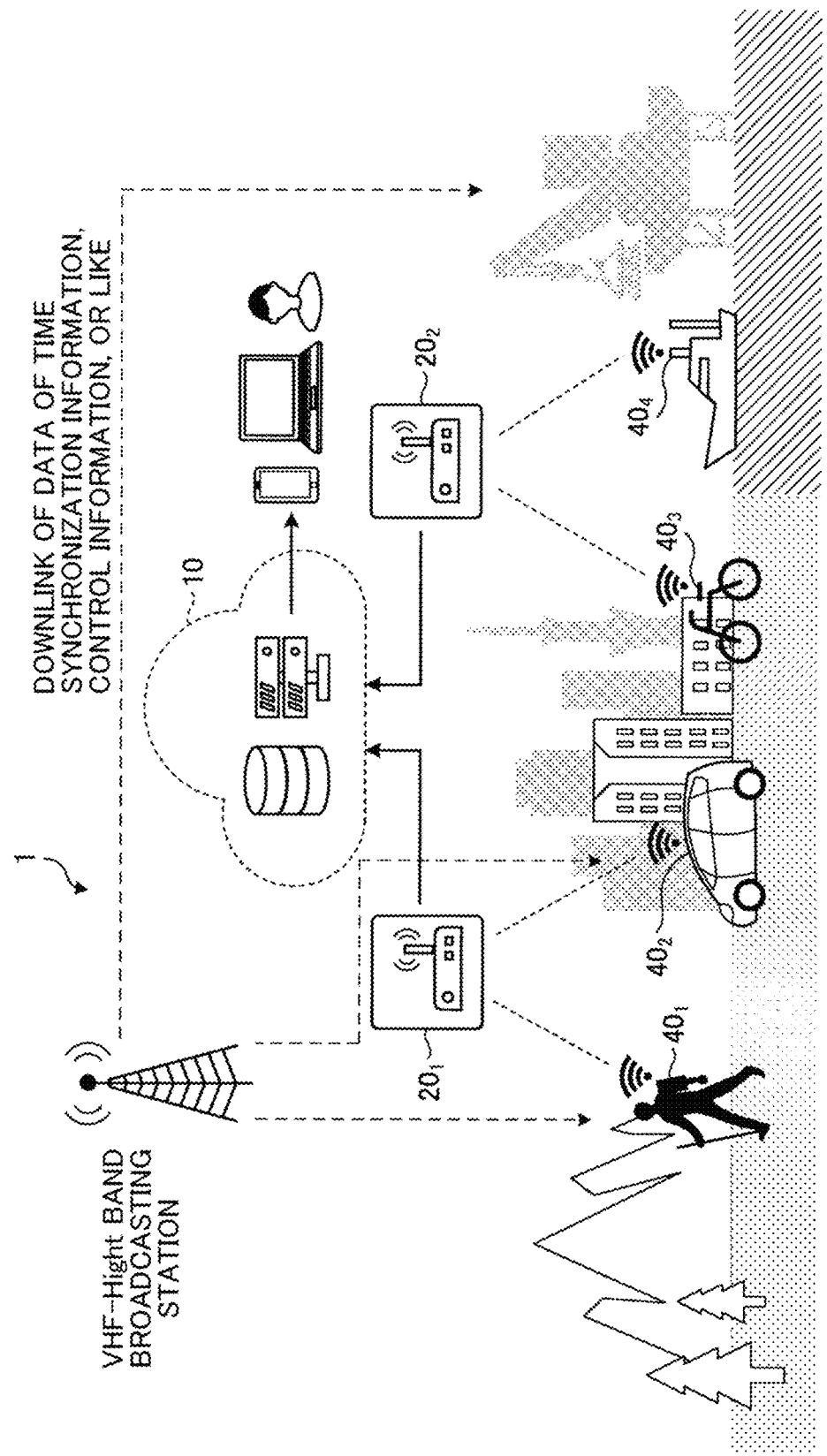
FIG. 1 is a diagram illustrating an overview of a communication system of embodiment 1.

Hereinafter, embodiments of the present disclosure will be described in detail with reference to the drawings. In each of the following embodiments, the same parts are designated by the same reference signs and duplicate description thereof will be omitted.

Further, in the present specification and drawings, a plurality of components having substantially the same functional configuration may be distinguished by different numbers or letters being added after the same reference signs. For example, a plurality of configurations having substantially the same functional configuration are distinguished as necessary, such as in terminal devices $40_1$, $40_2$, and $40_3$. Further, a plurality of configurations having substantially the same functional configuration are distinguished as necessary, such as in broadcasting station devices 30A, 30B, and 30C.

However, when it is not necessary to particularly distinguish each of a plurality of components having substantially the same functional configuration, the components are simply denoted with the same signs. For example, when it is not necessary to distinguish the terminal devices $40_1$, $40_2$, and $40_3$, the terminal devices are simply referred to as a terminal device 40. Further, when it is not necessary to distinguish the broadcasting station devices 30A, 30B, and 30C, the broadcasting station devices are simply referred to as a broadcasting station device 30.

Further, the present disclosure will be described according to an order of items shown below.

1. Introduction
1-1. Related art and problems
1-2. Overview of embodiment 1
1-3. Terminology used in embodiments
2. Configuration of communication system of embodiment 1
2-1. Overall configuration of communication system
2-2. Configuration of management device
2-3. Configuration of base station device
2-4. Configuration of broadcasting station device
2-5. Configuration of terminal device
2-6. Allocation of frequency band
3. Operation of communication system
3-1. Overview of operation
3-2. Broadcasting station main channel (virtual satellite)
3-3. Processing flow of broadcasting station device
3-4. Processing flow of terminal device
4. Conclusion of embodiment 1
5. Embodiment 2
5-1. Technical background and goals
5-2. Transmission of time information (related art and goals)
5-3. System configuration
5-4. Configuration of control information transmitter
5-5. Configuration of LPWA transmission terminal
5-6. Configuration of LPWA receiver
6. Embodiment 3
6-1. Problems and solutions
6-2. System configuration
6-3. Configuration of control information transmitter
7. Embodiment 4
7-1. Overview of embodiment 4
7-2. System configuration
7-3. Spectrum of transmission waves
7-4. Configuration of control information transmitter
7-5. Configuration of LPWA transmission terminal
8. Modification example
8-1. Modification example of embodiment
8-2. Application example of embodiment
8-3. Other communication systems
8-4. Other modification examples
9. Conclusion

1. INTRODUCTION 1-1. Related Art and Problems

In order to make effective use of a frequency band that is used in radio communication, standards for realizing fair communication such as transmission restrictions according to a used center frequency, an antenna power to be transmitted, a transmission frequency, carrier sense, or the like have been defined in the Radio Act and standards such as those of the Association of Radio Industries and Businesses (ARIB). For example, it is assumed that a radio signal is transmitted and received in a 920 MHz band. In Japan, the 920 MHz band is a frequency band that was opened in July 2011 by the Ministry of Internal Affairs and Communications, and anyone can use this frequency band without a license. However, a maximum continuous transmission time is limited to 4 seconds according to the regulations of ARIB STD T-108 or the like. Such a restriction is not exceptional in communications that comply with standards outside of Japan. When a predetermined wireless communication technology is used, it is necessary for the technology to comply with the standards of the country. The above standards basically focus on a frequency, and there is room for optimization in a time direction.

The number of Internet of things (IoT) devices is expected to exceed 40 billion in 2020, and some of the devices are terminals that perform wireless communication. Since specific low power radio (ARIB STD-T108) or an Industry-Science-Medical (ISM) band used for IoT is a frequency band that requires no license, respective business operators plan, design, and use their own terminals therefor, and there is no mechanism for integrated communication control of the terminals. In the specific low power radio, there is a band in which transmission can be performed at 250 mW, but the specific low power radio is not suitable for the purpose of integrated communication control since a power is lower than that for broadcasting (several to tens of kW) and carrier sense is required.

Therefore, transmission terminals based on different standards do not cooperate with each other to perform transmission. When each terminal randomly performs transmission, congestion occurs in each communication, leading to a communication error. In particular, when a central channel used for transmission is defined as in the specific low power radio, transmission is not possible due to carrier sense or transmission waves of other standards in a receiver becoming interfering waves, leading to deterioration of reception performance. Further, in wireless communication with a long communication distance such as low power wide area (LPWA) communication, this tendency becomes significant.

1-2. Overview of Embodiment 1

Therefore, the following means (1) to (5) are provided in embodiment 1 in order to solve the above problems. FIG. 1 is a diagram illustrating an overview of a communication system 1 of embodiment 1. Hereinafter, an overview of embodiment 1 will be described with reference to FIG. 1.
(1) Use of Timing Information Transmitted from Broadcasting Station The terminal device 40 (for example, a transmission terminal) extracts and uses timing information from broadcast waves transmitted from a broadcasting station device 30. Accordingly, a plurality of terminal devices 40 (the terminal devices $40_1$ to $40_4$ in the example of FIG. 1) that use different communication schemes can cooperate with each other, and effective utilization of wireless resources is realized.

In this case, the terminal device 40 controls communication in which a predetermined unlicensed band has been used, on the basis of information (a signal) acquired from a frequency band different from the predetermined unlicensed band. For example, it is assumed that the predetermined unlicensed band is a frequency band that is used in specific low power radio (for example, a 920 MHz band defined by ARIB T108). In this case, the terminal device 40 controls communication in which the specific low power radio (for example, 920 MHz band) has been used, using a signal in a band (for example, VHF-High band: 200 MHz band) different from a band prepared only for the specific low power radio.

Usually, for this purpose (for example, control of a terminal that communicates using a predetermined band), the same band (for example, a 920 MHz band) is divided in advance and used as a dedicated band (for example, a part of a 920 MHz band) for transmission of the timing information or the like. However, the terminal device 40 of the present embodiment controls a predetermined band (for example, 920 MHz band) using a band (for example, 200 MHz band) other than a predetermined band (for example, 920 MHz band) prepared only for the specific low power radio or the like.
(2) Division of Frequency Band for Transmission of Timing Information, or the Like The broadcasting station device 30 divides an allocated frequency band into one main channel and a plurality of sub-channels. The broadcasting station device 30 transmits the timing information using the main channel, and transmits control information for controlling the communication of the terminal device 40 on the sub-channel.

In this case, the broadcasting station device 30 uses wideband radio for the main channel. Accordingly, the broadcasting station device 30 can broadcast accurate timing information.

Further, the broadcasting station device 30 uses a narrow band radio for a sub-channel. The broadcasting station device 30 multicasts the control information using the sub-channel. The control information may differ among a plurality of wireless schemes.

The broadcasting station device 30 may change diffusion codes or code multiplexing so that broadcast waves of other broadcasting stations and broadcast waves of its own station can be separated and demodulated even at the same frequency.
(3) Allocation of Narrow Band Since narrow band communication is used for the sub-channel, a total number of channels increases. Therefore, the broadcasting station device 30 allocates a narrow band for each predetermined group (for example, for each communication scheme, for each service providing entity, for each communication management entity, for each model, and for each region). This makes it for each group to provide its own function using the sub-channel allocated to the group.
(4) Control of Terminal Device Using Broadcast Waves The broadcasting station device 30 transmits control information to the terminal device 40 (for example, an IoT terminal) using broadcast waves. This makes it possible to control all terminal devices 40 (for example, IoT terminals) that use the broadcast waves. For example, when communication congestion is predicted, such as in the event of a disaster, it is possible to cause radio wave transmission of the terminal device 40 to be stopped.
(5) Use of Virtual Satellites Information (signal) transmitted by broadcast waves (for example, the main channel) is assumed to be obtained through down-conversion of satellite waves (for example, a GPS wave) transmitted by a virtual satellite (for example, a virtual global positioning system (GPS) satellite). Here, the virtual satellite is a completely geostationary satellite in an ideal state, and is a virtual satellite that does not actually exist. Unlike an actual navigation satellite (for example, a GPS satellite), the virtual satellite does not fluctuate in orbit, and thus, ephemeris information used for calculation of its own orbit information is fixed and invariant.

The broadcast waves are assumed to be waves in which signals of a plurality of virtual satellites have been superposed. A signal of the virtual satellite may be generated by the broadcasting station device 30. The broadcasting station device 30 may change a diffusion code or the like by which each signal is multiplied so that each signal can be easily separated on the receiving side. The broadcasting station device 30 changes the diffusion code or the like carried on broadcast waves so that the receiving side can distinguish a plurality of the broadcast waves transmitted from different broadcasting station devices 30. This makes it possible for each broadcast waves to be easily separated on the receiving side (for example, the terminal device 40).

1-3. Terminology Used in Embodiments

Figure 2:
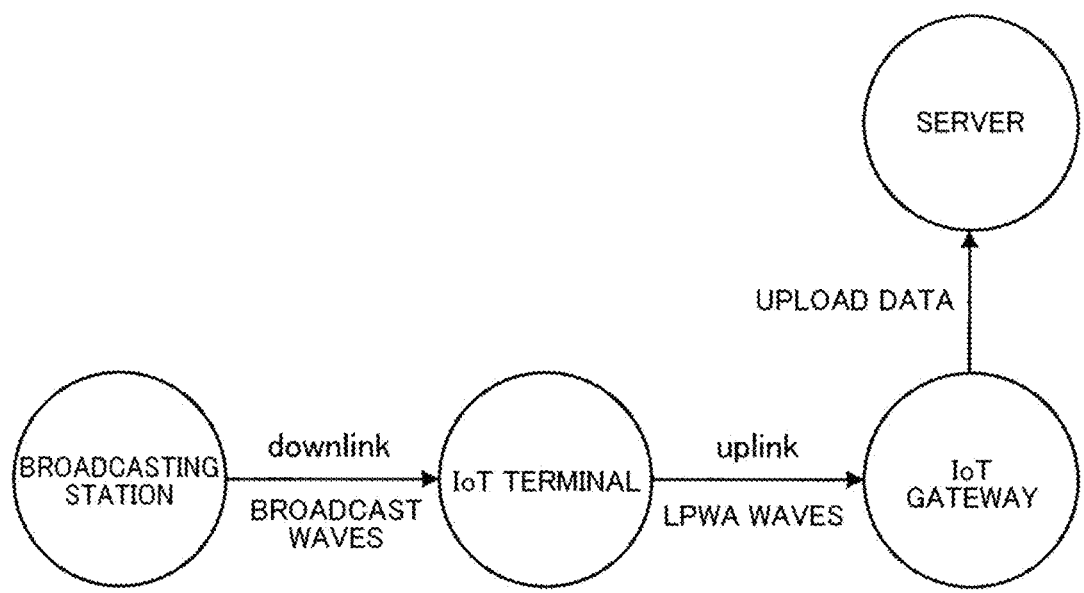
FIG. 2 is a diagram illustrating terminology that is used in the embodiment.

The overview of embodiment 1 has been described above, and the terminology used in the embodiment will be briefly described hereinafter. FIG. 2 is a diagram illustrating terminology that is used in the embodiment. Description of the terminology shown below are for the purpose of assisting the understanding of the embodiments, and meanings of the terminology are not limited to the meanings shown below.
(LPWA Radio)

LPWA radio is wireless communication that enables wide-range communication with low power. For example, the LPWA radio is specific low power radio or IoT radio communication using an Industry-Science-Medical (ISM) band. In the following description, communication using the LPWA radio communication may be referred to as "LPWA communication".
(Broadcasting Station)

A broadcasting station is a device (a broadcasting station as equipment) that emits radio waves that can be received over a wide area. In the following description, the "broadcasting station" may be referred to as a "broadcasting station device" or a "transmission device".

(IoT Terminal)

An IoT terminal (endpoint) is a device that receives broadcast waves and performs transmission of LPWA radio communication in one terminal. The IoT terminal is a type of transmission device, terminal device, and/or communication device.

(IoT Gateway)

An IoT gateway (receiver) is a device that receives LPWA radio. The IoT gateway is a type of gateway, reception device, base station device, relay device, and/or communication device.

(Broadcast)

Broadcast means sending the same information to an unspecified number of communication devices at the same time. For example, broadcast means emitting broadcast waves toward an unspecified number of communication devices (for example, an IoT terminal).

(Multicast)

Multicast means sending the same information to a specific plurality of communication devices or a specific communication device group at the same time. For example, multicast means emitting broadcast waves to a specific plurality of communication devices (for example, a specific plurality of IoT terminals) or a specific communication device group (for example, a specific plurality of IoT terminal groups).

(Upload)

Upload means moving data (including copying as well as moving) to an upper device (for example, a server device) on a network. For example, upload refers to data movement from a gateway (for example, an IoT gateway) to a server that performs management of transmission data.

(Uplink)

Uplink refers to an upward direction among data flow directions. For example, the uplink refers to radio wave propagation direction from a terminal device (for example, a IoT terminal) to a gateway (for example, an IoT gateway).

(Downlink)

Downlink refers to a downward direction among the data flow directions. For example, uplink refers to a radio wave propagation direction from a broadcasting station to a terminal device (for example, an IoT terminal).

(Timing Information)

The timing information refers to information from which a periodic timing can be extracted through signal processing, such as a pulse per second (PPS) signal of a GPS. The timing information is not limited to a PPS signal of a GPS, and may be a signal for time synchronization or timing synchronization (hereinafter referred to as a timing signal), which is transmitted from another global navigation satellite system (GNSS) such as GLONASS, Galileo, and Quasi-Zenith Satellite (QZSS). The concept of "timing signal" also includes a PPS signal of the GPS. Further, the timing information may be information (hereinafter referred to as time information) from which calendar and time data such as a year, month, date, hour, minute, and second can be extracted.

(Control Information)

Control information refers to information for instructing the terminal device to perform control regarding communication. For example, the control information is information for instructing a terminal device (for example, an IoT terminal) to perform control such as stopping and restarting of transmission, and changing an operation mode (for example, control of a wireless communication unit included in the terminal device).

2. CONFIGURATION OF COMMUNICATION SYSTEM OF EMBODIMENT 1

Hereinafter, the terminology used in the present embodiment have been briefly described above, and the communication system 1 of embodiment 1 will be described in detail hereinafter. The communication system 1 is a system that provides various wireless services to the terminal device 40 that performs communication using a predetermined unlicensed band in which a plurality of communication schemes can be mixed. The predetermined unlicensed band is, for example, a 920 MHz band.

The communication scheme used by the terminal device 40 is, for example, a communication scheme using LPWA radio. Here, the "communication scheme using LPWA radio" is, for example, a communication scheme compliant with a LPWA standard. Examples of LPWA standards may include ELTRES, ZETA, SIGFOX, LoRaWAN, and NB-IoT. Of course, the LPWA standard is not limited thereto and other LPWA standards may be used. Further, the communication scheme used by the terminal device 40 is not limited to the communication scheme using LPWA radio.

Further, a communication standard (for example, a LPWA standard) used in the communication system 1 is not limited to one. One or a plurality of terminal devices 40 among the plurality of terminal devices 40 included in the communication system 1 may use a communication standard different from that of the other terminal devices 40 included in the communication system 1. For example, the communication standard used in the communication system 1 may be one or a plurality LPWA standards among a plurality of LPWA standards. Further, the communication standards used in the communication system 1 may be an LPWA standard and another communication standard different from this LPWA standard.

Hereinafter, a configuration of the communication system 1 will be specifically described.

2-1. Overall Configuration of Communication System

Figure 3:
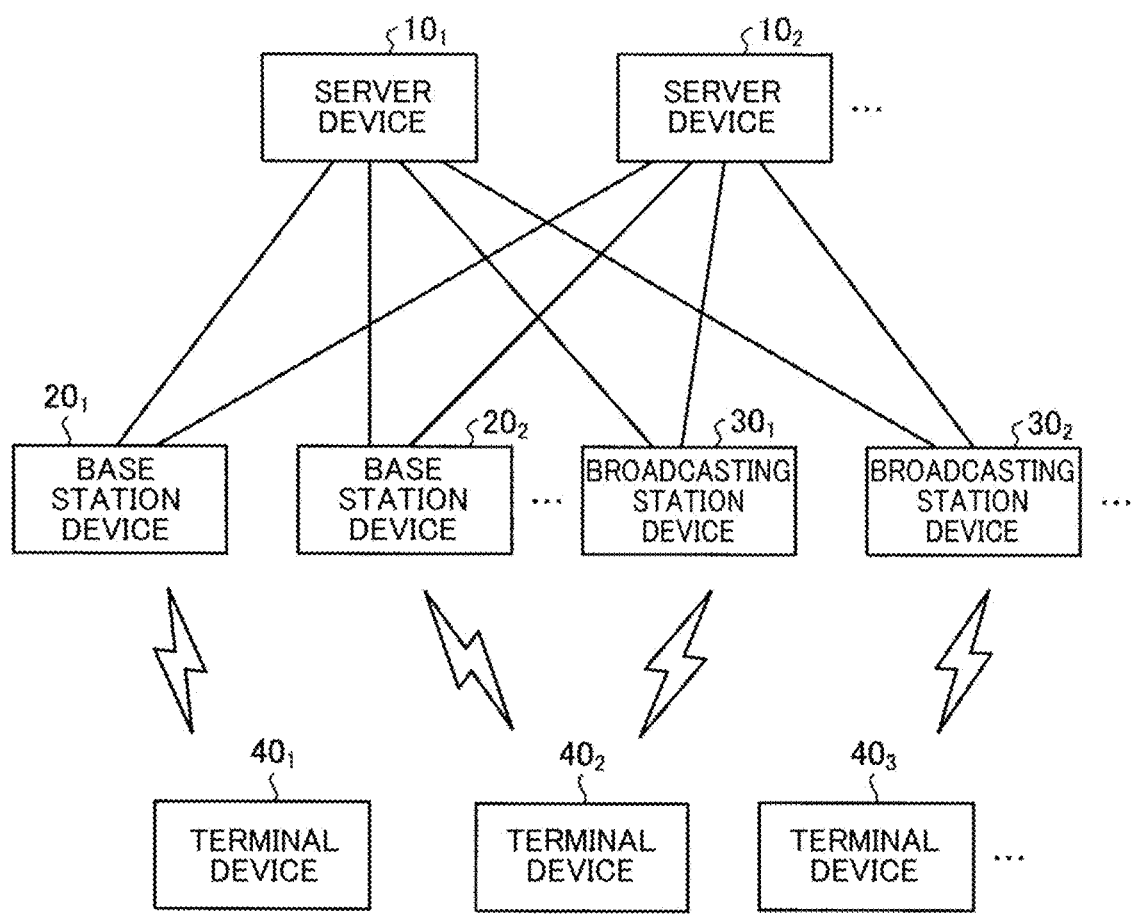
FIG. 3 is a diagram illustrating an example of a configuration of the communication system according to embodiment 1.

FIG. 3 is a diagram illustrating an example of a configuration of the communication system 1 according to embodiment 1. The communication system 1 includes a server device 10, a base station device 20, the broadcasting station device 30, and the terminal device 40, as illustrated in FIG. 3.

The communication system 1 may include a plurality of server devices 10, a plurality of base station devices 20, a plurality of broadcasting station devices 30, and a plurality of terminal devices 40, respectively. In the example of FIG. 3, the communication system 1 includes server devices $10_1$, $10_2$, or the like as the server devices 10. Further, the communication system 1 includes base station devices $20_1$, $20_2$, and the like as the base station devices 20, and broadcast station devices $30_1$, $30_2$, and the like as the broadcasting station devices 30. Further, the communication system 1 includes terminal devices $40_1$, $40_2$, $40_3$, and the like as the terminal devices 40.

The device in FIG. 3 may be considered as a device in a logical sense. That is, a part of the device illustrated in FIG. 3 may be realized by a virtual machine (VM), a container, a docker, or the like, and these may be implemented on physically the same hardware.

In the embodiment, a concept of a communication device includes not only a portable mobile device (terminal device) such as a mobile terminal, but also a device installed on a structure or a moving body. The structure or the moving body itself may be regarded as the communication device. Further, a concept of the communication device includes not only a terminal device but also a base station device and a relay device. The communication device is a type of processing device and information processing device. Further, the communication device can also be termed a transmission device or a reception device.

[Server Device]

The server device 10 is an information processing device connected to the base station device 20 and the broadcasting station device 30 via a network. For example, the server device 10 is a host computer for a server that processes a request from a client computer (for example, the terminal device 40). The server device 10 may be a PC server, may be a midrange server, or may be a mainframe server. The server device 10 is a type of communication device. A connection between the server device 10 and another communication device (for example, the base station device 20 or the broadcasting station device 30) may be a wired connection or may be a wireless connection. The server device 10 can be also be termed a cloud server device, a local server device, a management device, a processing device, and the like.

The server device 10 can be used, operated, and/or managed by various entities. For example, a mobile network operator (MNO), a mobile virtual network operator (MVNO), a mobile virtual communication enabler (MVNE), a neutral host network (NHN) operator, an enterprise, an educational institution (school corporation, local government education committee, or the like), a real estate (buildings, condominiums, or the like) manager, an individual, or the like can be taken as an entity.

Of course, an entity for use, operation, and/or management of the server device 10 is not limited thereto. The server device 10 may be installed and/or operated by one business operator, or may be installed and/or operated by one individual. Of course, the installation and operation entity of the server device 10 is not limited thereto. For example, the server device 10 may be jointly installed and operated by a plurality of business operators or a plurality of individuals. Further, the server device 10 may be shared equipment that is used by a plurality of business operators or a plurality of individuals. In this case, the installation and/or operation of the equipment may be performed by a third party different from the user.

The server device 10 provides a predetermined communication service to the terminal device 40 via the base station device 20. For example, the server device 10 provides an execution service for information processing (hereinafter referred to as application processing) required by the application program to the terminal device 40 in which a predetermined application program has been installed, via wireless communication.

Here, the application processing that is performed by the server device 10 is information processing at an application layer level that is performed on the basis of a request from a program (for example, an application) included in the mobile device, such as recognition processing for an object in an image, or performed in cooperation with the program. For example, the application processing that is performed by the server device 10 may be edge processing in edge computing. The application processing differs from processing at a physical layer, data link layer, network layer, transport layer, session layer, and presentation layer level in an OSI reference model. However, when processing at an application layer level such as image recognition processing is included, the application processing may subsidiarily include processing at a physical layer to presentation layer level.

In the following description, information processing at an application layer level performed by the server device 10 (or the base station device 20) on the basis of the request from the program included in the terminal device 40 or information processing at an application layer level performed by a device on the network in cooperation with the program included in the terminal device 40 may be referred to as "application processing". Further, in the following description, the device on the network providing processing data of the "application processing" to the terminal device 40, or the server device 10 or the base station device 20 providing a processing function (or processing service) of the "application processing" to the terminal device 40 may be referred to as "providing of application processing".

[Base Station Device]

The base station device 20 is a wireless communication device that wirelessly communicates with the terminal device 40. The base station device 20 is a type of communication device. The base station device 20 is, for example, a device corresponding to an IoT gateway. The base station device 20 may be a device corresponding to a wireless base station (a base station, or the like) or a wireless access point. Further, the base station device 20 may be a wireless relay station. The base station device 20 may be an optical projection device called a remote radio head (RRH). Further, the base station device 20 may have a function included in the server device 10 (for example), a function of providing the application processing.

A wireless access technology used for wireless communication with the terminal device 40 by the base station device 20 is, for example, an LPWA communication technology. Of course, the wireless access technology used by the base station device 20 is not limited to an LPWA communication technology, and may be another wireless access technology such as a cellular communication technology or a wireless LAN technology. Further, the wireless communication used by the base station device 20 may be wireless communication using radio waves or wireless communication (optical radio) using infrared rays or visible light.

The base station device 20 can be used, operated, and/or managed by various entities. For example, the entities are assumed to be a mobile network operator (MNO), a mobile virtual network operator (MVNO), a mobile virtual communication enabler (MVNE), a neutral host network (NHN) operator, an enterprise, an educational institution (a school corporation, a local government education committee, or the like), a real estate (buildings, condominiums, or the like) manager, an individual, or the like.

Of course, an entity of use, operation, and/or management of the base station device 20 is not limited thereto. The base station device 20 may be installed and/or operated by one business operator, or may be installed and/or operated by one individual. Of course, an installation and operation entity of the base station device 20 is not limited thereto. For example, the base station device 20 may be jointly installed and operated by a plurality of business operators or a plurality of individuals. Further, the base station device 20 may be shared equipment that is used by a plurality of business operators or a plurality of individuals. In this case, the installation and/or operation of the equipment may be performed by a third party different from the user.

A concept of the base station device (also called a base station) includes not only a donor base station but also a relay base station (referred to as a relay station or a relay station device). Further, a concept of the base station includes not only a structure including a function of a base station but also a device installed in the structure.

The structure is, for example, a building such as a skyscraper, house, steel tower, station facility, airport facility, harbor facility, or stadium. A concept of the structure includes not only buildings but also non-building structures such as tunnels, bridges, dams, walls, and iron pylons, or equipment such as cranes, gates, and windmills. Further, the concept of the structure includes not only structures on land (on ground in a narrow sense) or under the ground, but also structures on water such as piers or mega floats, or structures under water such as marine observation equipment. The base station device can also be termed a processing device or an information processing device.

The base station device 20 may be a donor station or may be a relay station. Further, the base station device 20 may be a fixed station or may be a mobile station. The mobile station is a wireless communication station (or broadcasting station) configured to be movable. In this case, the base station device 20 may be a device installed on a mobile body or may be the mobile body itself. For example, a relay station device having mobility can be regarded as a base station device 20 as a mobile station. Further, devices inherently having movement capability, such as vehicles, drones, and smartphones, which include functions of a base station device (at least some of functions of a base station device) correspond to the base station device 20 serving as a mobile station.

Here, the mobile body may be a mobile terminal such as a smartphone or a mobile phone. Further, the moving body may be a moving body that moves on land (ground in a narrow sense) (for example, a vehicle such as a car, a bicycle, a bus, a truck, a motorcycle, a train, or a linear motor car), or may be a moving body (for example, a subway train) that moves under the ground (inside a tunnel).

Further, the moving body may be a moving body that moves on water (for example, a ship such as a passenger ship, a cargo ship, or a hovercraft), or may be a moving body that moves underwater (for example, a diving vessel such as submergence vehicle, submarine, or unmanned submergence apparatus).

Further, the moving body may be a moving body that moves in the atmosphere (for example, an aircraft such as an airplane, an airship, or a drone), or may be a moving body that moves outside the atmosphere (for example, an artificial satellite, a spacecraft, or a space station, or an artificial celestial body such as a probing device). The moving body that moves outside the atmosphere can also be termed as a space moving body.

Further, the base station device 20 may be a terrestrial station installed on the ground. The terrestrial station is a terrestrial wireless communication station or a terrestrial broadcasting station. For example, the base station device 20 may be a base station device disposed on a structure on the ground, or may be a base station device installed on a mobile body moving on the ground. More specifically, the base station device 20 may be an antenna installed in a structure such as a building, and a signal processing device connected to the antenna. Of course, the base station device 20 may be a structure or a moving body itself. "Ground" is not only on land (ground in a narrow sense) but also on the ground in a broad sense including under the ground, on water, and in water. The base station device 20 is not limited to a ground base station device. The base station device 20 may be a non-ground base station device (non-terrestrial station device) capable of floating in the air or in space. For example, the base station device 20 may be an aircraft station device or a satellite station device.

The aircraft station device is a wireless communication device that can float in the atmosphere, such as an aircraft. The aircraft station device may be a device mounted in an aircraft or the like, or may be an aircraft itself. A concept of the aircraft includes not only heavy aircraft such as airplanes and gliders, but also light aircraft such as balloons and airships. Further, the concept of aircraft includes rotary-wing aircrafts such as helicopters or autogyros, as well as heavy aircrafts and light aircrafts. The aircraft station device (or an aircraft in which the aircraft station device is mounted) may be an unmanned aircraft such as a drone.

The concept of unmanned aircraft also includes an unmanned aircraft system (UAS) and a tethered unmanned aircraft system (tethered UAS). Further, the concept of unmanned aircraft includes a lighter unmanned aircraft system (LTA: Lighter than Air UAS) and a heavy unmanned aircraft system (HTA: Heavier than Air UAS). In addition, the concept of unmanned aircraft also includes high altitude UAS platforms (HAPs).

The satellite station device is a wireless communication device that can float outside the atmosphere. The satellite station device may be a device mounted on a space mobile body such as an artificial satellite, or may be a space mobile body itself. A satellite serving as the satellite station device may be any of a low earth orbiting (LEO) satellite, a medium earth orbiting (MEO) satellite, a geostationary earth orbiting (GEO) satellites, and a highly elliptical orbiting (HEO) satellite. Of course, the satellite station device may be a device mounted in a low earth orbiting satellite, a medium earth orbiting satellite, a geostationary earth orbiting satellite, or a highly elliptical orbiting satellite.

A size of coverage of the base station device 20 may be a large size such as that of a macro cell to a small size such as that of a picocell. Of course, the size of coverage of the base station device 20 may be extremely small, such as a femtocell. Further, the base station device 20 may have a beamforming capability. In this case, in the base station device 20, a cell or a service area may be formed for each beam.

In the example of FIG. 3, the base station device 20 is directly connected to the terminal device 40, but the base station device 20 may be able to indirectly wirelessly communicate with the terminal device 40 via another base station device 20 (relay device).

[Broadcasting Station Device]

The broadcasting station device 30 is a device that broadcasts various types of information (or various signals) to the terminal device 40. For example, the broadcasting station device 30 is a device that broadcasts various types of information (or various signals) using a VHF-High band. The broadcasting station device 30 is a type of transmission device. In the present embodiment, it is assumed that not only "data" transmitted from the broadcasting station device 30 but also a "signal" transmitted from the broadcasting station device 30 is "information". In the present embodiment, the broadcasting station is a broadcasting station as equipment. The broadcasting station also includes a broadcast relay station.

Here, the broadcasting station device 30 may be a transmitter of a predetermined broadcasting standard. For example, the broadcasting station device 30 may be a DVB transmitter or may be an ISDB transmitter. Further, the broadcasting station device 30 may be an ATSC transmitter such as an ATSC 3.0 transmitter. Further, the broadcasting station device 30 is not limited to a transmitter of these standards, and may be a transmitter of other broadcasting standards. Further, the broadcasting station device 30 may be a transmitter according to an independent broadcasting standard specialized for transmission of information (for example, timing information or control information) allowing the terminal device 40 to perform communication using an unlicensed band.

Further, the broadcasting station device 30 may be a wireless station. For example, the broadcasting station device 30 may be a wireless communication station constituting a wireless communication system such as Long Term Evolution (LTE) or New Radio (NR). Further, the broadcasting station device 30 may be a device corresponding to a wireless base station, a radio access point, or a wireless relay station. In this case, the broadcasting station device 30 may be a base station or a relay station for a cellular communication system such as LTE or NR. A wireless communication station (for example, a base station device 20) can also be regarded as a broadcasting station when the wireless communication station has a function of transmitting information (or a signal) by broadband.

The broadcast waves that the broadcasting station device 30 uses for broadcasting are not limited to terrestrial waves. For example, the broadcast waves may be satellite waves. Satellite waves are radio waves that are transmitted from a satellite.

Further, the broadcasting station device 30 may be a fixed station. In this case, the broadcasting station device 30 may be a device that is installed on a structure or may be the structure itself. Further, the broadcasting station device 30 may be a mobile station. In this case, the broadcasting station device 30 may be a device that is installed on a mobile body or may be the mobile body itself. Further, the broadcasting station device 30 may be a terrestrial station. For example, the base station device 20 may be a broadcasting station device that is disposed on a structure on the ground, or may be a broadcasting station device that is installed on a mobile body moving on the ground. Further, the broadcasting station device 30 may be a non-terrestrial station. For example, the broadcasting station device 30 may be an aircraft station device or may be a satellite station device.

[Terminal Device]

The terminal device 40 is a wireless communication device that wirelessly communicates with the base station device 20 or another terminal device 40. The base station device 20 is a type of communication device. The terminal device 40 is, for example, a mobile phone, a smart device (smartphone or tablet), a personal digital assistant (PDA), or a personal computer. Further, the terminal device 40 may be a machine to machine (M2M) device or an IoT device (IoT terminal).

Further, the terminal device 40 may be capable of LPWA communication with the base station device 20. The terminal device 40 may be a device capable of performing only transmission or a device capable of performing only reception. Of course, the terminal device 40 may be capable of both the transmission and the reception. Further, the terminal device 40 may be capable of side link communication with another terminal device 40. The terminal device 40 may use an automatic retransmission technique such as Hybrid ARQ (HARQ) when performing the side link communication. The terminal device 40 may also be capable of LPWA communication in communication (side link) with another terminal device 40. Wireless communication (including side link communication) used by the terminal device 40 may be wireless communication using radio waves, or may be wireless communication (optical radio) using infrared rays or visible light.

Further, the terminal device 40 may be a mobile device. Here, the mobile device is a mobile wireless communication device. In this case, the terminal device 40 may be a wireless communication device installed on the mobile body or may be the mobile body itself. For example, the terminal device 40 may be a vehicle moving on a road such as a car, bus, truck, or motorcycle, or a wireless communication device mounted in the vehicle. The moving body may be a mobile terminal or may be a moving body that moves on land (ground in a narrow sense), under the ground, on water, or in water. Further, the moving body may be a moving body that moves in the atmosphere such as a drone or a helicopter, or may be a moving body that moves outside the atmosphere such as an artificial satellite.

The terminal device 40 may be connected to a plurality of base station devices or a plurality of cells at the same time to perform communication. For example, when one base station device supports a communication area via a plurality of cells (for example, pCell or sCell), it is possible to bundle the plurality of cells using a carrier aggregation (CA) technology, a dual connectivity (DC) technology, or a multi-connectivity (MC) technology so that the base station device 20 and the terminal device 40 can perform communication. Alternatively, the terminal device 40 and the plurality of base station devices 20 can communicate with each other via the cells of different base station devices 20 using a coordinated multi-point transmission and reception (CoMP) technology.

The terminal device 40 does not necessarily have to be a device that is directly used by a person. The terminal device 40 may be a sensor installed in a machine or the like in a factory, such as a so-called machine type communication (MTC). Further, the terminal device 40 may be a machine to machine (M2M) device or an Internet of things (IoT) device. Further, the terminal device 40 may be a device having a relay communication function, as represented by device to device (D2D) or vehicle to everything (V2X). Further, the terminal device 40 may be a device called client premises equipment (CPE) that is used in a wireless backhaul or the like.

Hereinafter, a configuration of each of the devices constituting the communication system 1 according to the embodiment will be specifically described. A configuration of each device shown below is merely an example. The configuration of each device may differ from a configuration below.

2-2. Configuration of Server Device

Figure 4:
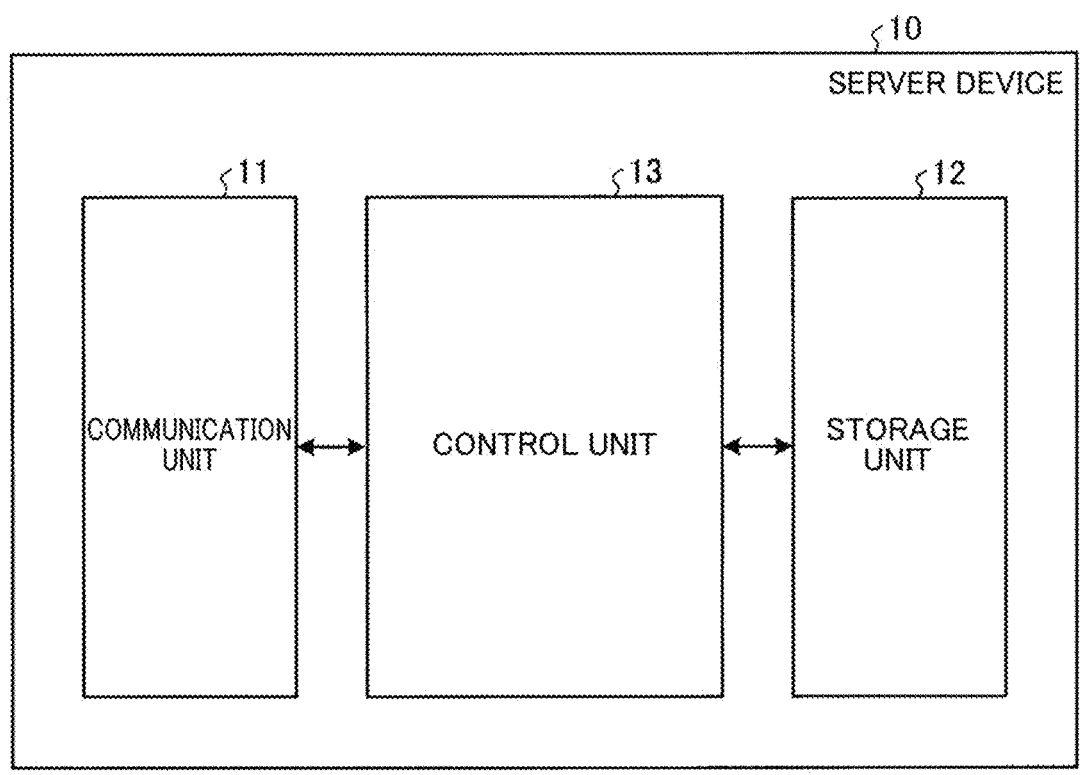
FIG. 4 is a diagram illustrating an example of a configuration of a server device according to embodiment 1.

First, a configuration of the server device 10 will be described. FIG. 4 is a diagram illustrating an example of a configuration of the server device 10 according to embodiment 1. The server device 10 includes a communication unit 11, a storage unit 12, and a control unit 13. The configuration illustrated in FIG. 4 is a functional configuration, and a hardware configuration may be different from such a configuration. Further, the functions of the server device 10 may be distributed and implemented in a plurality of physically separated configurations. For example, the server device 10 may be configured of a plurality of server devices.

The communication unit 11 is a communication interface for communicating with other devices. The communication unit 11 may be a network interface or may be a device connection interface. For example, the communication unit 11 may be a local area network (LAN) interface such as a network interface card (NIC), or may be a USB interface configured of a universal serial bus (USB) host controller, a USB port, or the like. Further, the communication unit 11 may be a wired interface or may be a wireless interface. The communication unit 11 functions as a communication means of the server device 10. The communication unit 11 communicates with the base station device 20 and the broadcasting station device 30 under the control of the control unit 13.

The storage unit 12 is a storage device from or to which data can be read or written, such as a dynamic random access memory (DRAM), a static random access memory (SRAM), a flash memory, and a hard disk. The storage unit 12 functions as a storage means of the server device 10.

The control unit 13 is a controller that controls each unit of the server device 10. The control unit 13 is realized by, for example, a processor such as a central processing unit (CPU) or a micro processing unit (MPU). For example, the control unit 13 is realized by the processor executing various programs stored in a storage device inside the server device 10 using a random access memory (RAM) or the like as a work area. The control unit 13 may be realized by an integrated circuit such as an application specific integrated circuit (ASIC) or a field programmable gate array (FPGA). The CPU, MPU, ASIC, and FPGA can all be regarded as controllers.

2-3. Configuration of Base Station Device

Figure 5:
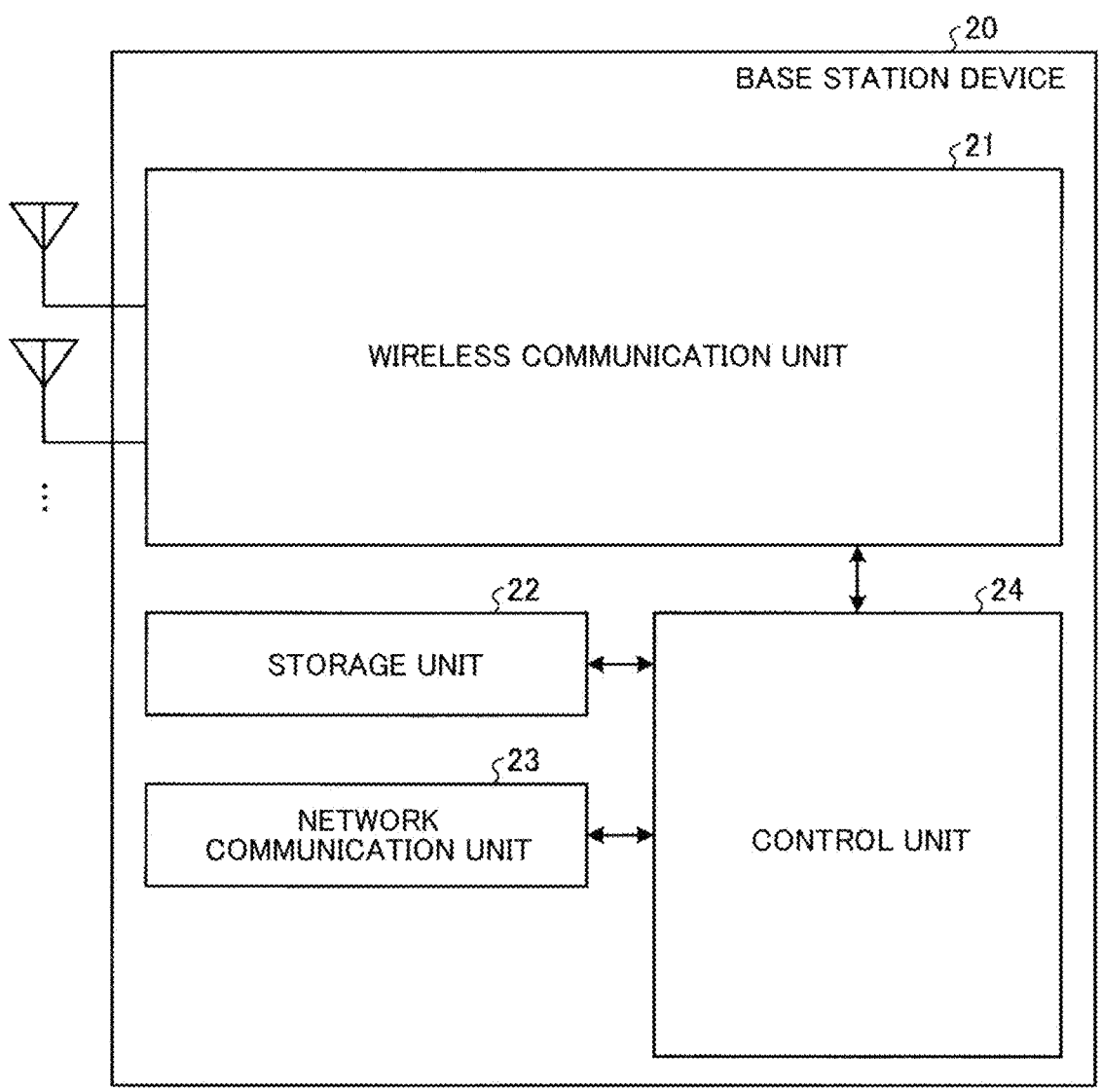
FIG. 5 is a diagram illustrating an example of a configuration of a base station device according to embodiment 1.

Next, a configuration of the base station device 20 will be described. FIG. 5 is a diagram illustrating an example of a configuration of the base station device 20 according to embodiment 1. The base station device 20 can perform LPWA communication with the terminal device 40. The base station device 20 includes a wireless communication unit 21, a storage unit 22, a network communication unit 23, and a control unit 24. The configuration illustrated in FIG. 5 is a functional configuration, and a hardware configuration may be different from such a configuration. Further, functions of the base station device 20 may be distributed and implemented in a plurality of physically separated configurations.

The wireless communication unit 21 is a signal processing unit for wireless communication with another wireless communication device (for example, the terminal device 40 or another base station device 20). The wireless communication unit 21 operates according to the control of the control unit 24. The wireless communication unit 21 corresponds to one or a plurality of wireless access schemes. For example, the wireless communication unit 21 supports communication using LPWA communication.

The storage unit 22 is a storage device from and to which data can be read and written, such as DRAM, SRAM, flash memory, and hard disk. The storage unit 22 functions as a storage means for the base station device 20.

The network communication unit 23 is a communication interface for communicating with other devices. For example, the network communication unit 23 is a LAN interface. The network communication unit 23 may be a wired interface or may be a wireless interface. The network communication unit 23 functions as a network communication means of the base station device 20. The network communication unit 23 communicates with the server device 10 under the control of the control unit 24.

The control unit 24 is a controller that controls each unit of the base station device 20. The control unit 24 is realized by, for example, a processor such as a CPU or MPU. For example, the control unit 24 is realized by the processor executing various programs stored in the storage device inside the base station device 20 using the RAM or the like as a work area. The control unit 24 may be realized by an integrated circuit such as an ASIC or FPGA. The CPU, MPU, ASIC, and FPGA can all be regarded as controllers.

2-4. Configuration of Broadcasting Station Device

Figure 6:
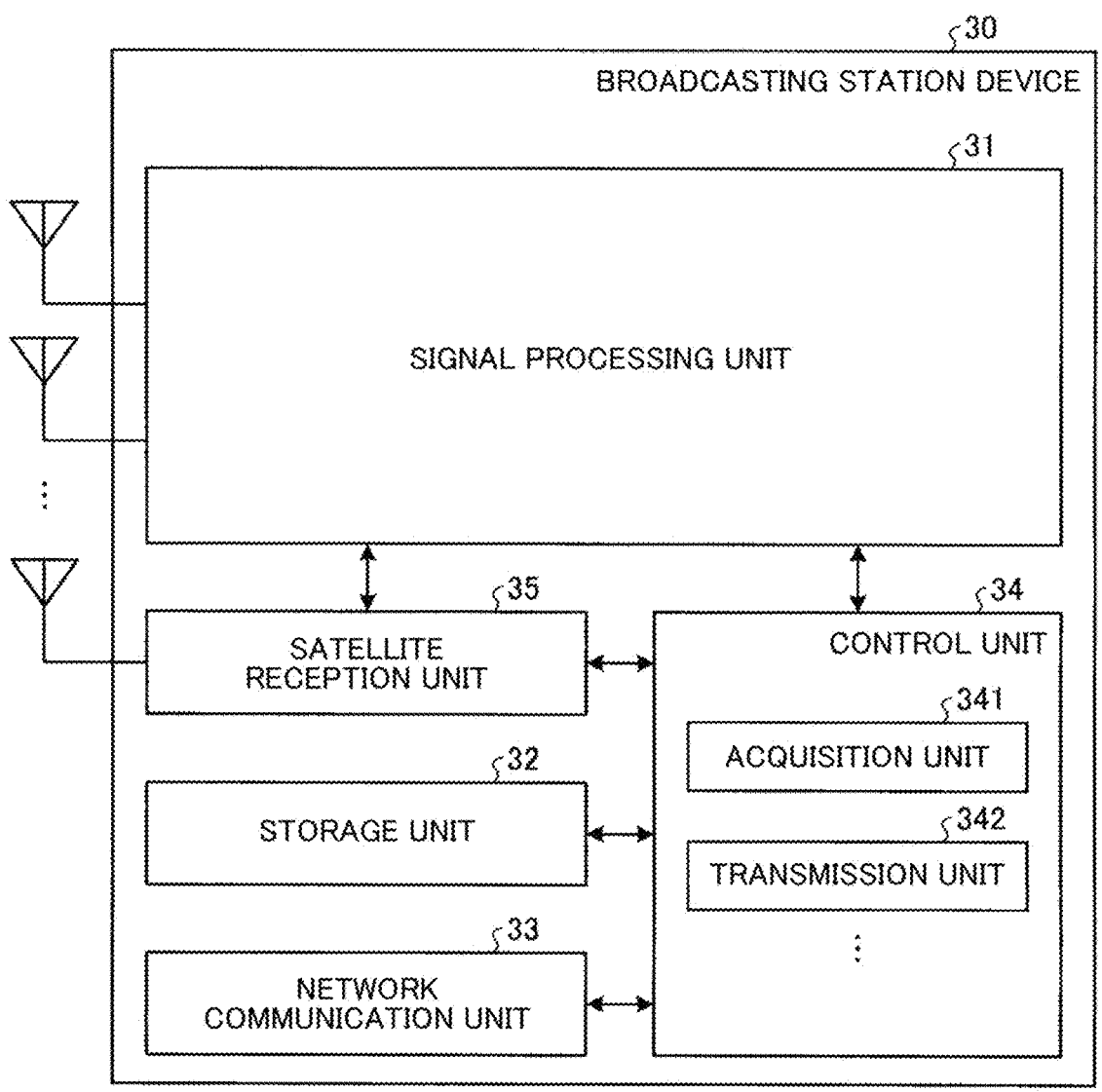
FIG. 6 is a diagram illustrating an example of a configuration of a broadcasting station device according to embodiment 1.

Next, a configuration of the broadcasting station device 30 will be described. FIG. 6 is a diagram illustrating an example of a configuration of the broadcasting station device 30 according to embodiment 1. The broadcasting station device 30 is a device that carries the timing information or the control information on broadcast waves and transmits the broadcast waves to the terminal device 40. The broadcasting station device 30 includes a signal processing unit 31, a satellite reception unit 35, a storage unit 32, a network communication unit 33, and a control unit 34. The configuration illustrated in FIG. 6 is a functional configuration, and a hardware configuration may be different from this. Further, functions of the broadcasting station device 30 may be distributed and implemented in a plurality of physically separated configurations.

The signal processing unit 31 is a signal processing unit for transmitting broadcast waves. The signal processing unit 31 operates according to the control of the control unit 34.

The satellite reception unit 35 is a signal processing unit for receiving satellite waves and demodulating information (signals). The satellite waves received by the satellite reception unit 35 are, for example, GPS waves transmitted from a GPS satellite. A satellite reception unit 35 demodulates, for example, a PPS signal, GPS time information, or the like from the GPS waves and outputs the PPS signal, GPS time information, or the like. The satellite waves received by the satellite reception unit 35 may be satellite waves transmitted from another GNSS such as GLONASS, Galileo, or a Quasi-Zenith Satellite.

The storage unit 32 is a data readable/writable storage device such as a DRAM, SRAM, flash memory, and hard disk. The storage unit 32 functions as a storage means of the broadcasting station device 30.

The network communication unit 33 is a communication interface for communicating with other devices. For example, the network communication unit 33 is a LAN interface. The network communication unit 33 may be a wired interface or may be a wireless interface. The network communication unit 33 functions as a network communication means of the broadcasting station device 30. The network communication unit 33 communicates with the server device 10 under the control of the control unit 34.

The control unit 34 is a controller that controls each unit of the broadcasting station device 30. The control unit 34 is realized by, for example, a processor such as a CPU or MPU. For example, the control unit 34 is realized by the processor executing various programs stored in a storage device inside the broadcasting station device 30 using the RAM or the like as a work area. The control unit 34 may be realized by an integrated circuit such as an ASIC or FPGA. The CPU, MPU, ASIC, and FPGA can all be regarded as controllers.

The control unit 34 includes an acquisition unit 341 and a transmission unit 342, as illustrated in FIG. 6. Each of blocks (from the acquisition unit 341 to the transmission unit 342) constituting the control unit 34 is a functional block indicating a function of the control unit 34. These functional blocks may be software blocks or may be hardware blocks. For example, each of the above functional blocks may be one software module realized by software (including a microprogram) or may be one circuit block on a semiconductor chip (die). Of course, each functional block may be one processor or one integrated circuit. A method of configuring the functional blocks is arbitrary.

The control unit 34 may be configured in units of functions different from the above-described functional blocks. An operation of each of the blocks (from the acquisition unit 341 to the transmission unit 342) constituting the control unit 34 will be described below.

As described above, the broadcasting station device 30 carries the timing information on the broadcast waves and transmits the resultant broadcast waves to the terminal device 40. The timing information is virtual satellite transmission information generated by imitating information that is transmitted from the navigation satellite. In this case, the broadcast waves may be waves obtained by down-converting virtual satellite waves (for example, GPS waves) transmitted from the virtual satellite. Further, the virtual satellite transmission information may be a PPS signal obtained when radio waves from a navigation satellite (for example, a GPS satellite) are decoded, or radio waves from which the equivalent PPS signal is obtained. The navigation satellite is not limited to the GPS satellite and may be a GNSS navigation satellite different from the GPS.

Figure 7:
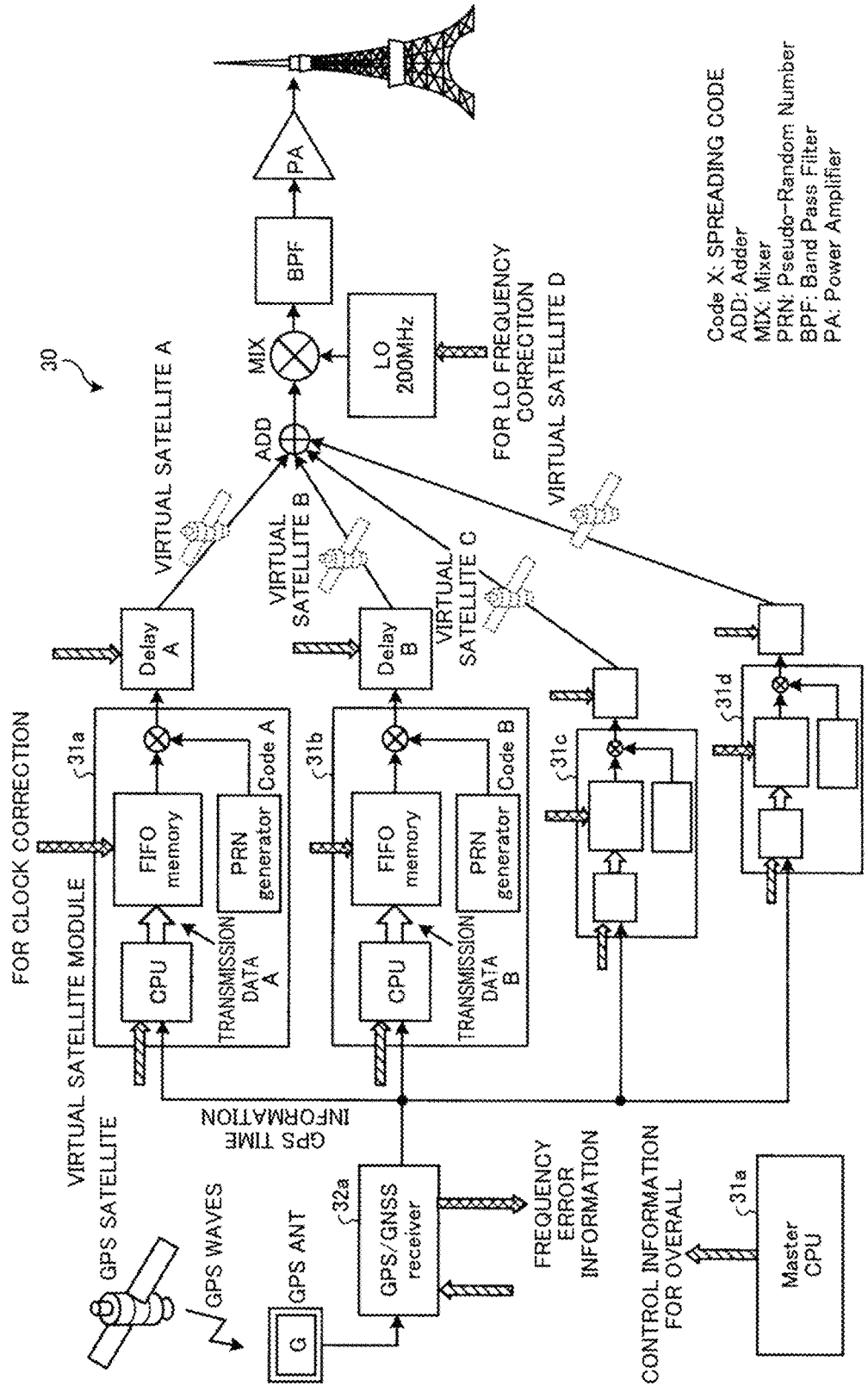
FIG. 7 is a diagram illustrating a specific example of a configuration of the broadcasting station device.

FIG. 7 is a diagram illustrating a specific example of a configuration of the broadcasting station device 30. The configuration illustrated in FIG. 7 is an example of a configuration of the broadcasting station device 30 when there are four virtual satellites. The configuration illustrated in FIG. 7 is merely an example, and a configuration of the broadcasting station device 30 is not limited to the configuration illustrated in FIG. 7.

The broadcasting station device 30 includes a GPS and GNSS receiver 32a. The GPS and GNSS receiver 32a corresponds to the satellite reception unit 35 in the example of FIG. 6. The GPS and GNSS receiver 32a receives GPS waves from actual GPS satellites and demodulates the GPS time information or the like. The GPS and GNSS receiver 32a inputs the demodulated signal to the four virtual satellite modules 31a to 31d. The four virtual satellite modules 31a to 31d constitute a part of the signal processing unit 31 in the example of FIG. 6. The four virtual satellite modules 31a to 31d generate signals that imitate GPS satellite signals under the control of the master CPU 31a. In the example of FIG. 6, the master CPU 31a constitutes a part of the control unit 34. The broadcasting station device 30 adds a predetermined delay to each of four signals according to positions of the virtual satellites, and then multiplexes the four signals to which the delay has been added. The broadcasting station device 30 transmits the multiplexed signal in a predetermined frequency band (for example, 200 MHz band).

Although FIG. 7 illustrates the configuration for transmitting the timing information, the broadcasting station device 30 may transmit the control information carried on the broadcast waves as well as the timing information to the terminal device 40.

In this case, the broadcasting station device 30 may use a wideband radio main channel for transmission of the timing information. This allows the broadcasting station device 30 to broadcast accurate timing information. On the other hand, the broadcasting station device 30 may be used for the sub-channel of the narrow band radio for transmission of the control information. This makes it possible for the control information to be transmitted to a large number of terminal devices 40. The main channel and sub-channel will be described below.

2-5. Configuration of Terminal Device

Figure 8:
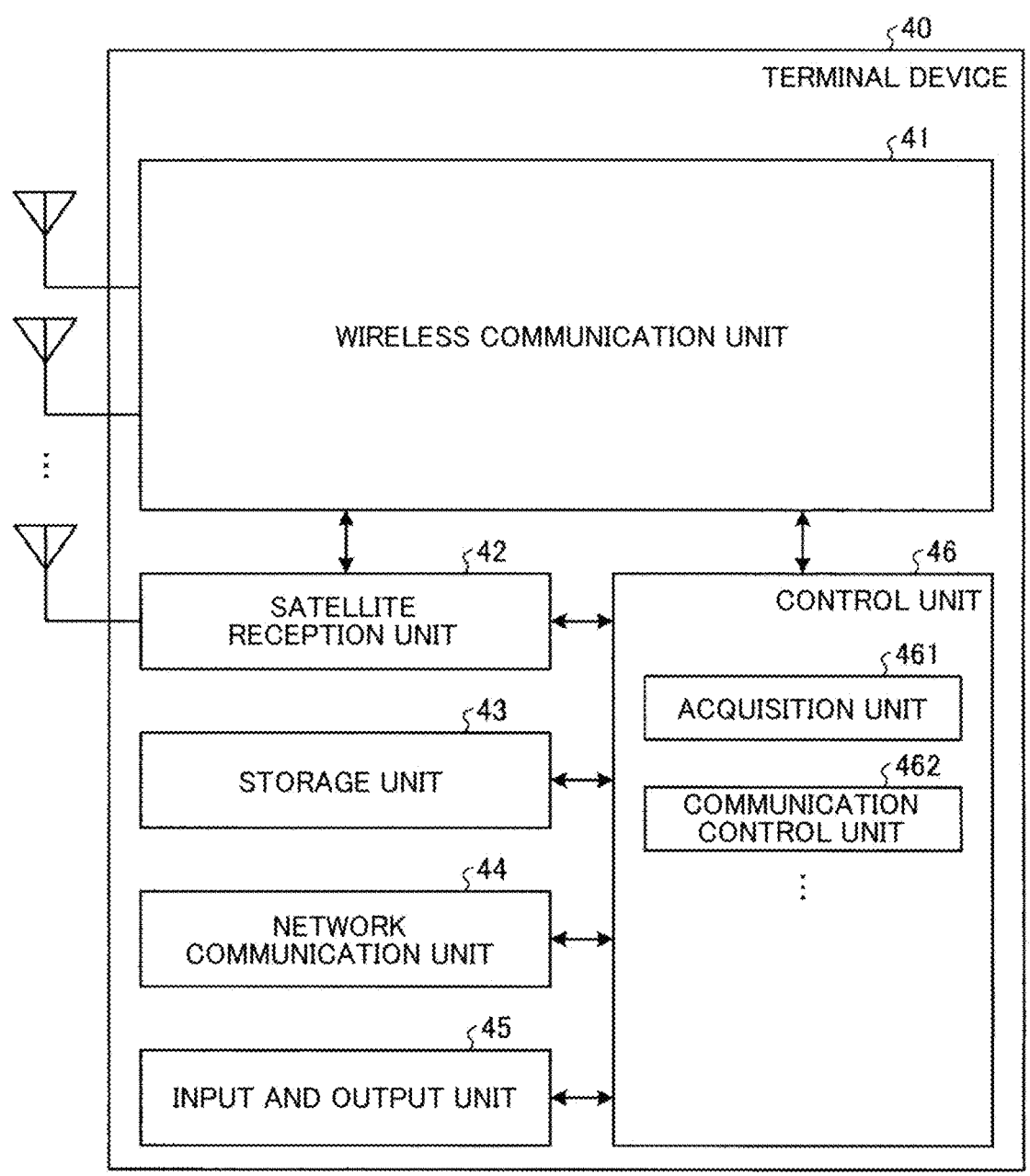
FIG. 8 is a diagram illustrating an example of a configuration of a terminal device according to embodiment 1.

Next, a configuration of the terminal device 40 will be described. FIG. 8 is a diagram illustrating the example of a configuration of the terminal device 40 according to embodiment 1. The terminal device 40 can perform LPWA communication with the base station device 20. The terminal device 40 extracts the timing information from the broadcast waves transmitted from the broadcasting station device 30 and uses the timing information for control of the LPWA communication. The terminal device 40 includes a wireless communication unit 41, a satellite reception unit 42, a storage unit 43, a network communication unit 44, an input and output unit 45, and a control unit 46. The configuration illustrated in FIG. 8 is a functional configuration, and a hardware configuration may be different from such a configuration. Further, functions of the terminal device 40 may be distributed and implemented in a plurality of physically separated configurations.

The wireless communication unit 41 is a signal processing unit for wireless communication with another wireless communication device (for example, the base station device 20 and the other terminal device 40). The wireless communication unit 41 operates according to the control of the control unit 46. The wireless communication unit 41 corresponds to one or a plurality of wireless access schemes. For example, the wireless communication unit 21 supports communication in which LPWA communication is used. The wireless communication unit 41 may multiplex and transmit a plurality of transmission signal transmissions generated by chirp-modulating the transmission data within the same transmission channel by shifting the timing at predetermined time intervals.

The satellite reception unit 42 is a signal processing unit for receiving satellite waves and demodulating information (signals). The satellite waves that are received by the satellite reception unit 42 are, for example, GPS waves that are transmitted from a GPS satellite. The satellite reception unit 42, for example, demodulates a PPS signal, the GPS time information, or the like from the GPS waves and outputs a demodulation result. The satellite waves received by the satellite reception unit 42 may be satellite waves that are transmitted from another GNSS such as GLONASS, Galileo, or a Quasi-Zenith Satellite.

The storage unit 43 is a storage device from which data can be read and written, such as a DRAM, SRAM, flash memory, or hard disk. The storage unit 43 functions as a storage means of the terminal device 40.

The network communication unit 44 is a communication interface for communicating with other devices. For example, the network communication unit 44 is a LAN interface. The network communication unit 44 may be a wired interface or may be a wireless interface. The network communication unit 44 functions as a network communication means of the terminal device 40. The network communication unit 44 communicates with other devices according to the control of the control unit 46.

The input and output unit 45 is a user interface for exchanging information with the user. For example, the input and output unit 45 is an operating device allowing the user to perform various operations, such as a keyboard, a mouse, operation keys, and a touch panel. Alternatively, the input and output unit 45 is a display device such as a liquid crystal display or an organic electroluminescence display (organic EL display). The input and output unit 45 may be an audio device such as a speaker or a buzzer. Further, the input and output unit 45 may be a lighting device such as a light emitting diode (LED) lamp. The input and output unit 45 functions as an input and output means (an input means, output means, operation means, or notification means) of the terminal device 40.

The control unit 46 is a controller that controls each unit of the terminal device 40. The control unit 46 is realized by, for example, a processor such as a CPU or MPU. For example, the control unit 46 is realized by the processor executing various programs stored in the storage device inside the terminal device 40 using the RAM or the like as a work area. The control unit 46 may be realized by an integrated circuit such as an ASIC or FPGA. The CPU, MPU, ASIC, and FPGA can all be regarded as controllers.

The control unit 46 includes an acquisition unit 461 and a communication control unit 462, as illustrated in FIG. 8. Each of blocks (from the acquisition unit 461 to the communication control unit 462) constituting the control unit 46 is a functional block indicating a function of the control unit 46. These functional blocks may be software blocks or may be hardware blocks. For example, each of the above functional blocks may be one software module that is realized by software (including a microprocessor) or may be one circuit block on a semiconductor chip (die). Of course, each functional block may be one processor or one integrated circuit. A method of configuring the functional blocks is arbitrary.

The control unit 46 may be configured in units of functions different from the above-described functional blocks. An operation of each of the blocks (from the acquisition unit 461 to the communication control unit 462) constituting the control unit 46 will be described below.

As described above, the terminal device 40 extracts the timing information from the broadcast waves transmitted from the broadcasting station device 30 and uses the timing information for control of the LPWA communication. The timing information is a signal imitating a GPS signal. When a predetermined number of GPS satellites can be supplemented, the terminal device 40 may use GPS signals (for example, PPS signals) acquired from actual GPS satellites as the timing information.

Figure 9:
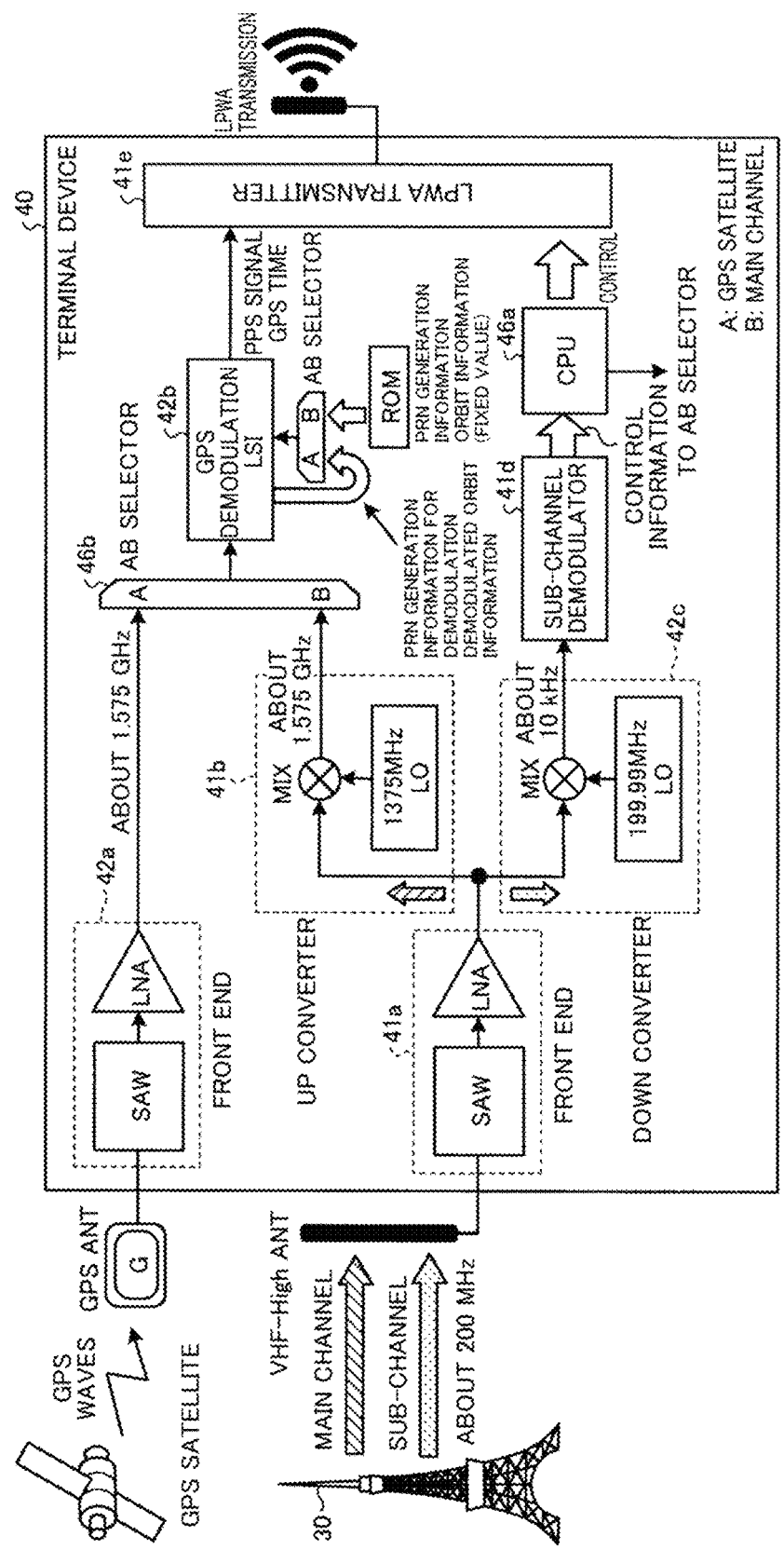
FIG. 9 is a diagram illustrating a specific example of a configuration of a terminal device.

FIG. 9 is a diagram illustrating a specific example of a configuration of the terminal device 40. The configuration illustrated in FIG. 9 is an example of a configuration of the broadcasting station device 30 when a commercially available GPS demodulation LSI is used for demodulation of a GPS signal. The configuration illustrated in FIG. 9 is merely an example, and the configuration of the terminal device 40 is not limited to the configuration illustrated in FIG. 9.

The terminal device 40 extracts satellite waves from the GPS satellites using a front end 42a including a surface acoustic wave (SAW) filter, a low noise amplifier (LNA), or the like, and then outputs the satellite waves to the AB selector 46b. The front end 42a corresponds to a part of the satellite reception unit 42 in the example of FIG. 8.

Further, after the terminal device 40 extracts the broadcast waves from the broadcasting station device 30 using a front end 41a including an SAW filter, LNA, or the like, the terminal device 40 performs frequency shift using an up converter 41b and a down converter 42c. The terminal device 40 outputs an up-converted signal to the AB selector 46b and outputs a down-converted signal to the sub-channel demodulator 41d. The front end 41a, the up converter 41b, the down converter 42c, and the sub-channel demodulator 41d correspond to a part of the wireless communication unit 41 in the example of FIG. 8.

On the other hand, the AB selector selects a signal according to the control of the CPU 46a, and then inputs the selected signal to the GPS demodulation LSI 42b. In the example of FIG. 8, the GPS demodulation LSI 42b corresponds to a part of the wireless communication unit 41. The GPS demodulation LSI 42b demodulates the PPS signal and outputs the PPS signal to the LPWA transmitter 41e. The PPS signal is a type of timing information. The LPWA transmitter 41e corresponds to a part of the wireless communication unit 41 in the example of FIG. 8. A part of the LPWA transmitter 41e (for example, a control unit in the LPWA transmitter 41e) may be regarded as a part of the control unit 46.

The sub-channel demodulator 41d demodulates a control signal from an input signal and outputs the control signal to the CPU 46a. In the example of FIG. 8, the CPU 46a corresponds to a part of the control unit 46. The LPWA transmitter 41e communicates with the base station device 20 under the control of the control unit 46.

2-6. Allocation of Frequency Band

Next, the allocation of the frequency band (second frequency band) will be described. The second frequency band is a frequency band different from the first frequency band, which is an unlicensed band in which a plurality of communication schemes can be mixed. Here, the first frequency band, for example, is a frequency band capable of a specific small power-saving radio (for example, a frequency band that the terminal device 40 uses for LPWA communication). The first frequency band is, for example, a 920 MHz band, and the second frequency band is, for example, a VHF-High band.

Figure 10:
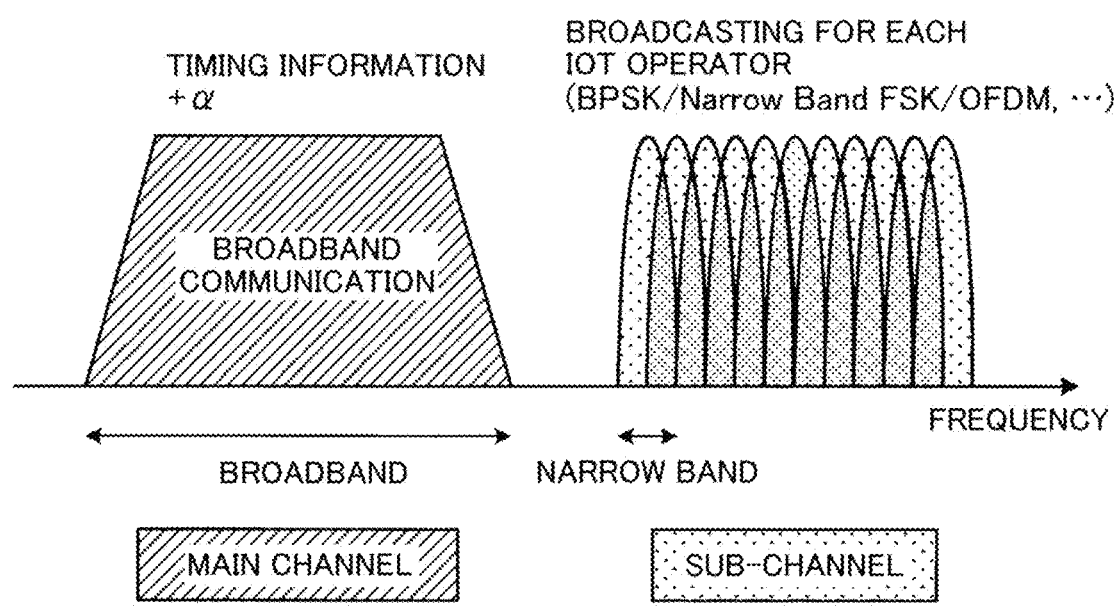
FIG. 10 is a diagram illustrating a spectrum of broadcast waves that is transmitted by the broadcasting station device.

FIG. 10 is a diagram illustrating a spectrum of broadcast waves that is transmitted by the broadcasting station device 30. The broadcasting station device 30 divides the allocated frequency band (the second frequency band) into one main channel and a plurality of sub-channels. The broadcasting station device 30 transmits the timing information using the main channel, and transmits control information for controlling the communication of the terminal device 40 on the sub-channel.

In this case, the broadcasting station device 30 uses wideband radio for the main channel. A bandwidth is assumed to be up to about 2 MHz. The broadcasting station device 30 performs spectrum spreading on the timing signal and transmits the resultant timing signal, for example. Using a spectrum spreading scheme or the like, the broadcasting station device 30 can broadcast accurate timing information.

Further, the broadcasting station device 30 uses a narrow band radio for the sub-channel. The broadcasting station device 30 multicasts the control information using the sub-channel. The control information may be different in a plurality of wireless schemes.

A bandwidth of the sub-channel is assumed to be, for example, about 10 kHz. The broadcasting station device 30 may use any radio modulation such as BPSK, FSK, and OFDM as long as the radio modulation fits in the bandwidth. A person (for example, an IoT operator. Hereinafter referred to as a service provider.) who provides a communication service such as application processing to a user of the terminal device 40 may collectively use a plurality of channels through carrier aggregation (CA), channel bonding, or the like with respect to the allocated sub-channel. Further, the service provider may divide and use one channel.

The broadcast from each broadcasting station device 30 may be defined in advance so that the broadcast waves can be distinguished from each other even at the same frequency by code multiplexing.

3. OPERATION OF COMMUNICATION SYSTEM

Next, an operation of the communication system 1 will be described.

3-1. Overview of Operation

Figure 11:
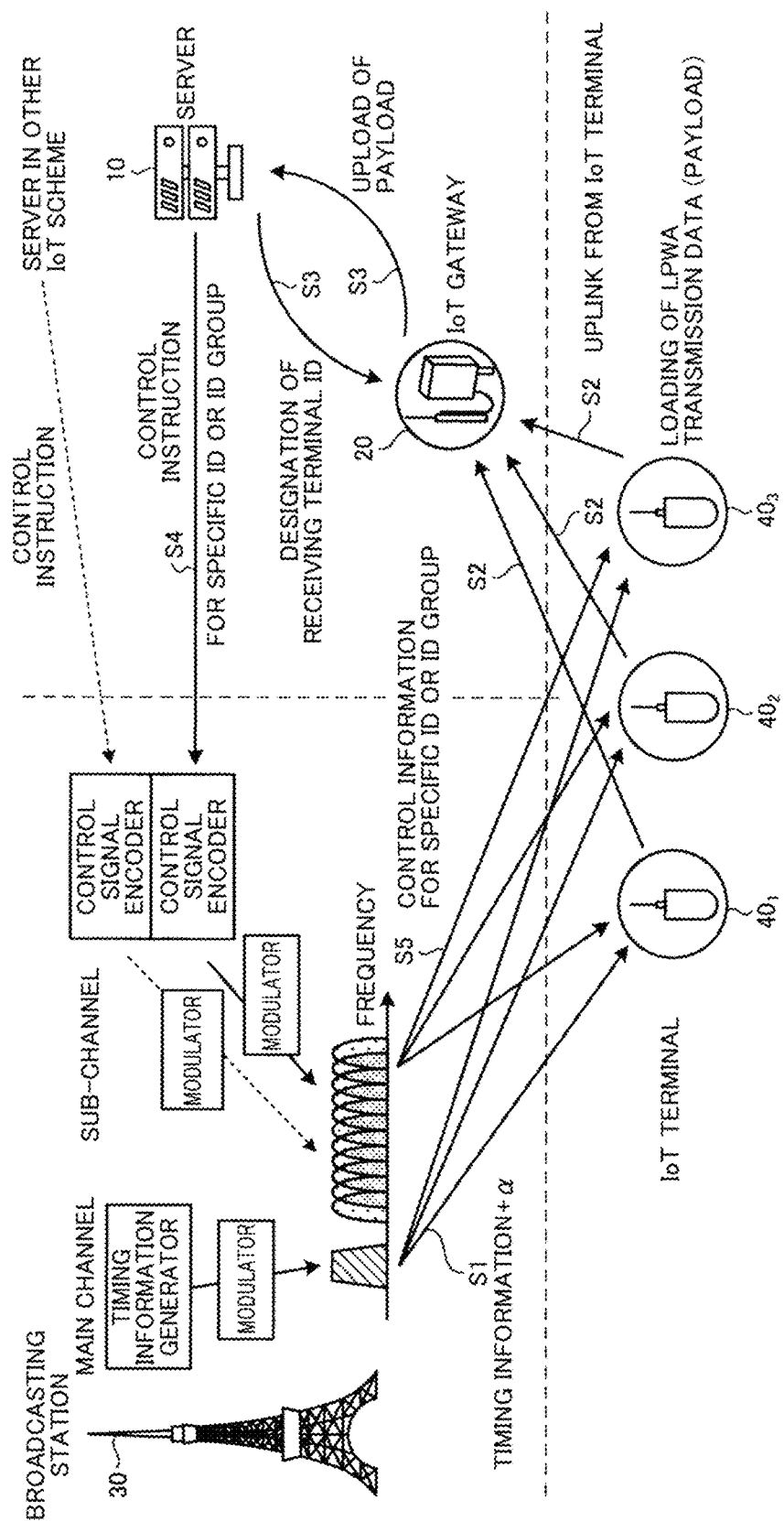
FIG. 11 is a diagram illustrating an overview of the operation of a communication system 1.

First, an overview of the operation of the communication system 1 will be described. FIG. 11 is a diagram illustrating an overview of the operation of the communication system 1.

[Step S1]

The broadcasting station device 30 broadcasts timing information independently of the terminal device 40 (for example, an IoT terminal) and periodically using the main channel (step S1).

(1) Data that is broadcast from the main channel may include not only the timing information but also date and time information, and ephemeris information. When the terminal device 40 is synchronized with another terminal device 40, time information such as the GPS time information may also be regarded as the timing information.

(2) The data that is broadcast from the main channel may also include a control signal for the terminal device 40 (for example, an IoT terminal) conforming to use of a band thereof.

[Steps S2 and S3]

Steps S2 and S3 are normal operations of the terminal device 40 (for example, an IoT terminal), the base station device 20 (for example, an IoT gateway), and the server device 10.

(1) The server device 10 designates a terminal ID for reception, for the base station device 20 (for example, an IoT gateway) (step S3).

(2) The base station device 20 (for example, an IoT gateway) receives an uplink of the terminal device 40 (for example, an IoT terminal) having the designated terminal ID (step S2).

(3) The base station device 20 (for example, an IoT gateway) uploads received uplink data (payload) to the server device 10 (step S3).

[Steps S1, S4, S5]

Steps S1, S4, and S5 are operations when, for example, there is a request to stop the terminal device 40 (for example, an IoT terminal) having a specific ID.

(1) The server device 10 notifies a control signal encoder in the broadcasting station device 30 of data for stopping the terminal device 40 (for example, an IoT terminal) having a specific ID (step S4).

(2) The control signal encoder of the broadcasting station device 30 performs default encoding and transfers resultant data to the modulator.

(3) The modulator of the broadcasting station device 30 performs default modulation.

(4) The broadcasting station device 30 broadcasts the data via the sub-channel (step S5).

(5) The broadcasting station device 30 can also broadcast the data via the main channel (step S1).

3-2. Broadcasting Station Main Channel (Virtual (Pseudo) Satellite)

In the present embodiment, the broadcasting station device 30 generates and broadcasts the timing information. A technology of a virtual satellite (also called a pseudo-satellite) may be used for generation of timing information.

The broadcasting station device 30 may generate a pseudo-satellite in a ground based augmentation system (GBAS). The pseudo-satellite (pseudolite) is a known technology and is used at a construction site or an indoor region in which the number of satellites is decreased or reception from the satellites is not possible due to an influence of buildings. The number and disposition of satellites can be improved.

The broadcasting station device 30 may be a terrestrial broadcasting station that converts a baseband signal observed when radio waves from a plurality of pseudo-satellites that do not move are received at one point on the ground into a "high transmission frequency" and transmits a resultant signal. In this case, the "high transmission frequency" may be a frequency in a television broadcasting band.

3-3. Processing Flow of Broadcasting Station Device

Figure 12:
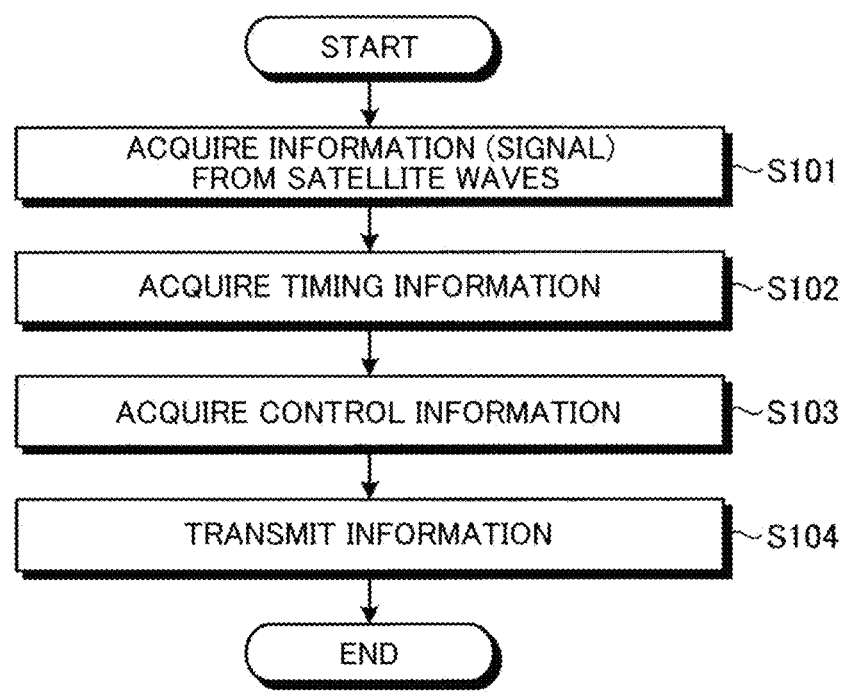
FIG. 12 is a flowchart illustrating an example of broadcasting processing according to embodiment 1.

Next, a processing flow of the broadcasting station device 30 will be described. FIG. 12 is a flowchart illustrating an example of broadcasting processing according to embodiment 1. The broadcasting processing shown below is executed, for example, by the control unit 34 of the broadcasting station device 30. The broadcasting station device 30 is, for example, a terrestrial broadcasting station device.

First, the acquisition unit 341 of the broadcasting station device 30 acquires information (for example, GPS signal) from the satellite waves (step S101). The acquisition unit 341 acquires information (for example, a PPS signal) for time measurement or timing measurement, which is transmitted from the navigation satellite.

The acquisition unit 341 acquires the timing information that is broadcast to the terminal device 40 (step S102). For example, the acquisition unit 341 generates timing information on the basis of the information (signal) acquired in step S101. As described above, the terminal device 40 can use a predetermined unlicensed band (first frequency band) in which a plurality of communication schemes can be mixed in a predetermined communication scheme (for example, a communication scheme compliant with a predetermined LPWA standard).

The timing information is virtual satellite transmission information generated by imitating the information that is transmitted from the navigation satellite. In this case, the virtual satellite transmission information may be formed so that the pulse per second (PPS) signal can be demodulated from the signal transmitted from the navigation satellite.

The acquisition unit 341 acquires the control information from the server device 10 (step S103). The control information is, for example, information for instructing the terminal device 40 to perform control regarding communication. The control information may include stop information for stopping radio wave transmission in which the first frequency band of the terminal device 40 has been used. Further, the control information may include schedule information for scheduling the radio wave transmission in which the first frequency band of the terminal device 40 has been used. The schedule information may include information on radio wave resources (frequency and/or time resources) that can be used by the terminal device 40.

The transmission unit 342 of the broadcasting station device 30 broadcasts the timing information and the control information using a frequency band (the second frequency band) different from the predetermined unlicensed band (the first frequency band).

For example, the transmission unit 342 transmits the timing information using the main channel described in <2-6. Allocation of frequency band>. Further, the transmission unit 342 transmits the control information using the sub-channel described in <2-6. Allocation of frequency band>.

In this case, the transmission unit 342 may change the spreading code or the code multiplexing for the transmission of the information using the main channel so that broadcast waves of another broadcasting station and broadcast waves of its own station can be separated and demodulated even at the same frequency.

Figure 13:
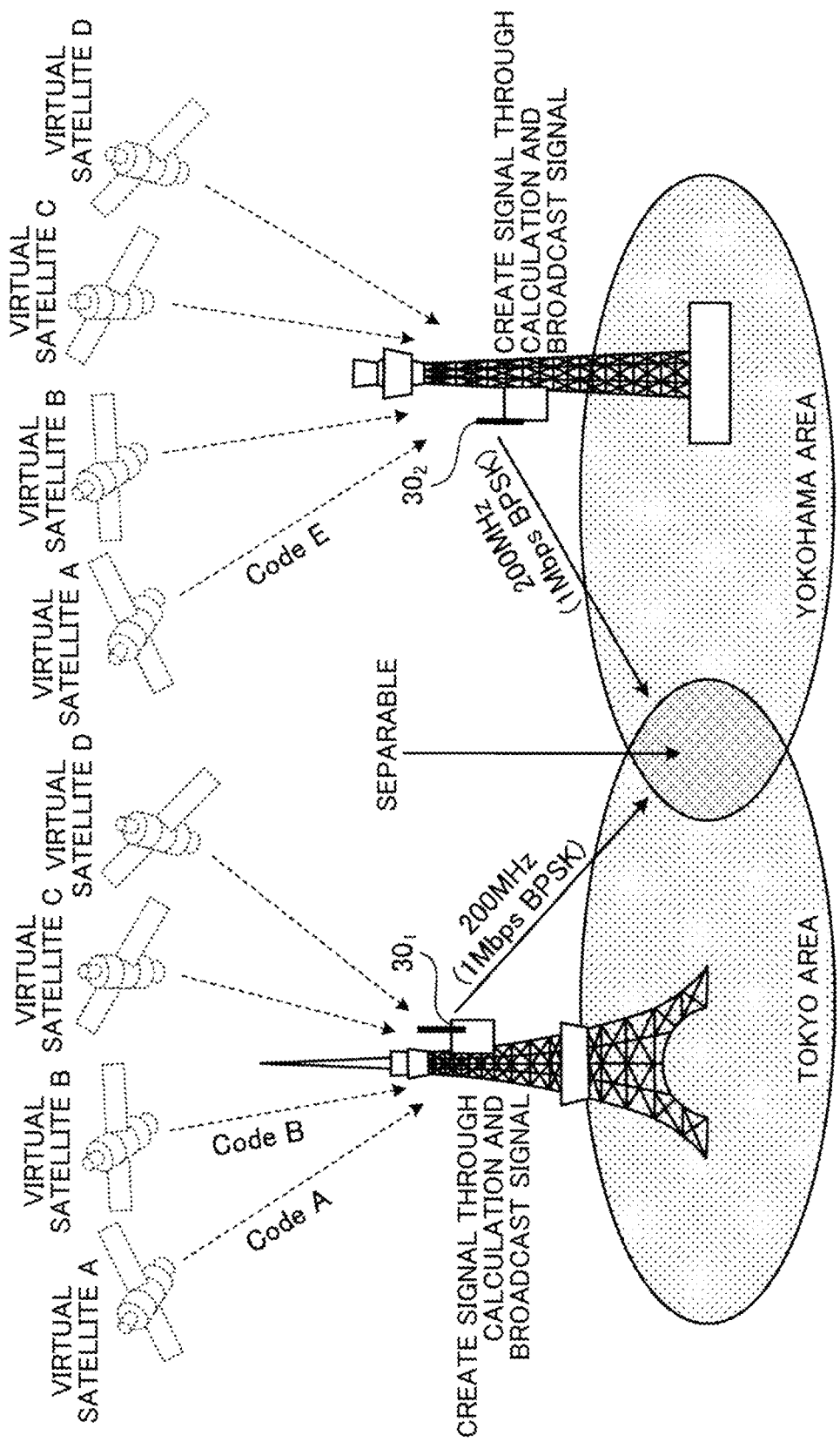
FIG. 13 is a diagram illustrating that an area can be separated by different diffusion codes or code multiplexing.

FIG. 13 is a diagram illustrating that an area can be separated by different diffusion codes or code multiplexing. The transmission unit 342 may enable area division not only for the main channel but also for the sub-channel using the same means.

When the transmission of the information is completed, the control unit 34 of the broadcasting station device 30 ends the broadcasting processing.

3-4. Processing Flow of Terminal Device

Figure 14:
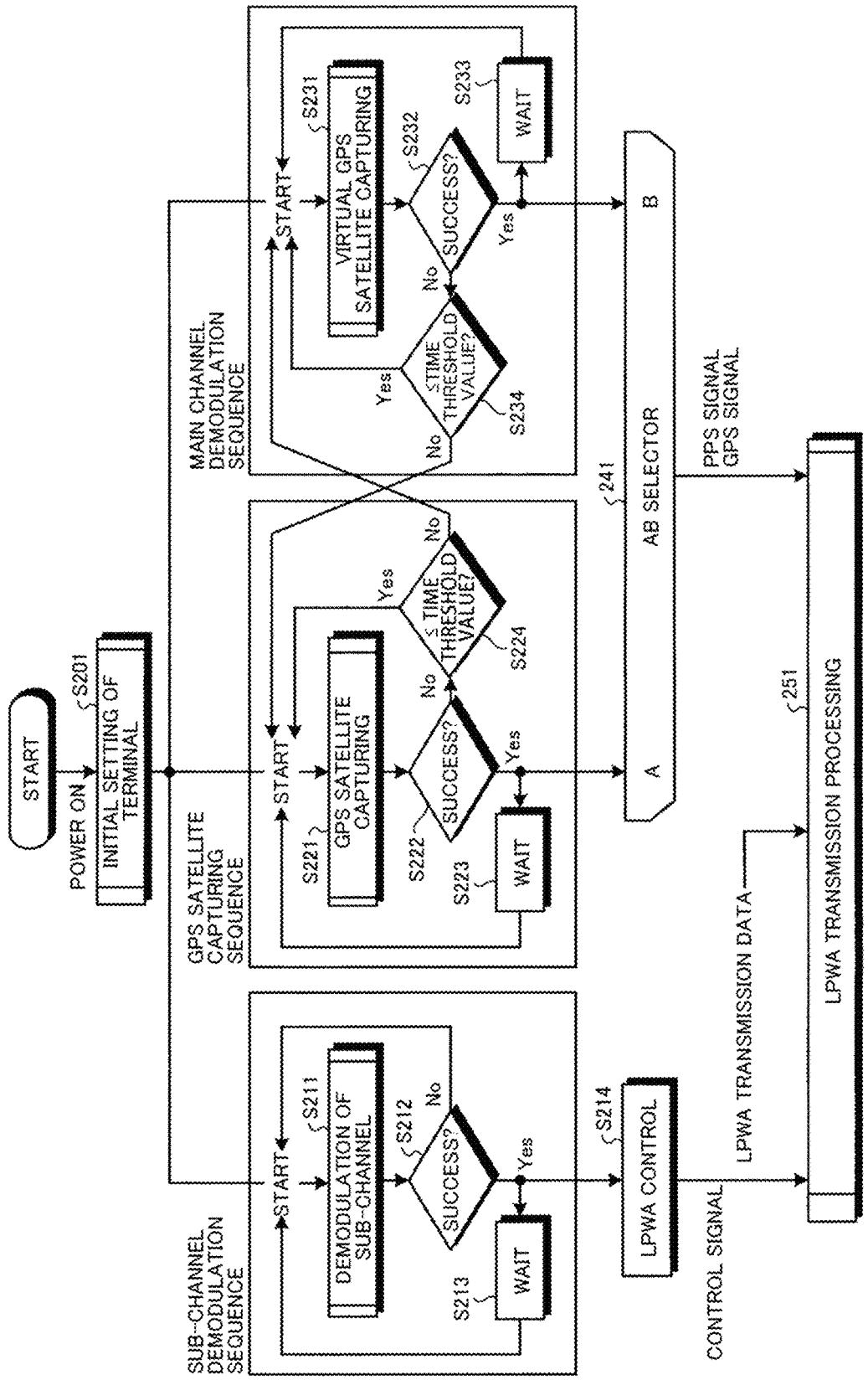
FIG. 14 is a flowchart illustrating an example of transmission processing according to embodiment 1.

Next, a processing flow of the terminal device 40 will be described. FIG. 14 is a flowchart illustrating an example of transmission processing according to embodiment 1. The transmission processing shown below is executed, for example, by the control unit 46 of the terminal device 40.

When the power is turned on, the control unit 46 of the terminal device 40 executes a terminal initial setting (step S201). The control unit 46 of the terminal device 40 executes a sub-channel demodulation sequence, a GPS satellite capturing sequence, and a main channel demodulation sequence. These sequences may be executed in parallel.

First, the sub-channel demodulation sequence will be described.

The acquisition unit 461 of the terminal device 40 executes demodulation of the sub-channel (step S211). When the demodulation fails (step S212: No), the acquisition unit 461 returns to step S211 and continues demodulation of the sub-channel. When the demodulation is successful (step S212: Yes), the acquisition unit 461 returns to step S211 after executing WAIT (step S213), and repeats the demodulation of the sub-channel. In FIG. 14, "WAIT" means waiting until a timing at which a predetermined time has elapsed, or before or after the LPWA transmission.

When the demodulation is successful, the acquisition unit 461 of the terminal device 40 acquires control information from the demodulated information. The control information may include stop information for stopping the radio wave transmission in which the first frequency band of the terminal device 40 has been used. Further, the control information may include schedule information for scheduling the radio wave transmission in which the first frequency band of the terminal device 40 has been used.

The communication control unit 462 of the terminal device 40 generates a control signal for controlling LPWA transmission on the basis of the control information (step S214). For example, the communication control unit 462 generates a stop signal for stopping the radio wave transmission or generate a signal for designating available radio wave resources on the basis of the control information.

Next, the GPS satellite capturing sequence will be described.

The acquisition unit 461 of the terminal device 40 executes processing for capturing navigation satellites (for example, GPS satellites) (step S221). When a predetermined number (for example, four) of navigation satellites can be captured (step S222: Yes), the acquisition unit 461 returns to step S221 after executing WAIT (step S223), and restarts the processing for capturing the navigation satellites. Further, when the capturing is successful, the acquisition unit 461 transmits the timing information (for example, a timing signal such as a PPS signal or a GPS signal) to the AB selector. The timing information enables a timing to be shared with another terminal device 40 that uses the first frequency band in a communication scheme different from the predetermined communication scheme that is used by the terminal device 40.

When a predetermined number (for example, four) of navigation satellites cannot be captured (step S222: No), a determination is made whether or not a predetermined time has elapsed from the start of the capturing processing (step S224). When the predetermined time has not elapsed (step S224: Yes), the acquisition unit 461 returns to step S221 and continues the capture processing. When the predetermined time has elapsed (step S224: No), the acquisition unit 461 causes the processing to proceed to the main channel demodulation sequence.

Next, the main channel demodulation sequence will be described.

The acquisition unit 461 of the terminal device 40 executes the processing for capturing virtual satellites (for example, a virtual GPS satellite) (step S231). The processing for capturing virtual satellites is, for example, processing for demodulating the main channel. When a predetermined number (for example, four) of virtual satellites can be captured (step S232: Yes), the acquisition unit 461 returns to step S221 after executing WAIT (step S233), and restarts the processing for capturing navigation satellites. When the capturing is successful, the acquisition unit 461 transmits the timing information (for example, a timing signal such as a PPS signal or a GPS signal) to the AB selector.

When a predetermined number (for example, four) of virtual satellites cannot be captured (step S232: No), a determination is made whether or not a predetermined time has elapsed from the start of the capturing processing (step S234). When the predetermined time has not elapsed (step S234: Yes), the acquisition unit 461 returns to step S231 and continues the capture processing. When the predetermined time has elapsed (step S234: No), the acquisition unit 461 causes the processing to proceed to the GPS satellite capturing sequence.

The AB selector selects a valid sequence side. That is, the AB selector selects any one of the main channel demodulation sequence (first information) or the information (second information) acquired by the GPS satellite capturing sequence (step S241). For example, the AB selector selects the second information when the predetermined number of navigation satellites can be captured, and selects the first information when the predetermined number of navigation satellites cannot be captured.

The communication control unit 462 of the terminal device 40 controls transmission of LPWA transmission data on the basis of the control signal generated in step S214 and the information selected in step S241 (for example, timing information such as a PPS signal and a GPS signal) (step S251).

For example, when the communication control unit 462 can capture the predetermined number of navigation satellites, the communication control unit 462 controls communication in a predetermined communication scheme in which the first frequency band has been used, on the basis of the second information. On the other hand, when the communication control unit 462 cannot capture the predetermined number of navigation satellites, the communication control unit 462 controls communication in a predetermined communication scheme in which the first frequency band has been used, on the basis of the timing information included in the first information.

Further, when the communication control unit 462 receives an instruction to stop the radio wave transmission in which the first frequency band has been used, as control information, the communication control unit 462 stops radio wave transmission in which the first frequency band has been used.

When the transmission is completed, the control unit 46 of the terminal device 40 ends the transmission processing.

4. CONCLUSION OF EMBODIMENT 1

As described above, according to the embodiment of the present disclosure, the communication device (for example, the terminal device 40) acquires information for communication in which a predetermined unlicensed band (for example, 920 MHz band), in which a plurality of communication schemes can be mixed, has been used (for example, the timing information and/or the control information) from another frequency band (for example, 200 MHz band) different from the predetermined unlicensed band. The communication device controls communication (for example, LPWA communication) in a predetermined communication scheme in which a predetermined unlicensed band has been used, on the basis of the acquired information.

This allows a plurality of communication devices that use different communication schemes in a predetermined unlicensed band to cooperate. As a result, effective utilization of wireless resources is realized.

Further, broadcast waves using power of tens of kW of the broadcasting station enables communication control of wireless communication in a band different from the broadcast waves.

Further, the timing information is carried on the main channel, making it possible to provide a mechanism for realizing LPWA transmission aligned in a time axis direction even when a wireless communication standard differs, using the timing obtained from the timing information.

Further, in the present embodiment, another frequency band (for example, 200 MHz band) is divided into a main channel and a sub-channel. A mechanism for carrying information that can be used for general purposes on the main channel and giving individual information for various wireless communications to the sub-channel can be provided.

Further, in the present embodiment, various types of information are transmitted using the main channel or the sub-channel. This makes it possible, for example, to provide a mechanism capable of stopping wireless transmission at the time of disaster.

Further, since wideband radio is used for the main channel, the accuracy of timing information to be broadcast is improved.

Since the ephemeris information required for GPS demodulation, which is included in the main channel of the broadcasting station, becomes a fixed value, it is not necessary to update the ephemeris (from an expiration date to four hours), and a time until the GPS outputs position coordinates can be shortened.

5. EMBODIMENT 2

Next, a communication system 2 of embodiment 2 will be described.

5-1. Technical Background and Goals

[Related Art]

In an IoT era, various devices are connected to the Internet using a wireless technology. According to White Paper on Information and Communication (2017) of the Ministry of Internal Affairs and Communications, it is expected that a long-distance and low-power consumption wireless technology called low power wide area (LPWA) expands rapidly, and nearly 400 million wireless devices are used in 2021. Three-fourths of the devices are devices that use a license-free Industry Science Medical (ISM) band.

It is necessary for a large number of devices to establish wireless communication using a limited radio frequency band of the ISM band. Therefore, it is essential that each wireless device reduces a time for emitting radio waves to improve communication efficiency.

When there is downlink communication in which accurate time information is transferred to each wireless device, an oscillator inside each device can be calibrated. As a result, a frequency of wireless communication becomes correct, and a highly efficient (that is, short time) wireless communication scheme becomes possible. It is also possible to eliminate a useless signal (preamble) indicating start of transmission, which contributes to effective use of the frequency band through short-time communication.

Further, downlink communication makes it possible to control transmission conditions of wireless devices and improve communication efficiency.

However, in a current ISM band, there are restrictions such as an antenna power, transmission channel, and transmission time for downlink transmission. Therefore, it is difficult to transfer downlink communication to all devices.

[Goals]

Therefore, in the present embodiment, a goal is to realize downlink communication that enables accurate time information, control information from the system, and the like to be transferred to each device.

5-2. Transmission of Time Information (Related Art and Goals)

[Related Art]

A means for transferring time information wirelessly includes standard radio waves (JJY), and 50 kW radio waves are emitted from Fukushima and Saga prefectures. Further, frequencies of the radio waves used in Fukuoka and Saga prefectures differ as 40 kHz and 60 kHz, respectively, so that two radio waves do not interfere with each other. However, since JJY has a low radio wave frequency, a time accuracy of about one second can be only obtained. Further, there is a problem that radio waves cannot be received indoors and that device control information cannot be sent because the band is narrow.

Since JJY lacks accuracy, a GPS (called GNSS when systems other than those for the United States are included) is often used as a means for acquiring accurate time information. The GPS is configured of tens of artificial satellites orbiting the earth, and radio waves are captured from the artificial satellites, making it possible to accurately know a position (latitude and longitude) and time of a receiving point. The time accuracy is a high accuracy within one microsecond. However, since the artificial satellite is as far as 20,000 km, radio waves are weak and cannot be received indoors. Further, since the satellite is in orbit and is not stationary, the GPS receiver should acquire orbit information of the satellite over a long period of time (tens of seconds to one minute). There is also a problem that power consumption increases due to the reception of this orbit information.

Therefore, in the present embodiment, downlink broadcasting in which accurate time information is transmitted from a broadcasting base with strong radio waves is realized.

[Problems]

For such downlink broadcasting, it is required to solve four technical problems below.

(Problem 1) Area overlap problem
(Problem 2) Realization of high time accuracy
(Problem 3) Practical use with inexpensive reception device
(Problem 4) Operation in short time for realization of low power consumption (Problem 1: Area Overlap Problem)

Figure 15:
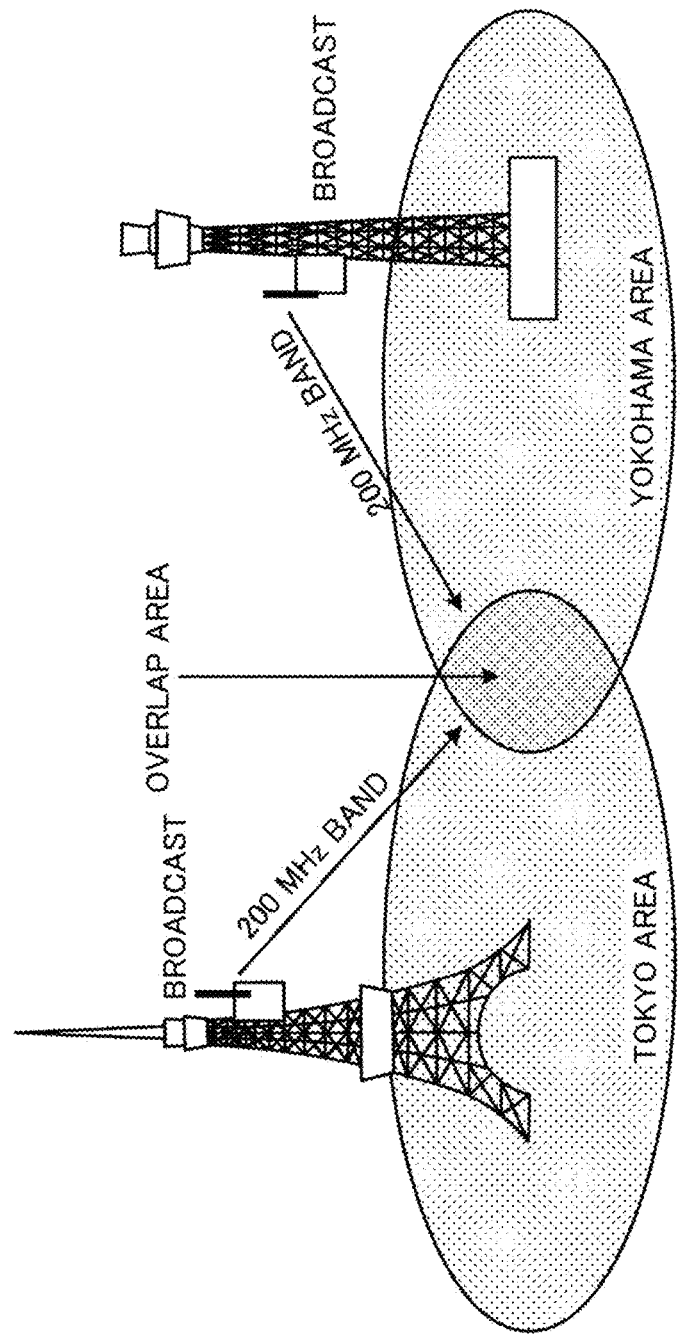
FIG. 15 is a diagram illustrating problem 1 of embodiment 2.

FIG. 15 is a diagram illustrating problem 1 of embodiment 2. In places in which radio waves from two or more broadcasting stations can be received (area overlap), radio waves interfere and cannot be received correctly. Since the radio waves from the broadcasting station are strong, the radio waves may reach far distances unexpectedly. Therefore, it is necessary for (A) frequency, (B) time, or (C) diffusion code to be changed depending on broadcasting stations.

(A) Frequency Changes Depending on Areas

When a narrow band is used, the number of channels can be increased, and a frequency channel is allocated to each broadcasting station for transmission, making it possible to prevent overlapping. However, a receiver has to scan many narrowband frequencies, which complicates a configuration. Further, since the band is narrowed (narrow band), time resolution is lowered and (Problem 2: High time accuracy) cannot be solved.

(B) Change in Transmission Time Depending on Areas

The problem of the area overlap can be solved by assigning a frame of transmission time to each area for transmission. However, since a receiver does not know a transmission timing, the receiver must continuously perform reception. Therefore, (Problem 4: Operation in short time) cannot be solved.

(C) Change in Diffusion Code Depending on Areas (the Present Embodiment)

It is possible to solve the problem of overlapping by adopting spectrum spreading and changing the diffusion code for each area. For example, the overlapping can be solved by adopting a spectrum spreading scheme in which BPSK of 1 Mbps has been used as a modulation scheme and changing the diffusion code for each area. In this case, the frequency band is expanded to 2 MHz.

(Problem 2: Realization of High Time Accuracy)

Figure 16:
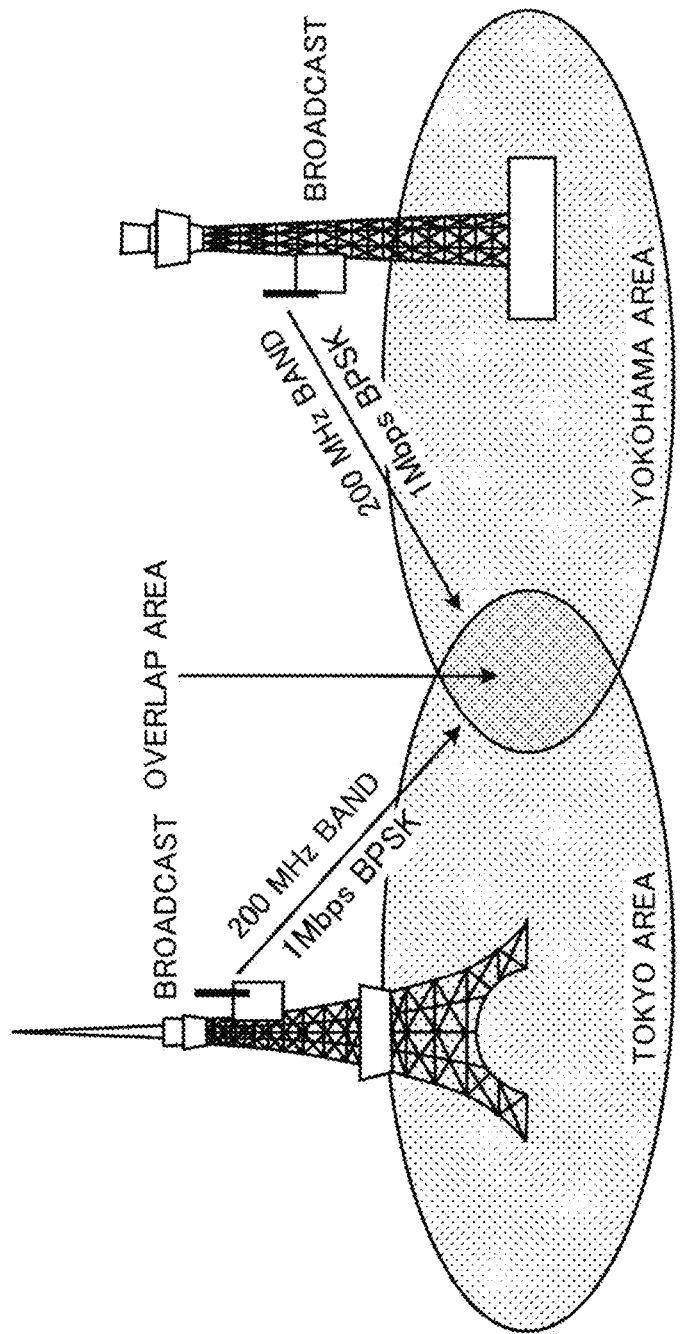
FIG. 16 is a diagram illustrating problem 2 of embodiment 2.

FIG. 16 is a diagram illustrating problem 2 of embodiment 2. Time accuracy is determined by a reciprocal of the frequency band. In the present embodiment, time accuracy of 1 microsecond is realized by adopting a spectrum spreading scheme in which BPSK of 1 Mbps has been used as a modulation scheme.

(Problem 3: An Inexpensive Reception Device is Allowed)

Figure 17:
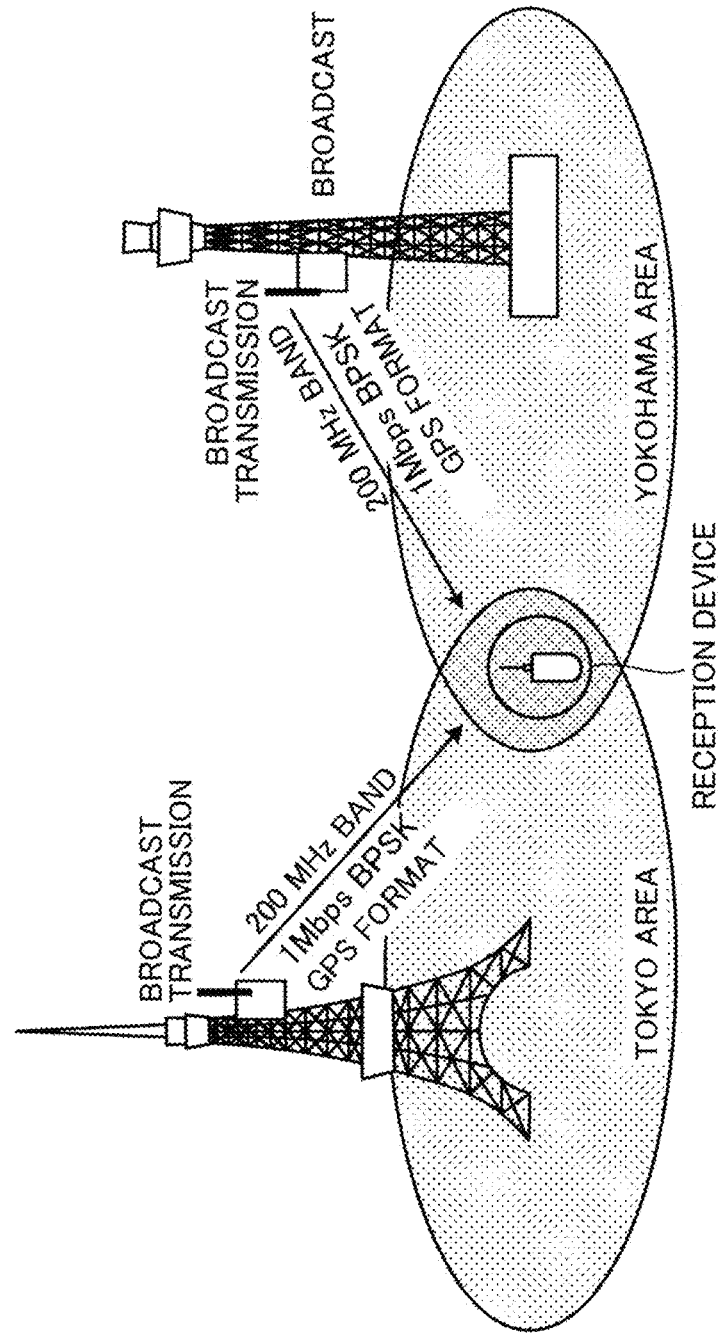
FIG. 17 is a diagram illustrating problem 3 of embodiment 2.

FIG. 17 is a diagram illustrating problem 3 of embodiment 2. In the present embodiment, a spectrum spreading scheme is adopted, and a GPS-compliant communication format is used. As a result, for a reception circuit in this scheme, a GPS reception circuit that is widely available on the market can be used as it is, and the price can be greatly reduced.

(Problem 4: Reception can be Performed in a Short Time)

Figure 18:
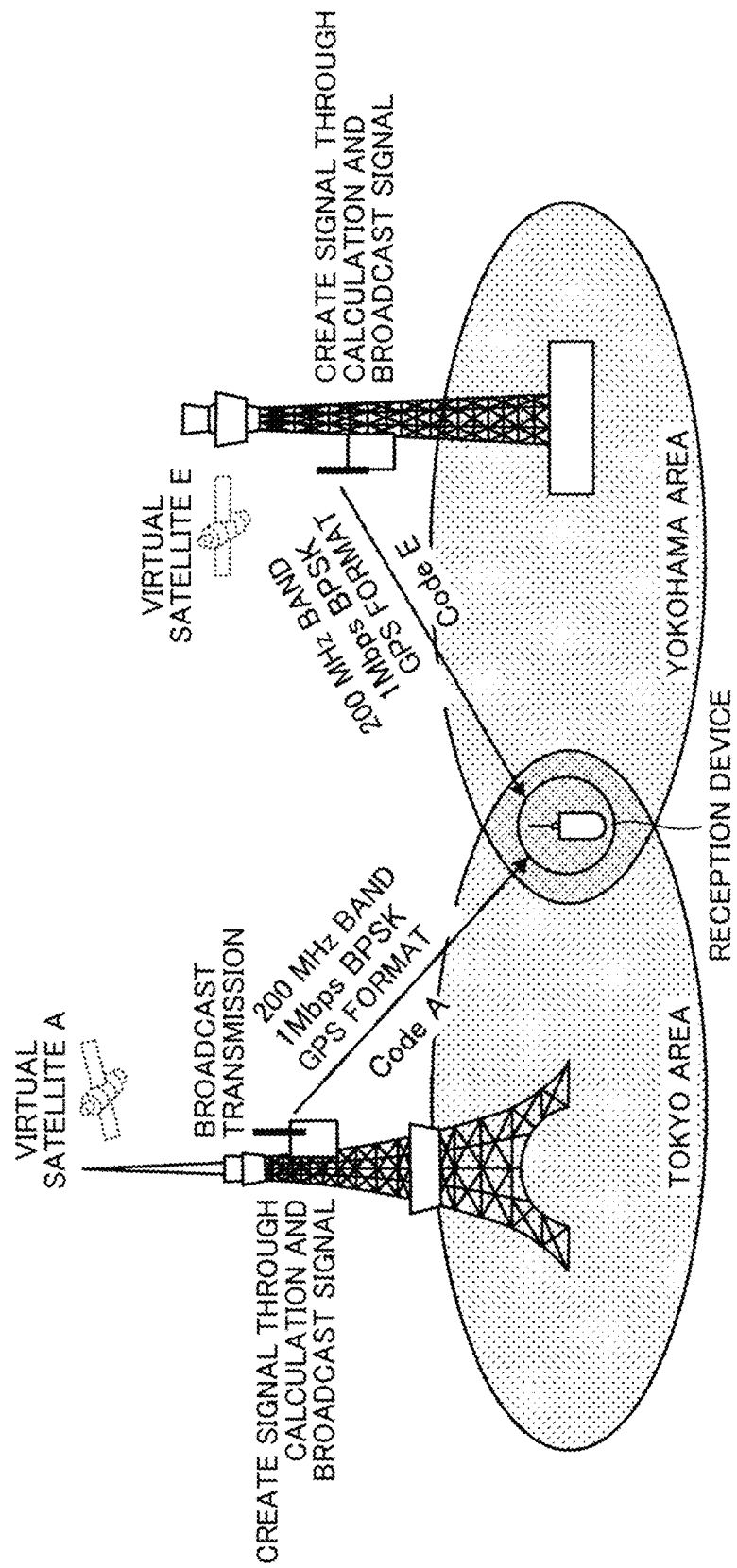
FIG. 18 is a diagram illustrating problem 4 of embodiment 2.

FIG. 18 is a diagram illustrating problem 4 of embodiment 2. In the present embodiment, a baseband signal of a GPS observed when radio waves from a pseudo-satellite is received at one point on the ground is created, converted into a high frequency band, and transmitted. Since the pseudo-satellite does not move, it is not necessary to acquire satellite orbit information, and the receiver can complete a reception operation in a short time. This makes it possible to reduce power consumption of the receiver.

5-3. System Configuration

Figure 19:
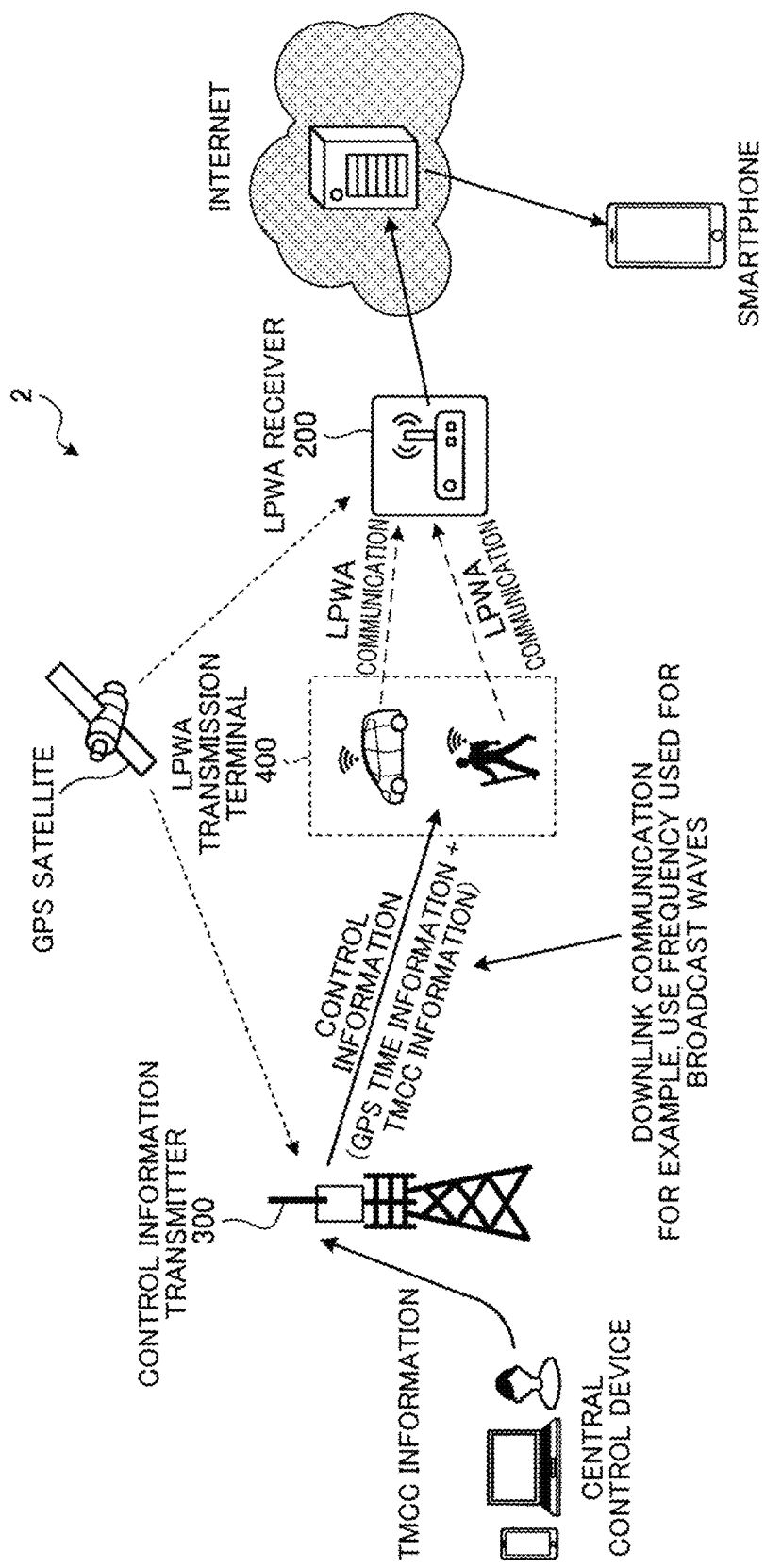
FIG. 19 is a diagram illustrating an example of a configuration of a communication system according to embodiment 2.

The problems of the present embodiment have been described above, and the configuration of the communication system 2 of embodiment 2 will be described hereinafter. FIG. 19 is a diagram illustrating an example of a configuration of the communication system 2 according to embodiment 2. Hereinafter, the configuration of the communication system 2 will be described with reference to FIG. 19. Description of the "communication system" can be replaced with other words such as a "control system".

[Overview of System]

The communication system 2 is a data transmission and reception system including a control information transmitter 300 that transmits the control information to the LPWA transmission terminal 400, an LPWA transmission terminal 400 that transmits data according to the control information, and a reception system (for example, an LPWA receiver 200) that receives data in synchronization with GPS time, and is an LPWA transmission terminal control system, wherein the control information includes the GPS time information.

Further, the communication system 2 is a data transmission control system, wherein the control information is transmitted through spectrum spreading and a frame timing of a spectrum spreading signal is synchronized with the GPS time.

Further, the communication system 2 is an LPWA transmission terminal control system, wherein the control information includes TMCC information indicating a disaster occurrence situation or a communication channel state.

Further, the communication system 2 is an LPWA transmission terminal control system, wherein the transmission carrier frequency of the control information transmitter 300 is 170 MHz or more and 220 MHz or less.

[Specific Example of Configuration of System]

An overview of the communication system 2 has been described, but a specific example of the configuration of the communication system 1 will be described hereinafter.

The communication system 2 includes the control information transmitter 300, the LPWA transmission terminal 400, and the LPWA receiver 200, as illustrated in FIG. 19. A central information control device may also be regarded as a part of the communication system 2.

(Central Information Control Device)

The central information control device notifies the control information transmitter 300 of disaster information in a case in which an earthquake, disaster, or the like occurs, communication channel information, or the like as the TMCC information. In embodiment 1, the control information transmitter 300 corresponds to, for example, the server device 10. Of course, the control information transmitter 300 is not limited to the server device 10.

(Control Information Transmitter)

The control information transmitter 300 receives radio waves from a GPS satellite orbiting the earth to obtain the GPS time information. The control information transmitter 300 collects the GPS time information and the TMCC information (disaster information obtained from a central control device, communication channel information, or the like) to create control information. The control information transmitter 300 spreads the control information as a spectrum spreading signal having a chip rate of 1.023 MHz, and transmits the control information in a frequency band (170 MHz to 220 MHz) in which broadcast waves have been used. In embodiment 1, the control information transmitter 300 corresponds to, for example, the broadcasting station device 30. Of course, the control information transmitter 300 is not limited to the broadcasting station device 30.

(LPWA Transmission Terminal)

The LPWA transmission terminal 400 is a transmission device that transmits information from various sensors using long-distance and low-bit rate communication. Here, a long-distance and low-bit rate wireless technology is generally called a low power wide area (LPWA). The LPWA transmission terminal 400 aims to transmit the information from various sensors as a payload using LPWA communication. In embodiment 1, the LPWA transmission terminal 400 corresponds to, for example, the terminal device 40. Of course, the LPWA transmission terminal 400 is not limited to the terminal device 40.

Before the LPWA communication is started, the LPWA transmission terminal 400 receives spectrum spreading radio waves transmitted from the control information transmitter 300 and decodes the control information. When the disaster information included in the control signal indicates "disaster", the LPWA transmission terminal 400 stops the transmission to give priority to wireless communication with a high priority A clock signal inside the LPWA transmission terminal 400 is calibrated using the GPS time included in the control information. As a result, the LPWA signal transmitted from the LPWA transmission terminal 400 accurately matches a carrier frequency expected by the LPWA receiver 200, thereby increasing a reception success probability of the LPWA receiver 200 and improving communication efficiency. Further, the LPWA transmission signal transmitted from the LPWA transmission terminal 400 is started to be transmitted at exactly the time expected by the LPWA receiver 200, thereby eliminating useless signals such as a preamble and improving communication efficiency. After performing such calibration, the LPWA transmission terminal 400 transmits information from various sensors as LPWA signals.

(LPWA Receiver)

The LPWA receiver 200 receives radio waves from the GPS satellites orbiting the earth and calibrates a clock signal inside the LPWA receiver 200. As a result, a reception frequency and reception timing of the LPWA receiver 200 are accurately synchronized with the GPS time.

That is, since the LPWA transmission terminal 400 is synchronized with the GPS time via the control information transmitter 300 and the LPWA receiver 200 is synchronized with the GPS time by directly receiving the radio waves from the GPS satellites, both transmission and reception are performed in synchronization with the GPS time, thereby improving the stability and efficiency of communication.

The LPWA signal received by the LPWA receiver 200 is displayed on a smartphone at the user's hand via a server on a network (for example, the Internet).

The LPWA receiver 200 corresponds to, for example, the base station device 20 in embodiment 1. Of course, the LPWA receiver 200 is not limited to the base station device 20.

The illustrated smartphone is merely an example, and may be replaced with another terminal device, such as a mobile phone, a smart device (a smartphone, tablet, or the like), a PDA, a personal computer, an M2M device, or an IoT device.

Further, the network is not limited to the Internet. The network may include, for example, a communication network (including the Internet) such as a regional Internet protocol (IP) network or a telephone network (for example, a fixed telephone network or a mobile phone network). In this case, the network may include a wired network or may include a wireless network.

Hereinafter, a configuration of each of the devices constituting the communication system 2 will be specifically described. The configuration of each device shown below is merely an example. The configuration of each device may differ from the configuration below.

5-4. Configuration of Control Information Transmitter

Figure 20:
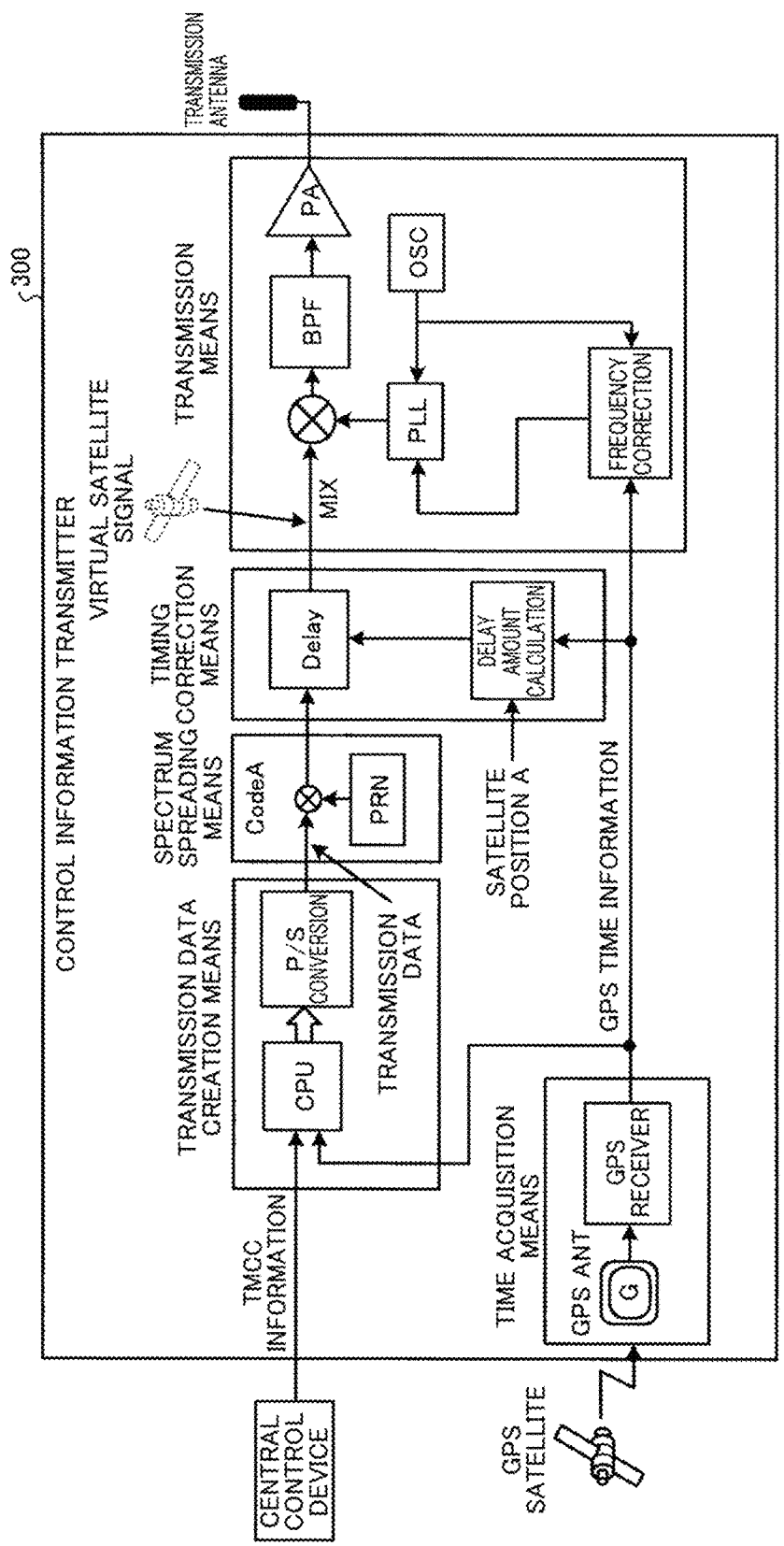
FIG. 20 is a diagram illustrating an example of a configuration of a control information transmitter according to embodiment 2.

First, a configuration of the control information transmitter 300 will be described. FIG. 20 is a diagram illustrating an example of a configuration of the control information transmitter 300 according to embodiment 2.

[Overview of Device]

The control information transmitter 300 is a transmission device including a time information acquisition means (time acquisition means), a transmission data creation means for creating control information including the time information, a spectrum spreading means that modulates the control information by spectrum spreading to create a modulated signal, a timing correction means that adjusts a timing of the modulated signal according to the time information, and a transmission means.

The control information transmitter 300 is a transmission device, wherein the time information acquisition means is a GPS receiver that receives radio waves from a GPS satellite (generally a GNSS satellite).

The control information transmitter 300 is a transmission device, wherein the timing correction means performs correction so that the modulated signal is synchronize with the GPS time.

The control information transmitter 300 is a transmission device, wherein the control information includes the TMCC information such as disaster information or communication channel information.

The control information transmitter 300 is a transmission device, wherein the transmission data creation means generates the time information as a 300-bit subframe, and a bit rate is 50 bps.

The control information transmitter 300 is a transmission device, wherein the spectrum spreading means has a chip rate of 1023 kHz and a spreading code length of 1023 chips.

The control information transmitter 300 is a transmission device, wherein the transmission means includes a frequency correction means for correcting the transmission carrier frequency on the basis of the time information.

The control information transmitter 300 is a transmission device, wherein a transmission carrier frequency of the transmission means is 170 MHz or more and 220 MHz or less.

[Specific Example of Configuration of Device]

An overview of the control information transmitter 300 has been described above, and a configuration of the control information transmitter 300 will be specifically described hereinafter.

The control information transmitter 300 includes a time acquisition means, a transmission data creation means, a spectrum spreading means, a timing correction means, and a transmission means, as illustrated in FIG. 20. In FIG. 20, MIX, PRN, BPF, and PA mean the following.

MIX: Mixer
PRN: Pseudo-Random Number
BPF: Band Pass Filter
PA: Power Amplifier

The configuration illustrated in FIG. 20 is a functional configuration, and a hardware configuration may be different from such a configuration. Further, functions of the control information transmitter 300 may be distributed and implemented in a plurality of physically separated configurations.

(Time Acquisition Means)

The time acquisition means receives a GPS satellite orbiting the earth using a GPS antenna and a GPS receiver and output a GPS time. The GPS time can be obtained with a high accuracy of 1 microsecond.

(Transmission Data Creation Means)

The transmission data creation means includes a CPU. The CPU adds 6 seconds to the obtained GPS time to create a time of week (TOW: 17 bits) and a week number (WN: 10 bits) of a transmission start time. Using the TOW and the WN, the GPS time at which transmission starts is designated in units of 6 seconds.

Figure 21:
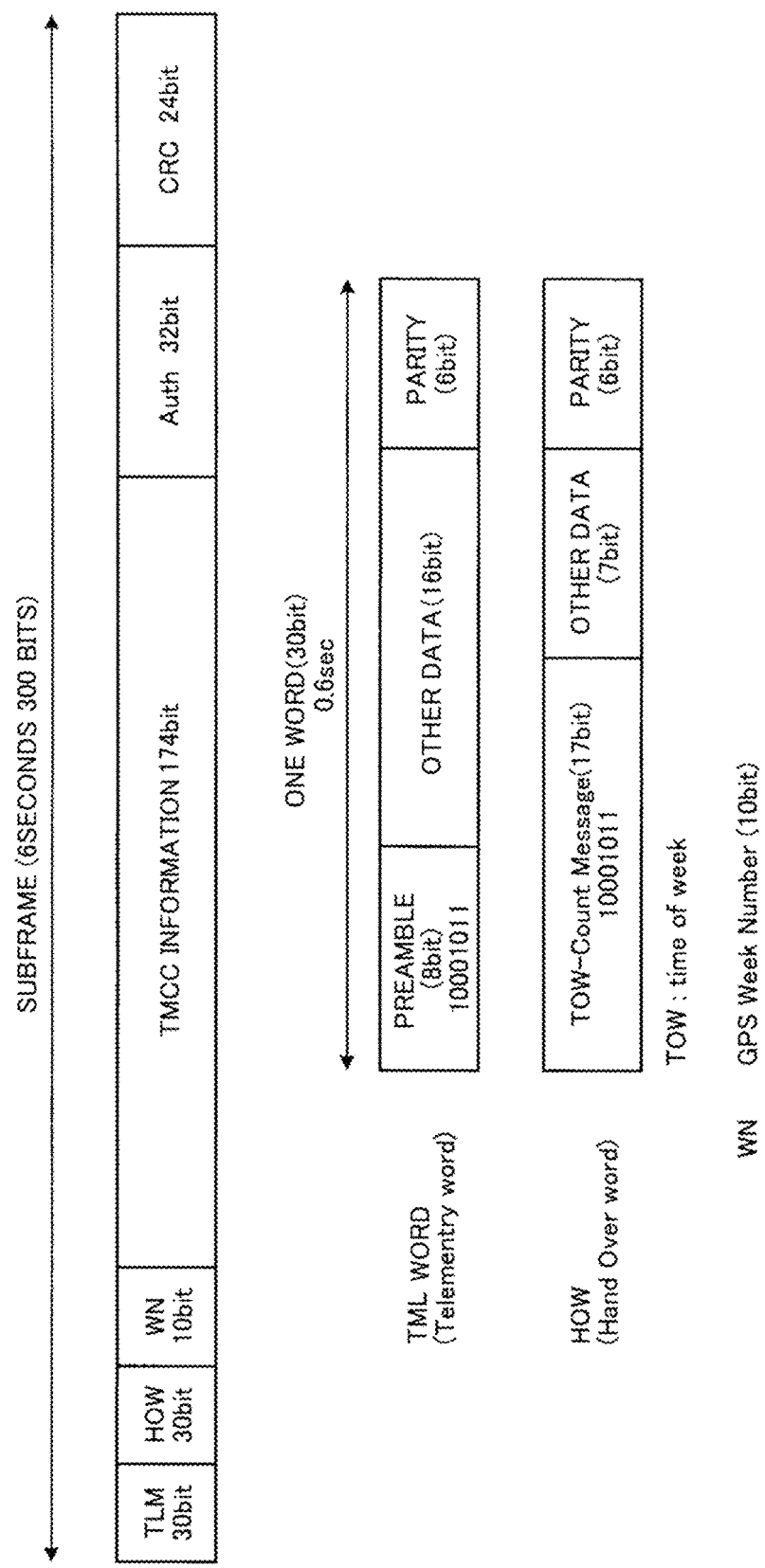
FIG. 21 is a diagram illustrating a configuration of a subframe generated by the control information transmitter.

The CPU adds TMCC information (174 bits), authentication data Auth (32 bits), and CRC (24 bits) to form a subframe (300 bits) as illustrated in FIG. 21. Here, transmission and multiplexing configuration control information (TMCC) is information indicating a disaster occurrence situation or a communication channel state. The TMCC can be used as information for controlling the LPWA transmission terminal. The authentication data Auth is a code for detecting that communication information has been tampered, and the CRC is a code for detecting an error occurring in a communication path.

TLM is 30-bit information composed of, for example, a header (10001011) and 6-bit parity. HOW is information in which the time of week (TOW) is stored at the beginning and a subsequent end is used as a parity, and indicates time every 6 seconds. The 10-bit week number (WN) is time information of year, month, and week.

The 300-bit subframe configured as described above becomes transmission data in 1-bit units due to a P/S converter and is supplied to the spectrum spreading means.

(Spectrum Spreading Means)

The spectrum spreading means multiplies 1 bit of the transmission data by a pseudo-random number sequence (PRN) repeatedly 20 times to increase the number of bits. Here, the PRN is a 1023-bit pseudo-random number sequence, and as a result, the 1-bit transmission data is expanded to 20460 symbols. A symbol rate is 1.023 Msymbol/sec.

(Timing Correction Means)

The timing correction means is configured of a FIFO memory (not illustrated), a delay line, or the like, and performs timing adjustment so that a transmission symbol is synchronized with the GPS time by giving a predetermined delay. That is, a delay amount is adjusted so that a timing of the radio waves transmitted from the control information transmitter 300 matches a timing at which the radio waves transmitted from the virtual GPS satellite have been received on the ground. Here, the virtual satellite is a non-existent satellite and a flight altitude of the virtual satellite is designated, making it possible to obtain, through calculation, a delay time when radio waves transmitted from the virtual satellite have been received on the ground.

When the time added to the GPS time in the transmission data creation means is 6 seconds, a radio wave transmission speed is C, and the flight altitude of the virtual satellite (a distance from the control information transmitter 300) is H, a delay amount D is calculated using Equation (1) below.

$$D=6 \text{ seconds}-(H/C)+\alpha \qquad (1)$$

Here, a is a delay time caused by electronic components of the control information transmitter 300.

Thus, the timing correction means adjusts the delay amount according to the set flight altitude of the virtual satellite. By controlling the delay time in this way, the radio waves transmitted from the control information transmitter 300 become radio waves as if the GPS satellites fly at an altitude H. Such radio waves are received by the GPS receiver so that correct time information can be obtained.

(Transmission Means)

Figure 22:
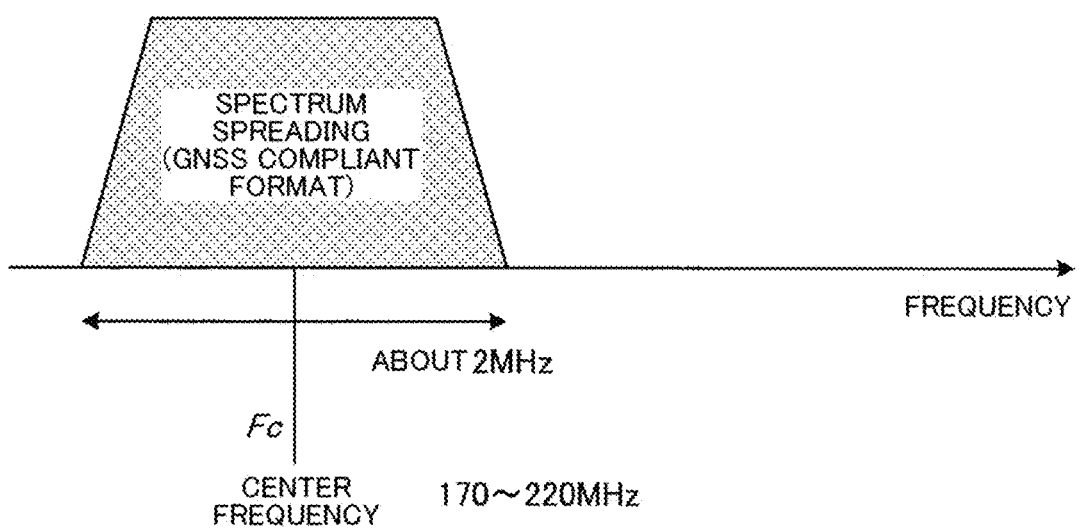
FIG. 22 is a diagram illustrating a spectrum of transmission waves.

The transmission means converts a reference clock supplied from a crystal oscillator (OSC) into a high frequency using a phase locked loop (PLL), and multiplies the clock by a transmission symbol using a mixer (MIX) to perform conversion into a high carrier frequency. Here, the carrier frequency is set to a VHF-High band (170 MHz to 220 MHz) of an old analog television, making it possible to transmit with high output using an available channel of television broadcasting. FIG. 22 is a diagram illustrating a spectrum of transmission waves. The spectrum is expanded when multiplied by the PRN, and has a band of about 2 MHz centered on a carrier frequency Fc, as illustrated in FIG. 22.

An oscillation frequency of the crystal oscillator (OSC) is counted according to a timing pulse from the GPS receiver so that a frequency deviation of the OSC can be obtained. This frequency deviation is fed back to the PLL circuit so that the frequency deviation of the OSC is canceled for transmission at a correct frequency.

5-5. Configuration of LPWA Transmission Terminal

Figure 23:
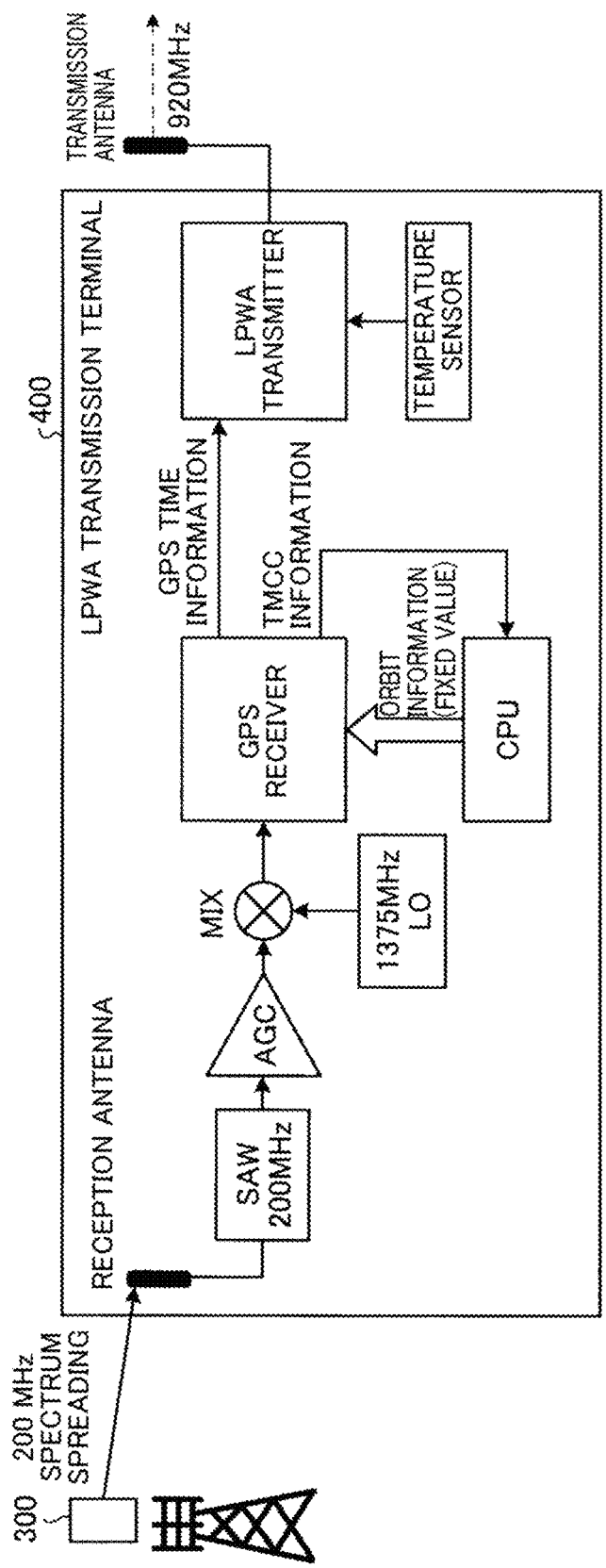
FIG. 23 is a diagram illustrating an example of a configuration of an LPWA transmission terminal according to embodiment 2.

Next, a configuration of the LPWA transmission terminal 400 will be described. FIG. 23 is a diagram illustrating an example of a configuration of the LPWA transmission terminal 400 according to embodiment 2. More specifically, FIG. 23 illustrates an example of a configuration of the LPWA transmission terminal 400 that transmits temperature information obtained from a temperature sensor as a long-distance low-bit rate radio (LPWA).

The radio waves transmitted from the control information transmitter 300 are converted into an electrical signal by a reception antenna, and only a signal component centered on the carrier frequency Fc is extracted by the SAW filter. In this example, the carrier frequency Fc is set to 200 MHz. A signal that has passed through the SAW filter is amplified to a constant amplitude by an AGC amplifier, multiplied by a local oscillator LO of 1375 MHz by a mixer (MIX), and frequency-converted into 1575 MHz. The signal transmitted from the control information transmitter 300 has the same signal format (spectrum spreading) as that used in the GPS, and is synchronized with the GPS time. Therefore, the radio waves received by the reception antenna are frequency-converted into 1575 MHz, making it possible to perform signal detection using the same semiconductor as that used in a commercially available GPS receiver. That is, since the spectrum-spread signal can be de-spread and decoded in the same manner as the radio waves from the GPS satellite, the subframe (300 bits) of the transmission data illustrated in FIG. 21 can be output.

As a result, the GPS time with 6-second accuracy can be obtained from TOW and WN information disposed near the beginning of the subframe. Further, the GPS time information with an accuracy of 1 microsecond is output according to a timing at which the subframe has been detected. The GPS time information is provided to the LPWA transmitter, making it possible for the LPWA transmitter to perform transmission at a frequency (920 MHz) synchronized with the GPS time and a timing synchronized with the GPS time. Further, the disaster information transmitted as the TMCC information can be decoded from the subframe. When the disaster information is issued as the TMCC information, the CPU stops LPWA communication. In this way, the LPWA communication is controlled using control information so that valuable radio wave resources are provided for more important communication.

Here, orbit information of a satellite is required in order to operate the GPS receiver. In the present embodiment, since satellite position illustrated in FIG. 20 is fixed, the orbit information is a fixed value. Therefore, the CPU sends the orbit information having the fixed value stored in firmware of the CPU to the GPS receiver, so that the control information transmitted from the control information transmitter 300 can be received. In the present patent, since the acquisition of the orbit information can be omitted in this way, it is possible to receive the control information in a short time.

As described above, the LPWA transmission terminal 400 of the present patent can receive the control information transmitted from the control information transmitter 300 and control the LPWA transmission terminal 400 by simply adding a simple circuit to a commercially available GPS receiver.

5-6. Configuration of LPWA Receiver

Figure 24:
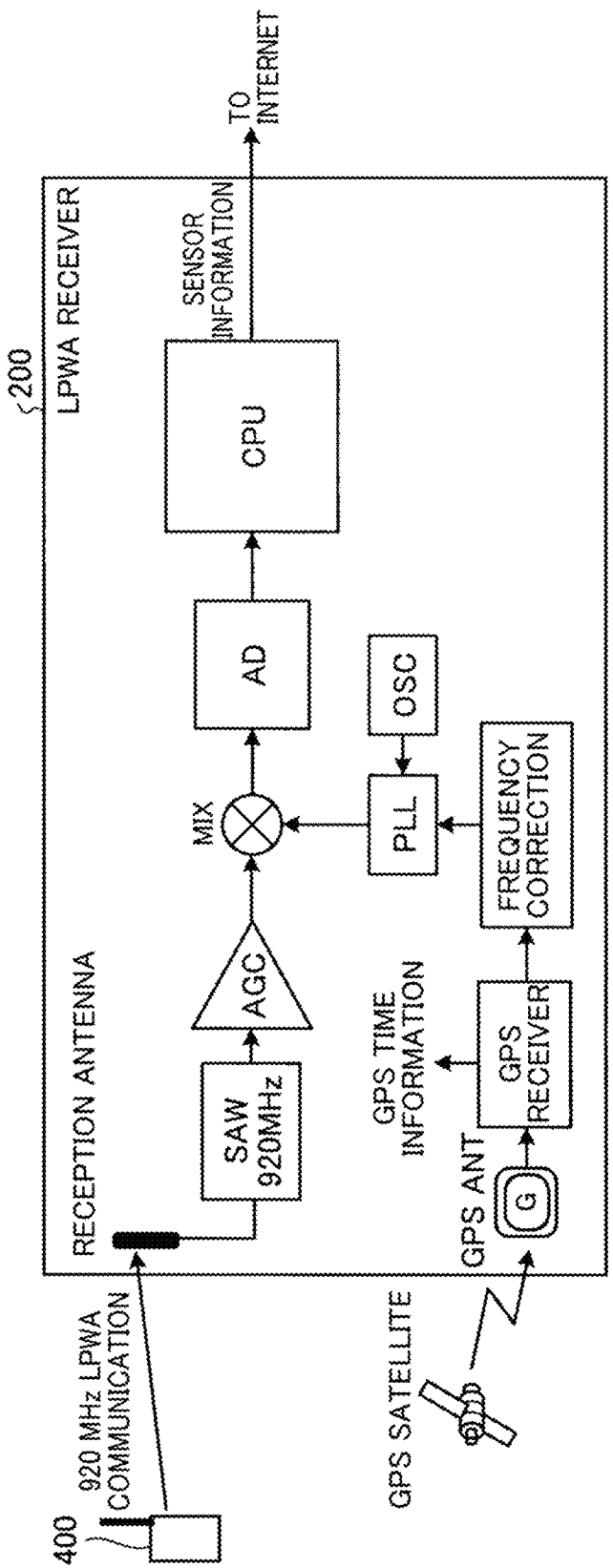
FIG. 24 is a diagram illustrating an example of a configuration of an LPWA receiver according to embodiment 2.

Next, a configuration of the LPWA receiver 200 will be described. FIG. 24 is a diagram illustrating an example of the configuration of the LPWA receiver 200 according to embodiment 2.

The LPWA receiver 200 receives radio waves from the GPS satellites orbiting the earth and calibrates the clock signal inside the LPWA receiver 200. As a result, a reception frequency and reception timing of the LPWA receiver 200 are accurately synchronized with the GPS time.

The oscillation frequency of the crystal oscillator (OSC) is counted according to the timing pulse from the GPS receiver so that the frequency deviation of the OSC can be obtained. This frequency deviation is fed back to the PLL circuit so that the frequency deviation of the OSC is canceled, local oscillation of a correct frequency (920 MHz) is performed, and supply to the mixer is performed. An LPWA radio signal at 920 MHz received by the reception antenna is amplified to a predetermined amplitude by the AGC amplifier after unnecessary radio waves have been removed by the SAW filter. An output of the AGC amplifier is multiplied by a local oscillation signal at 920 MHz by the mixer so that a baseband signal is obtained. The baseband signal is converted into a digital signal through AD conversion and subjected to decoding processing such as error correction by the CPU so that sensor information is decoded. This sensor information is displayed on a smartphone at the user's hand via a server on the Internet.

As described above, the LPWA receiver 200 is synchronized with the GPS time by directly receiving the radio waves from the GPS satellites. Since the LPWA transmission terminal 400 is synchronized with the GPS time via the control information transmitter 300 as described above, both transmission and reception are performed in synchronization with the GPS time, and stability and efficiency of communication are improved.

6. EMBODIMENT 3

Next, a communication system 3 of embodiment 3 will be described.

6-1. Problems and Solutions

A commercially available GPS receiver is configured to perform reception from at least four different satellites to obtain four pieces of unknown information (latitude, longitude, altitude, and time) and then output an accurate time.

In the embodiments described so far, the control information transmitter 300 is configured to transmit radio waves of one virtual satellite. Therefore, it is necessary to change firmware of the GPS receiver or the like so that the time information can be received from a signal of only one virtual satellite.

Therefore, in the present embodiment below, radio waves of four virtual satellites are combined and transmitted from one broadcasting station. This makes it possible to reduce a cost through reduction of modification of the receiver.

6-2. System Configuration

Figure 25:
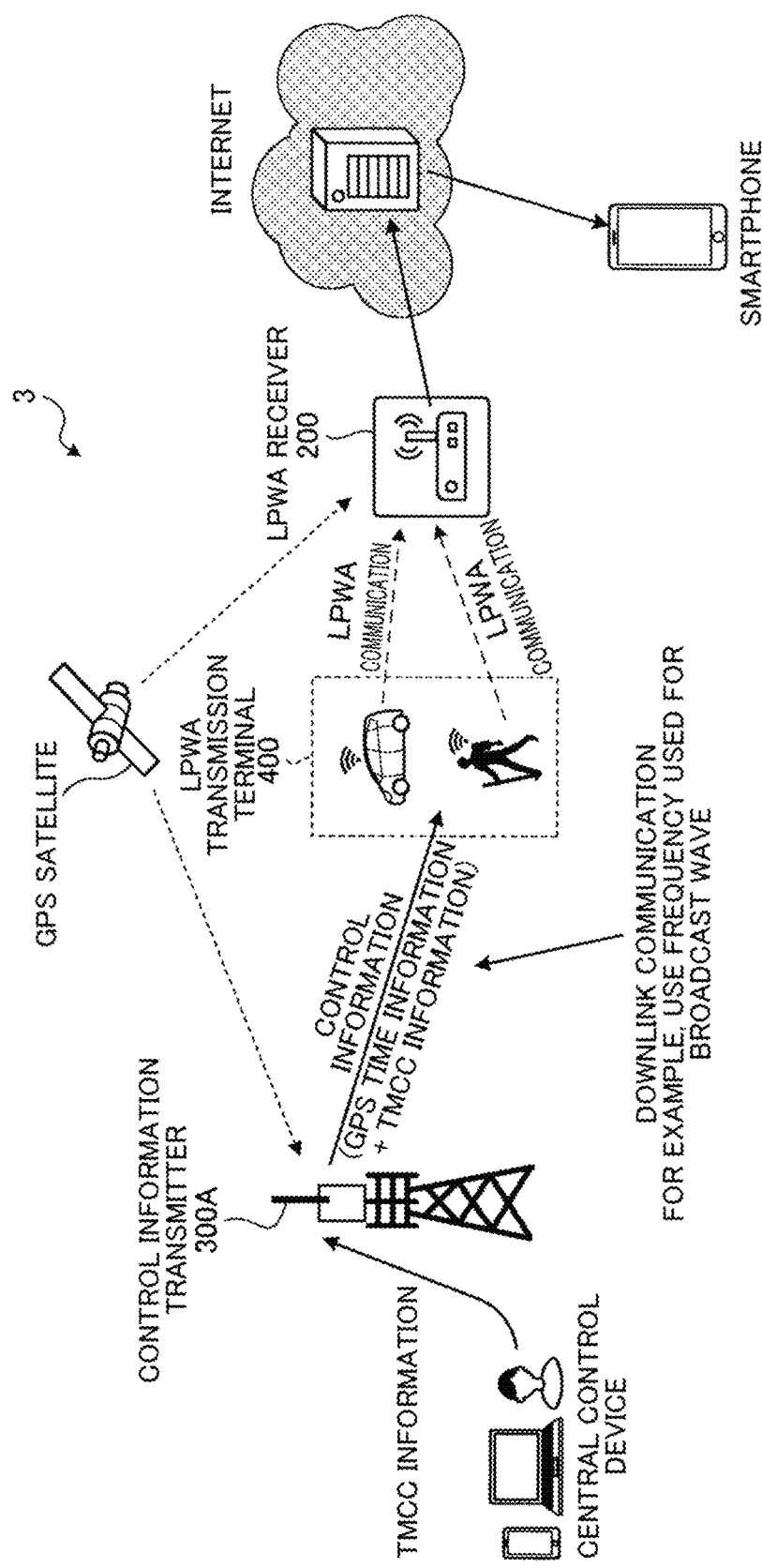
FIG. 25 is a diagram illustrating an example of a configuration of a communication system according to embodiment 3.

The problems and solutions of the present embodiment have been described above, and a configuration of the communication system 3 of embodiment 3 will be described hereinafter. FIG. 25 is a diagram illustrating an example of a configuration of the communication system 3 according to embodiment 3. Hereinafter, the configuration of the communication system 2 will be described with reference to FIG. 25. Description of the "communication system" can be replaced with other words such as a "control system".

The communication system 3 includes a control information transmitter 300A, an LPWA transmission terminal 400, and an LPWA receiver 200, as illustrated in FIG. 25. The central information control device may also be regarded as a part of the communication system 2. The communication system 3 differs from the communication system 2 illustrated in FIG. 19 in that the control information transmitter 300 is the control information transmitter 300A. Configuration of the devices other than the control information transmitter 300A is the same as that of the communication system 2.

6-3. Configuration of Control Information Transmitter

Figure 26:
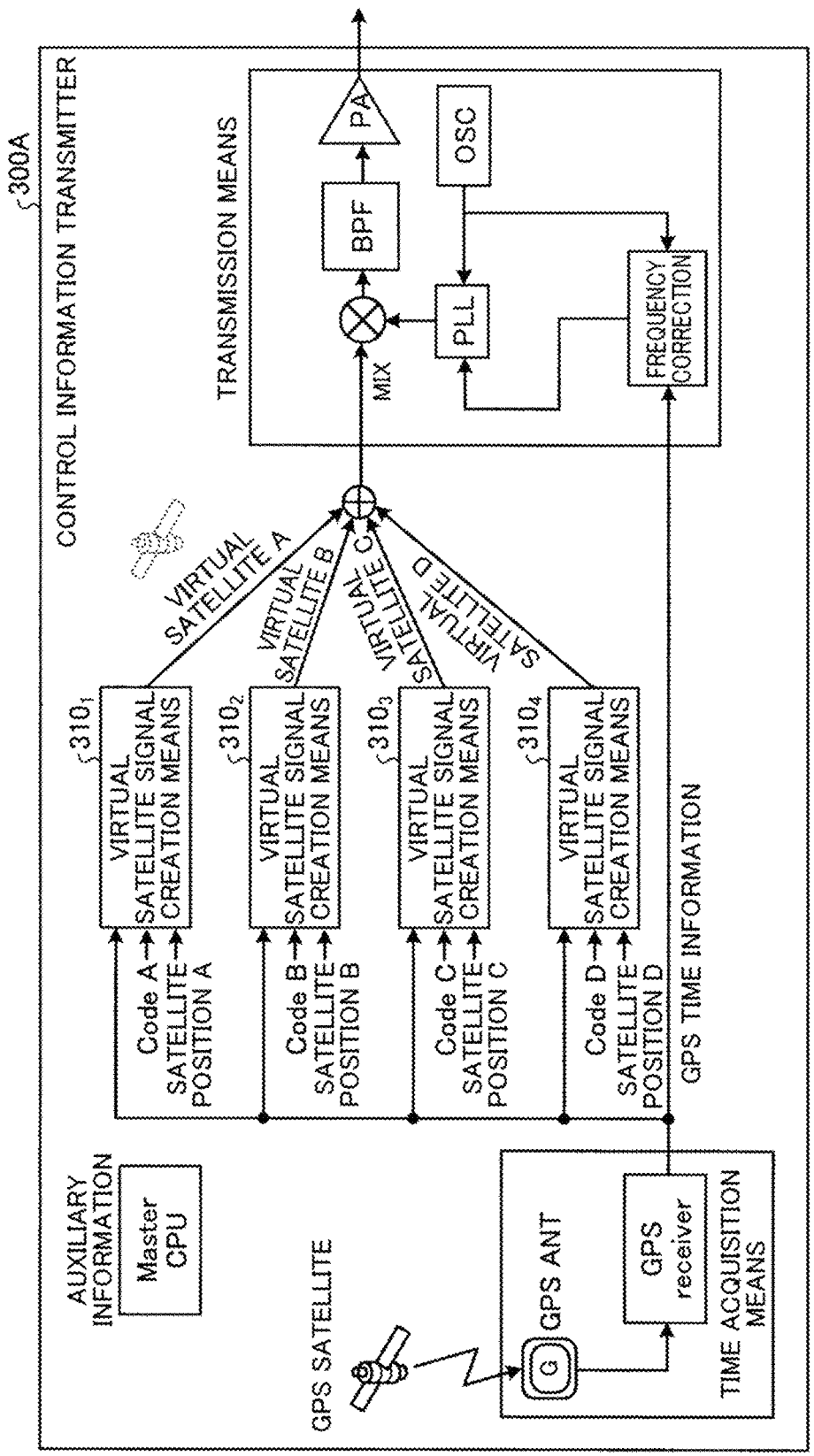
FIG. 26 is a diagram illustrating an example of a configuration of a control information transmitter according to embodiment 3.

Hereinafter, a configuration of the control information transmitter 300A will be described. FIG. 26 is a diagram illustrating an example of a configuration of the control information transmitter 300A according to embodiment 3.

In embodiment 3, radio waves equivalent to GPS radio waves from the four virtual satellites received at one point on the ground are created and transmitted by the broadcasting station. This makes it possible to acquire the GPS time information using a commercially available GPS receiver as it is.

Therefore, the control information transmitter 300A illustrated in FIG. 26 is configured to combine and transmit signals from four virtual satellites A, B, C, and D. Here, for four virtual satellite signals, different satellite positions and different diffusion codes PRN are used.

Figure 27:
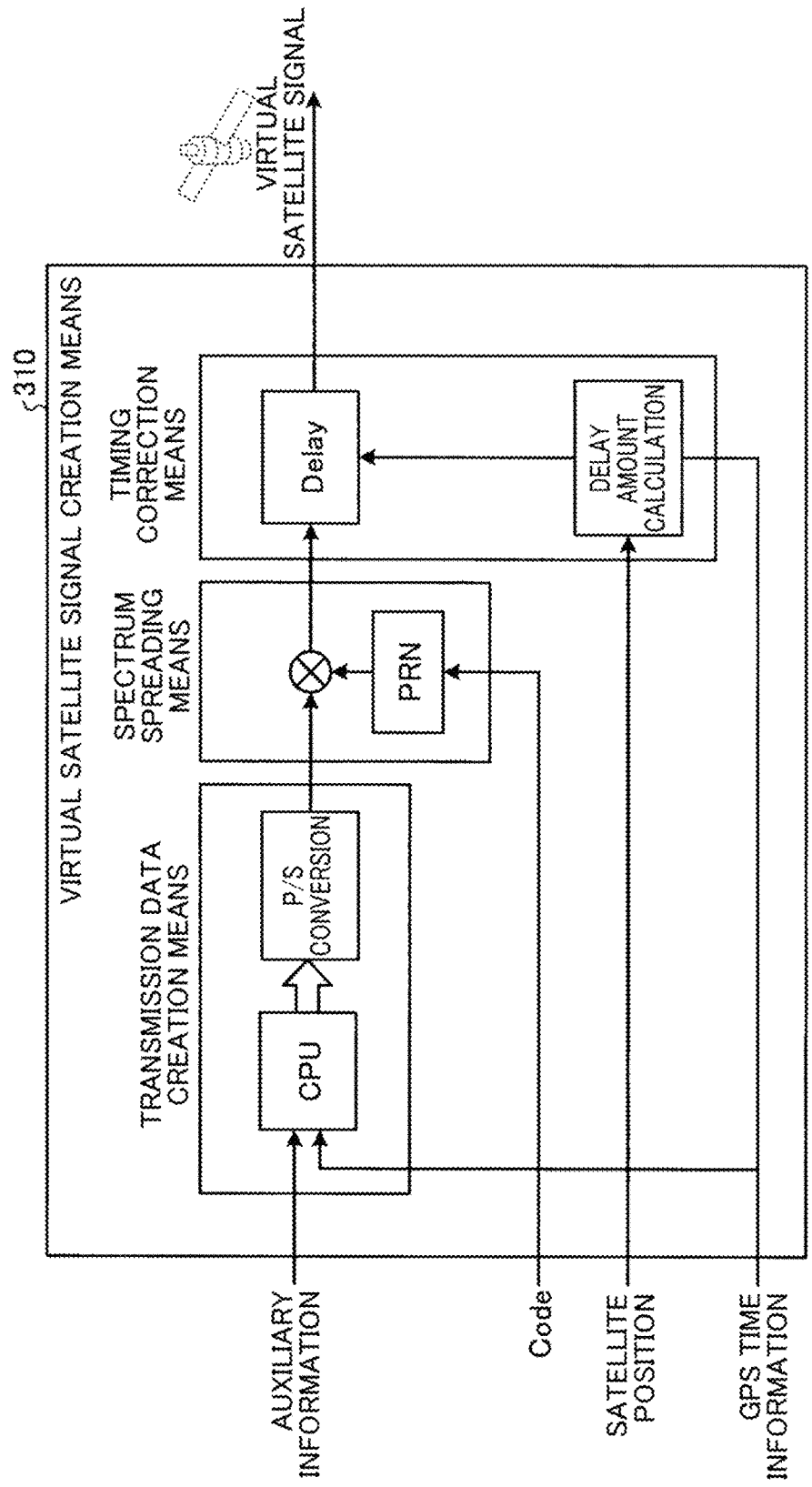
FIG. 27 is a diagram illustrating an example of a configuration of a virtual satellite signal creation means.

The signal from the virtual satellite is created by each of four virtual satellite signal creation means 3101 to 3104. FIG. 27 is a diagram illustrating an example of a configuration of the virtual satellite signal creation means 310. The virtual satellite signal creation means 310 illustrated in FIG. 27 is a block in which the transmission data creation means, the spectrum spreading means, and the timing correction means are put together. Since each means included in the virtual satellite signal creation means 310 is configured in the same manner as described with reference to FIG. 20, description thereof will be omitted.

7. EMBODIMENT 4

Next, a communication system 4 of embodiment 4 will be described.

7-1. Overview of Embodiment 4

In the present embodiment, control information is transmitted for each purpose in order to individually support various applications.

In the present embodiment, a thermometer that transmits measured values to the Internet will be described.

With this thermometer, for example, a temperature measurement interval can be changed according to a request of the farmer.

7-2. System Configuration

Figure 28:
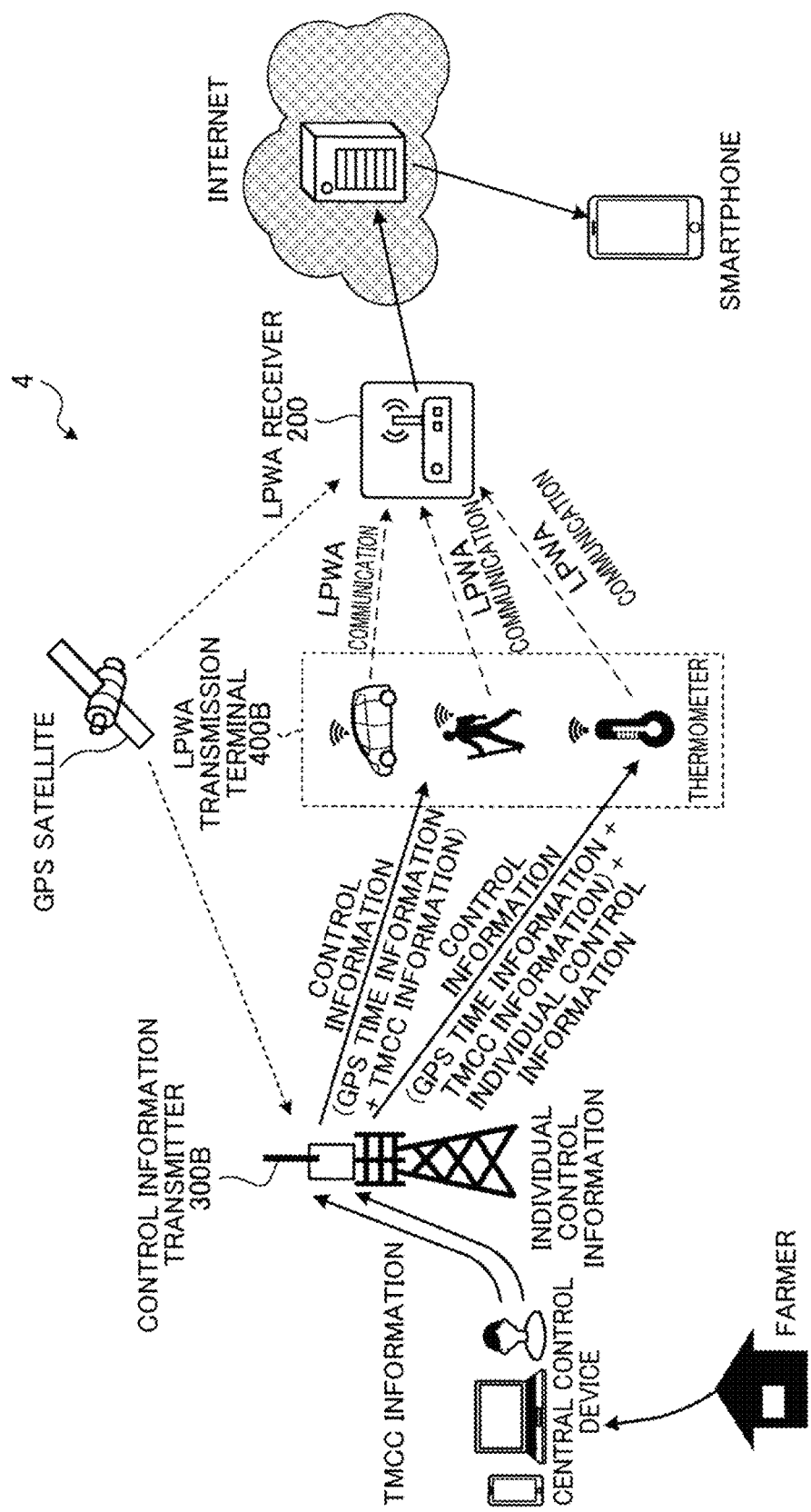
FIG. 28 is a diagram illustrating an example of a configuration of a communication system according to embodiment 4.

An overview of the present embodiment has been described above, and a configuration of the communication system 4 of embodiment 4 will be described hereinafter. FIG. 28 is a diagram illustrating an example of a configuration of the communication system 4 according to embodiment 4. Hereinafter, the configuration of the communication system 4 will be described with reference to FIG. 28. Description of a "communication system" can be replaced with other words such as a "control system".

In recent years, the Internet has also been introduced in agriculture and, for example, a thermometer is installed in an agricultural house and a temperature of the house is monitored using LPWA communication. In such a case, it is required to frequently transmit a temperature measurement result, for example, in a seedling raising period. Therefore, in the present embodiment, a system capable of changing a LPWA transmission interval is provided according to a request from a farmer or the like.

The communication system 4 includes a control information transmitter 300B, an LPWA transmission terminal 400B, and an LPWA receiver 200, as illustrated in FIG. 28. The central information control device may also be regarded as a part of the communication system 2. The communication system 4 differs from the communication system 2 illustrated in FIG. 28 in that the control information transmitter 300 is the control information transmitter 300A, and the LPWA transmission terminal 400 and the LPWA transmission terminal 400B. In the example of FIG. 28, a thermometer is included as the LPWA transmission terminal 400B. Further, a central control device is configured to receive various instructions from the farmer. A configuration thereof is the same as that of the communication system 2.

7-3. Spectrum of Transmission Waves

Figure 29:
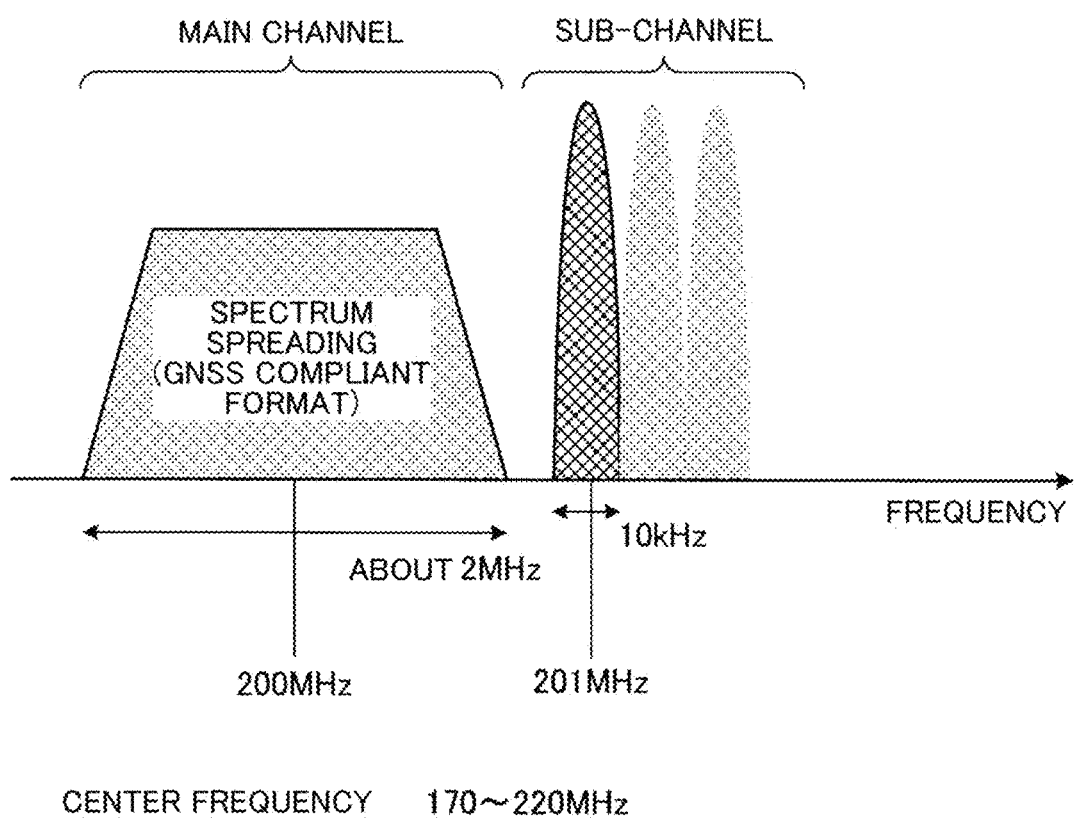
FIG. 29 is a diagram illustrating a spectrum of transmission waves.

In FIG. 28, a measured value transmission interval indication from a farmer is sent as individual control information to the control information transmitter 300B via the central control device. The control information transmitter 300B transmits control information (the GPS time information and the TMCC information) using a wide-band spectrum spreading scheme as described in the previous embodiments. FIG. 29 is a diagram illustrating a spectrum of transmission waves. In the example of FIG. 29, the spectrum of the transmission waves is shown as a main channel.

Here, in the TMCC information, a communication scheme of the sub-channel is transmitted as the communication channel information (information such as a transmission frequency and a modulation scheme). Therefore, in the present embodiment, individual control information is added to the sub-channel and broadcast.

7-4. Configuration of Control Information Transmitter

Figure 30:
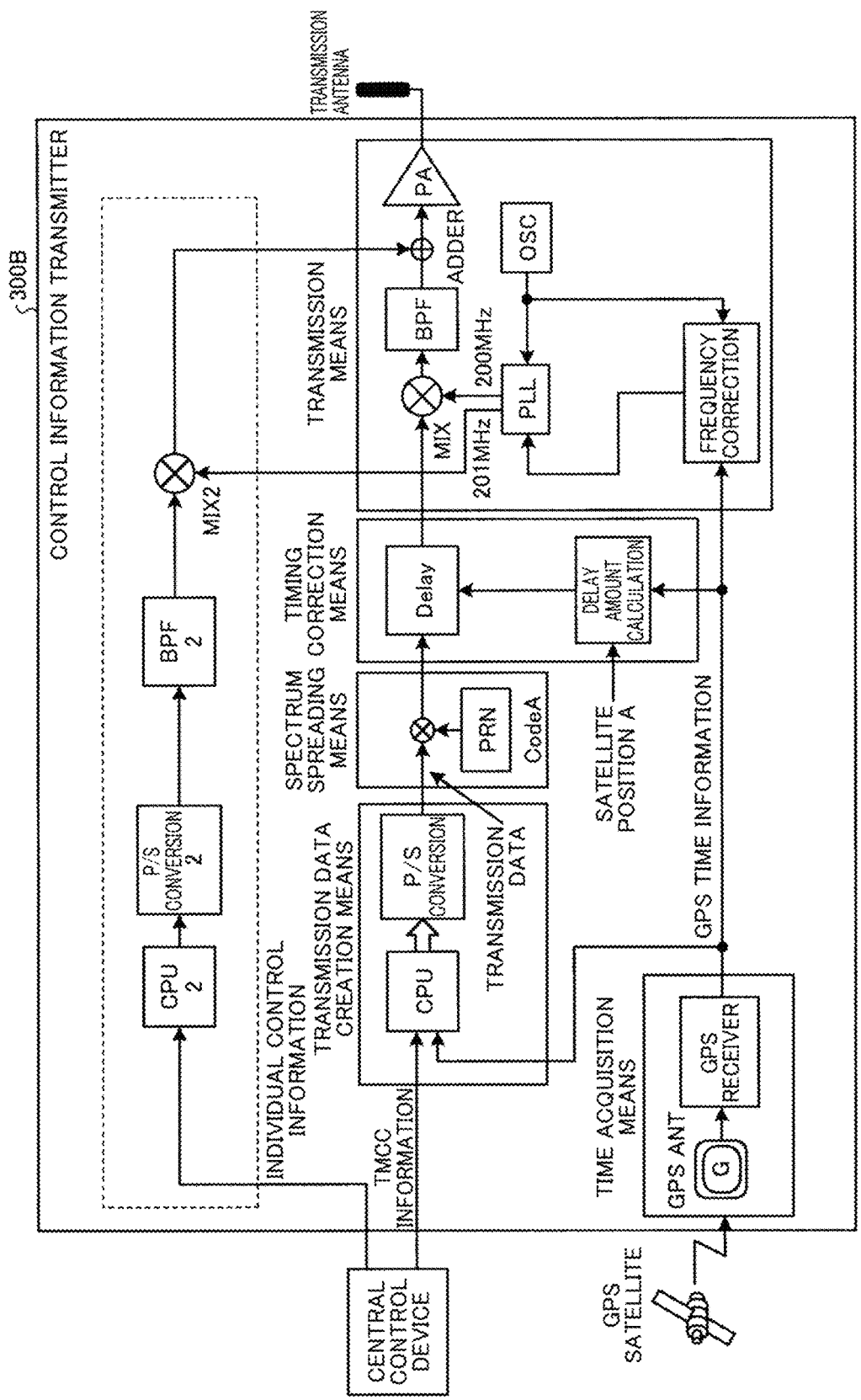
FIG. 30 is a diagram illustrating an example of a configuration of a control information transmitter according to embodiment 4.

Next, a configuration of the control information transmitter 300B will be described. FIG. 30 is a diagram illustrating an example of a configuration of the control information transmitter 300B according to embodiment 4.

The configuration of the control information transmitter 300B differs from that of the control information transmitter 300 illustrated in FIG. 20 in that a configuration of a portion surrounded by a broken line is added. The configuration of the portion surrounded by the broken line enables the control information transmitter 300B to transmit individual control information.

As described above, the measured value transmission interval indication from the farmer is sent as the individual control information to the control information transmitter 300B via the central control device. The control information transmitter 300B transmits the control information transmitted from the central control device to the LPWA transmission terminal 400B.

7-5. Configuration of LPWA Transmission Terminal

Figure 31:
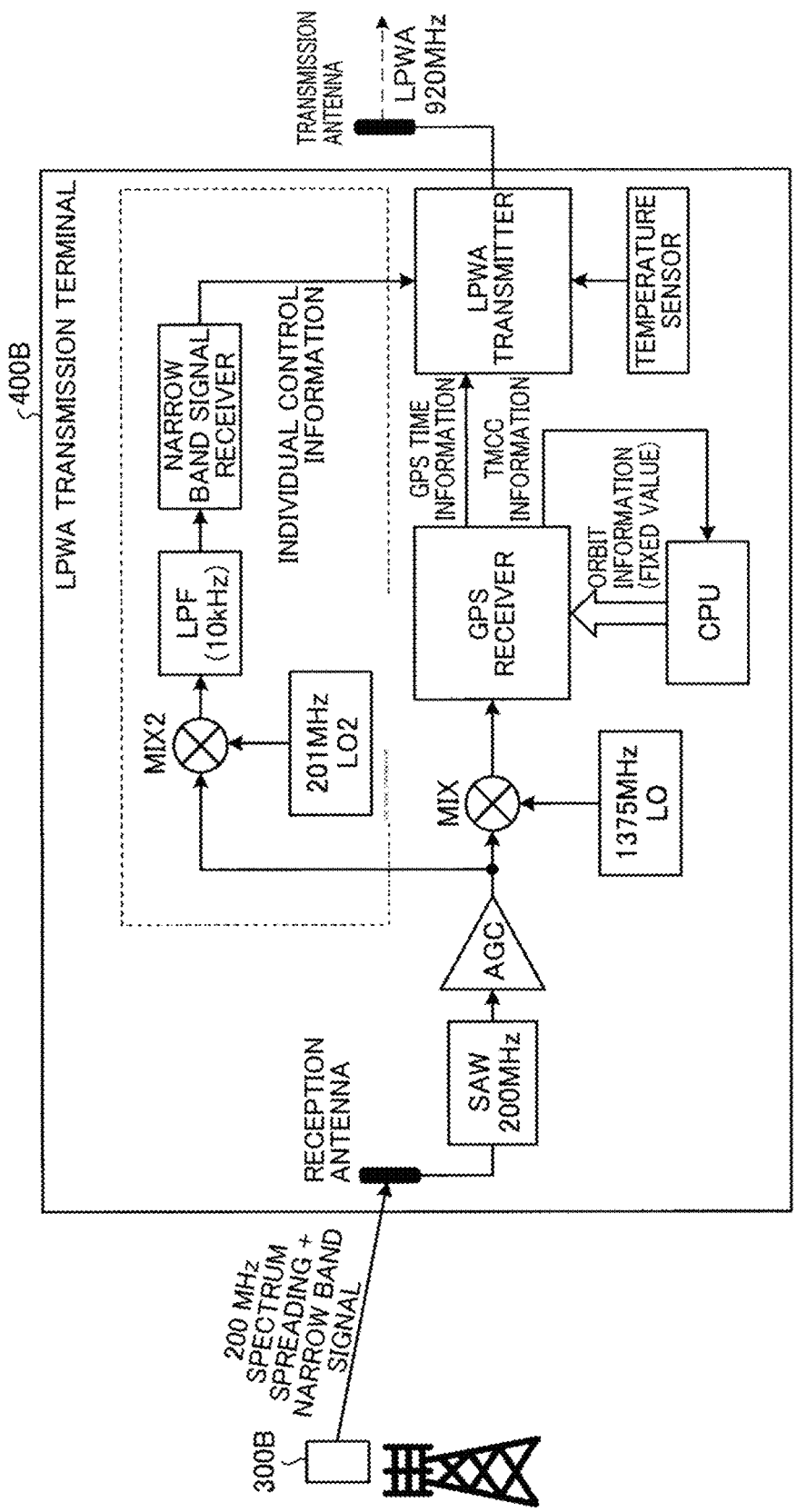
FIG. 31 is a diagram illustrating an example of a configuration of an LPWA transmission terminal according to embodiment 4.

Next, a configuration of the LPWA transmission terminal 400B will be described. FIG. 31 is a diagram illustrating an example of a configuration of the LPWA transmission terminal 400B according to embodiment 4. The LPWA transmission terminal 400B is, for example, a thermometer installed in a house (for example, in a polyhouse). The LPWA transmission terminal 400B receives the individual control information broadcast from the control information transmitter 300B.

The configuration of the LPWA transmission terminal 400B differs from that of the LPWA transmission terminal 400 illustrated in FIG. 23 in that a configuration of a portion surrounded by a broken line is added. The LPWA transmission terminal 400B can acquire the individual control information using the configuration of the portion surrounded by the broken line.

The LPWA transmission terminal 400B installed in the house receives the sub-channel to obtain the individual control information and changes the LPWA transmission interval. As a result, temperature information can be frequently delivered to the terminal device (for example, a smartphone) at the user's hand in the seedling raising period. Further, when the seedling raising period ends, the LPWA transmission interval is lengthened so that interference can be reduced.

8. MODIFICATION EXAMPLE

Each of the above-described embodiments illustrates an example, and various changes and applications are possible.

8-1. Modification Example of Embodiment

For example, although the broadcast waves for performing frequency conversion of the main channel into a broadcast band to obtain timing (time) information are transmission waves from a terrestrial broadcasting station in the above-described embodiment, the following waves maybe adopted.
(1) GPS transmission waves.
(2) Radio waves for reporting standard frequency (radio clock).
(3) Radio waves of satellite-based augmentation system (SBAS).
(4) Radio waves of ground-based augmentation system (GBAS) (operated in a VHF-Low band).

Further, information that is transmitted using the main channel may include control information for instructing all terminal devices 40 (for example, IoT terminals) using this broadcast waves to stop transmission, in addition to the timing information. There is a problem of a security only from the control from the main channel, and final terminal control (for example, an IoT terminal) may be performed in combination with the control information from the sub-channel.

Further, information that is transmitted using the main channel may include data that can be used for shortening of a Time To First Fix (GPS initial position calculation time; TTFF) according to ephemeris information, almanac information, or the like that is used in a GPS, in addition to the timing information.

Further, one of the sub-channels may be used as a standard frequency reporting service (radio clock).

8-2. Application Example of Embodiment

Different diffusion codes may be used in a plurality of broadcasting station devices 30.

In this case, when the terminal device 40 (for example, the IoT terminal) can receive the broadcast waves (for example, the timing signals included in the broadcast waves) of the three broadcasting station devices 30, a position of the receiving point can be known.

Figure 32:
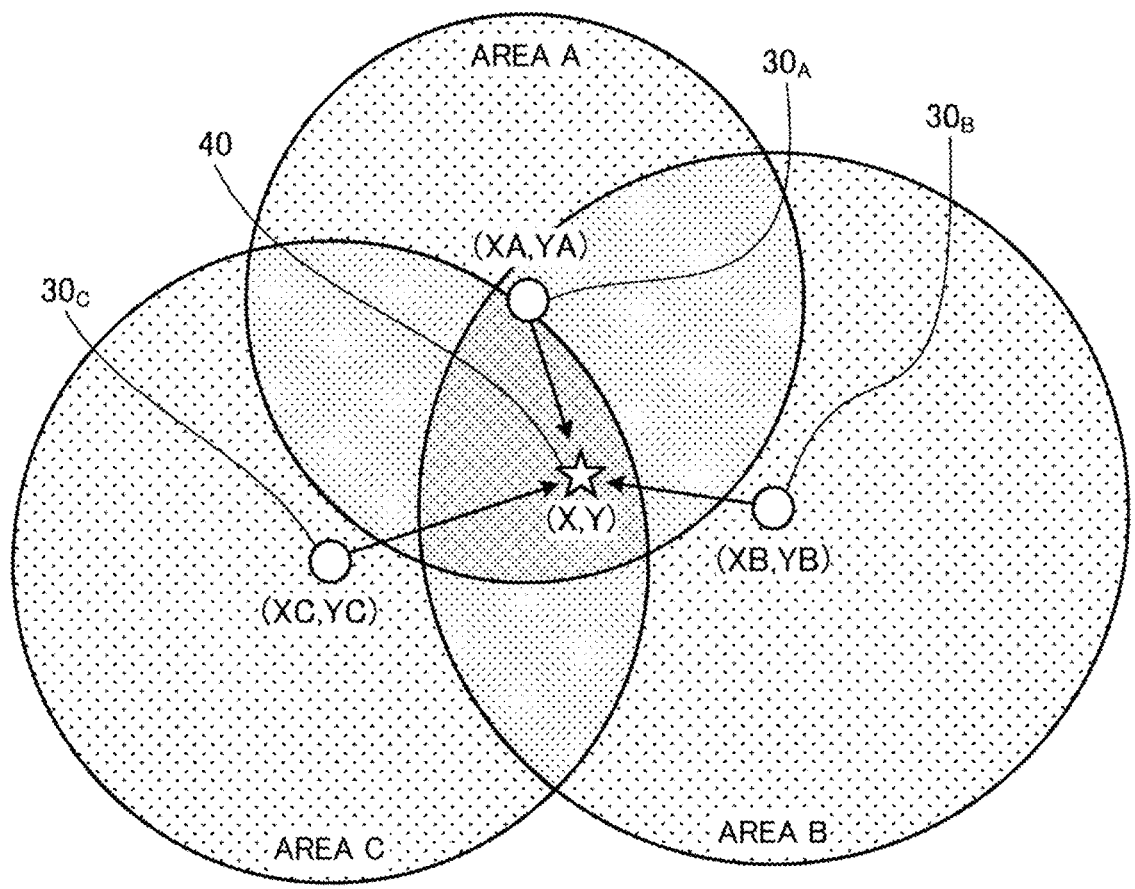
FIG. 32 is a diagram illustrating measurement of a position of a terminal device using radio waves of a broadcasting station device.
Figure 33:
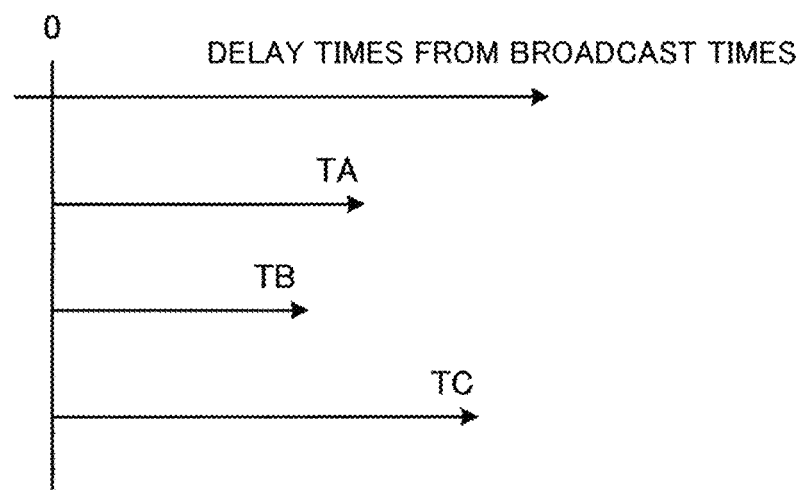
FIG. 33 is a diagram illustrating measurement of a position of a terminal device using radio waves of a broadcasting station device.

FIGS. 32 and 33 are diagrams illustrating position measurement of the terminal device 40 that uses the radio waves of the broadcasting station device 30. It is assumed that areas in which broadcast waves of the respective broadcasting station devices $30_A$ to $30_C$ can be received are areas A to C as illustrated in FIG. 32. Positions of the broadcasting station devices $30_A$ to $30_C$ are (XA, YA), (XB, YB), and (XC, YC), respectively. It is assumed that the terminal device 40 is located in an area in which all of the areas A to C are included.

Here, it is assumed that the terminal device 40 can separate the broadcast waves from the broadcast station devices $30_A$ to $30_C$, and can detect that delay times from broadcast times is TA, TB, and TC as illustrated in FIG. 33.

In this case, a position (X, Y) of the terminal device 40 can be semi-determined by solving a simultaneous equation shown below.

$$\sqrt{[(XA-X)^2+(YA-Y)^2]}-\sqrt{[(XB-X)^2+(YB-Y)^2]}=c(TA-TB)$$

$$\sqrt{[(XB-X)^2+(YB-Y)^2]}-\sqrt{[(XC-X)^2+(YC-Y)^2]}=c(TB-TC)$$

$$\sqrt{[(XC-X)^2+(YC-Y)^2]}-\sqrt{[(XA-X)^2+(YA-Y)^2]}=c(TC-TA)$$

Here, c is a radio wave propagation velocity.

This position measurement method can be used for indoor position measurement, for example.

8-3. Other Communication Systems

In the communication systems 1 to 4, information to be transmitted and received is arbitrary. For example, the terminal device 40 (LPWA transmission terminals 400 and 400B) may generate and transmit transmission information including images, sounds, measurement data, identification information of devices or the like, parameter setting information, control information such as commands, and the like. Further, the transmission information may include a plurality of types of information such as images and sounds, identification information and setting information, and control information.

Further, the terminal device 40 (LPWA transmission terminals 400 and 400B) may be able to generate transmission information including information supplied from another device, for example. For example, the terminal device 40 (LPWA transmission terminals 400 and 400B) may generate and transmit transmission information including information (sensor output) output from various sensors that perform detection, measurement, or the like for arbitrary variables such as an image, light, brightness, saturation, electricity, sound, vibration, acceleration, velocity, angular velocity, force, temperature (not temperature distribution), humidity, distance, area, volume, shape, flow rate, time, period of time, magnetism, chemical substances, or odor, or an amount of change thereof.

That is, the present technology can be applied to, for example, a system that is used for any purposes such as three-dimensional shape measurement, spatial measurement, object observation, moving deformation observation, biological observation, authentication processing, monitoring, autofocus, imaging control, lighting control, tracking processing, input and output control, electronic device control, and actuator control.

Further, the present technology can be applied to systems in any field such as transportation, medical care, crime prevention, agriculture, livestock industry, mining, beauty, factories, home appliances, weather, and nature monitoring. For example, the present technology can also be applied to a system for capturing an image to be used for viewing, which uses a digital camera, a portable device having a camera function, or the like. Further, for example, the present technology can also be applied to systems provided for traffic, such as an in-vehicle system that photographs a front area, rear area, surroundings, inside, and the like of a vehicle for safe driving such as automatic stop, recognition of a driver's condition, or the like, a surveillance camera system that monitors a traveling vehicle or a road, or a distance measurement system that measures a distance between vehicles, for example. Further, for example, the present technology can also be applied to a system provided for security, in which a surveillance camera for the purpose of crime prevention, a camera for the purpose of personal authentication, and the like are used.

Further, for example, the present technology can be applied to a system provided for sports in which various sensors or the like that can be used for the purpose of sports, such as wearable cameras, are used. Further, for example, the present technology can be applied to a system provided for agriculture in which various sensors such as a camera for monitoring a state of fields and crops are used. Further, for example, the present technology can be applied to a system provided for a livestock industry in which various sensors for monitoring a state of livestock such as pigs or cattle are used. Further, the present technology can also be applied to a system that monitor a state of nature such as volcanoes, forests, and oceans, a weather observation system that observes weather, temperature, humidity, wind speed, sunshine time, or the like, or a system that observes an ecology of wildlife such as birds, fishes, reptiles, amphibians, mammals, insects, and plants.

Further, the present technology can also be applied to a position notification system, an anti-theft system, or the like.

Further, specifications of radio signals or information to be transmitted and received are arbitrary. Further, although an example in which the present technology is applied to the server device 10, the base station device 20, the broadcasting station device 30, the terminal device 40, or the communication systems 1 to 4 having devices equivalent to or modified from these has been described above, the present technology can be applied to any transmission device, any reception device, any transmitting and reception device, any communication device, any information processing device, and any system.

8-4. Other Modification Examples

The control device that controls the server device 10, the base station device 20, the broadcasting station device 30, the terminal device 40, the LPWA receiver 200, the control information transmitters 300, 300A, 300B, and the LPWA transmission terminals 400 and 400B of the present embodiment may be realized by a dedicated computer system or a general-purpose computer system.

For example, a communication program for executing the above-described operation (for example, transmission and reception processing) is stored and distributed in a computer-readable recording medium such as an optical disc, a semiconductor memory, a magnetic tape, or a flexible disk. For example, the control device is configured by installing the program in a computer and executing the above-described processing. In this case, the control device may be a device (for example, a personal computer) external to the server device 10, the base station device 20, the broadcasting station device 30, the terminal device 40, the LPWA receiver 200, the control information transmitters 300, 300A, and 300B, and the LPWA transmission terminals 400 and 400B. Further, the control device may be a device (for example, the control unit 13, the control unit 24, the control unit 34, or the control unit 46) internal to the server device 10, the base station device 20, the broadcasting station device 30, the terminal device 40, the LPWA receiver 200, the control information transmitters 300, 300A, and 300B, and the LPWA transmission terminals 400 and 400B.

Further, the above communication program may be stored in a disk device included in a server device on a network such as the Internet so that the communication program can be downloaded to a computer or the like. Further, the above-described functions may be realized by collaboration between an operating system (OS) and application software. In this case, a part other than the OS may be stored in a medium and distributed, or the part other than the OS may be stored in the server device so that the part can be downloaded to a computer or the like.

Further, all or some of the processing described as being automatically performed among the processing described in the above-described embodiment can be manually performed, or all or some of the processing described as being manually performed can be performed automatically using a known method. In addition, the processing procedures, specific names, and information including various types of data or parameters illustrated in the above document or drawings can be arbitrarily changed unless otherwise specified. For example, the various types of information illustrated in each figure is not limited to the illustrated information.

Further, each component of each device illustrated in the figure is a functional concept, and does not necessarily have to be physically configured as illustrated in the figure. That is, specific forms of distribution and integration of the respective devices are not limited to those illustrated in the figure, and all or some thereof can be functionally or physically distributed and integrated in arbitrary units according to various loads or usage situations.

Further, the above-described embodiments can be appropriately combined in an area in which processing content does not contradict each other. Further, an order of the respective steps illustrated in the flowchart of the above-described embodiment can be changed appropriately.

Further, for example, the present embodiment can also be implemented as any configuration constituting a device or a system, such as a processor as a system large scale integration (LSI) or the like, a module using a plurality of processors or the like, a unit using a plurality of modules or the like, a set to which other functions are added to the unit, or the like (that is, a configuration of a part of the device).

In the embodiment, the system means a set of a plurality of components (devices, modules (parts), and the like), and it does not matter whether all the components are in the same housing. Therefore, a plurality of devices housed in separate housings and connected via a network, and one device in which a plurality of modules are housed in one housing are both systems.

Further, for example, the embodiment can have a cloud computing configuration in which one function is shared and jointly processed by a plurality of devices via a network.

9. CONCLUSION

As described above, according to the embodiment of the present disclosure, effective use of wireless resources using broadcast waves can be realized.

Although each embodiment of the present disclosure has been described above, the technical scope of the present disclosure is not limited to each of the above-described embodiments as it is, and various changes can be made without departing from the gist of the present disclosure.

Further, components covering different embodiments and modification examples may be combined appropriately.

Further, the effects in each embodiment described in the present specification are merely examples and are not limited, and other effects may be obtained.

The present technology can also have the following configurations.

(1)

A communication device including:

an acquisition unit configured to acquire first information for communication in which a first frequency band has been used, the first frequency band being an unlicensed band in which a plurality of communication schemes can be mixed, from a second frequency band different from the first frequency band; and a communication control unit configured to control communication in a predetermined communication scheme in which the first frequency band has been used, on the basis of the first information.

(2)

The communication device according to (1), wherein the first information includes timing information that enables timing to be shared with other communication devices that use the first frequency band in a communication scheme different from the predetermined communication scheme, and the communication control unit controls the communication in the predetermined communication scheme in which the first frequency band has been used, on the basis of the timing information.

(3)

The communication device according to (2), wherein the timing information is information broadcast using the second frequency band.

(4)

The communication device according to (3), wherein the timing information is information broadcast from a terrestrial broadcasting station device using the second frequency band, the timing information being virtual satellite transmission information generated by imitating information transmitted from a navigation satellite.

(5)

The communication device according to (4), wherein the virtual satellite transmission information is a virtual pulse per second (PPS) signal imitating a GPS signal transmitted from the navigation satellite, the virtual satellite transmission information being a pulse per second (PPS) signal through decoding.

(6)

The communication device according to (4), wherein the acquisition unit acquires second information for time measurement or timing measurement transmitted from the navigation satellite, and the communication control unit controls communication in a predetermined communication scheme in which the first frequency band has been used, on the basis of any one of the timing information included in the first information, and the second information.

(7)

The communication device according to (6), wherein the communication control unit controls the communication in a predetermined communication scheme in which the first frequency band has been used, on the basis of the second information when a predetermined number of navigation satellites can be captured, and controls the communication in a predetermined communication scheme in which the first frequency band has been used, on the basis of the timing information included in the first information when the predetermined number of navigation satellites cannot be captured.

(8)

The communication device according to any one of (1) to (7), wherein the first information includes control information for instructing the communication device to perform control regarding communication, and the communication control unit controls the communication in a predetermined communication scheme in which the first frequency band has been used, on the basis of the control information.

(9)

The communication device according to (8), wherein the control information includes stop information for stopping radio wave transmission in which the first frequency band of the communication device has been used.

(10)

The communication device according to (8), wherein the control information includes schedule information for scheduling radio wave transmission in which the first frequency band of the communication device has been used.

(11)

The communication device according to (2), wherein the first information includes control information for controlling the communication of the communication device, and the communication control unit controls the communication in a predetermined communication scheme in which the first frequency band has been used, on the basis of the timing information and the control information.

(12)

The communication device according to (11), wherein the second frequency band includes a second band composed of a plurality of bands, and a first band that differs from the second band, the first band having a bandwidth wider than a bandwidth of one of the plurality of bands constituting the second band, and the acquisition unit acquires the first information including the timing information from the first band.

(13)

The communication device according to any one of (1) to (12), wherein the first frequency band is a frequency band in which specific small power-saving radio is possible.

(14)

The communication device according to any one of (1) to (13), wherein the first frequency band is a 920 MHz band.

(15)

The communication device according to any one of (1) to (14), wherein the second frequency band is a VHF-High band.

(16)

The communication device according to any one of (1) to (15), wherein the predetermined communication scheme is a communication scheme for low power wide area (LPWA) communication.

(17)

A communication method including:

acquiring first information for communication in which a first frequency band has been used, the first frequency band being an unlicensed band in which a plurality of communication schemes can be mixed, from a second frequency band different from the first frequency band; and controlling communication in a predetermined communication scheme in which the first frequency band has been used, on the basis of the first information.

(18)
A communication program for causing a computer to function as:
an acquisition unit configured to acquire first information for communication in which a first frequency band has been used, the first frequency band being an unlicensed band in which a plurality of communication schemes can be mixed, from a second frequency band different from the first frequency band; and
a communication control unit configured to control communication in a predetermined communication scheme in which the first frequency band has been used, on the basis of the first information.

(19)
A transmission device including:
an acquisition unit configured to acquire first information used by a communication device performing communication in a predetermined communication scheme in which a first frequency band has been used, the first frequency band being an unlicensed band in which a plurality of communication schemes can be mixed, for control of the communication; and
a transmission unit configured to transmit the first information using a second frequency band different from the first frequency band.

(20)
A communication system including a communication device configured to perform communication in which a first frequency band has been used, the first frequency band being an unlicensed band in which a plurality of communication schemes can be mixed, and a transmission device configured to transmit information to the communication device,
wherein the transmission device includes
a transmission unit configured to transmit first information used by the communication device for control of communication in a predetermined communication scheme in which the first frequency band has been used, using a second frequency band different from the first frequency band, and
the communication device includes
an acquisition unit configured to acquire the first information from the second frequency band, and
a communication control unit configured to control communication in a predetermined communication scheme in which the first frequency band has been used, on the basis of the first information.

REFERENCE SIGNS LIST 1, 2, 3, 4 Communication system
10 Server device
20 Base station device
30 Broadcasting station device
40 Terminal device
11 Communication unit
12, 22, 32, 43 Storage unit
13, 24, 34, 46 Control unit
21, 41 Wireless communication unit
23, 33, 44 Network communication unit
31 Signal processing unit
35, 42 Satellite reception unit
45 Input and output unit
341, 461 Acquisition unit
342 Transmission unit
462 Communication control unit
31a, 31b, 31c, 31d Virtual satellite module
41a, 42a Front end
41b Up converter
42c Down converter
41d Sub-channel demodulator
41e LPWA transmitter
46b AB selector
200 LPWA receiver
300, 300A, 300B Control information transmitter
400, 400B LPWA transmission terminal
310 Virtual satellite signal creation means

The invention claimed is:
1. A communication device comprising:
an acquisition circuit configured to acquire first information for communication in which a first frequency band has been used, the first frequency band being an unlicensed band in which a plurality of communication schemes can be mixed, from a second frequency band different from the first frequency band; and
a communication control circuit configured to control communication in a predetermined communication scheme in which the first frequency band has been used, on the basis of the first information,
wherein the first information includes timing information that enables timings to be shared with other communication devices that use the first frequency band in a communication scheme different from the predetermined communication scheme,
wherein the communication control circuit controls the communication in the predetermined communication scheme in which the first frequency band has been used, on the basis of the timing information,
wherein the timing information is information broadcast using the second frequency band, and
wherein the timing information is information broadcast from a terrestrial broadcasting station device using the second frequency band, the timing information being virtual satellite transmission information generated by imitating information transmitted from a navigation satellite.
2. The communication device according to claim 1, wherein the virtual satellite transmission information is a virtual pulse per second (PPS) signal imitating a PPS signal transmitted from the navigation satellite, the virtual satellite transmission information being a pulse per second (PPS) signal through decoding.
3. The communication device according to claim 1,
wherein the acquisition circuit acquires second information for time measurement or timing measurement transmitted from the navigation satellite, and
the communication control circuit controls communication in a predetermined communication scheme in which the first frequency band has been used, on the basis of any one of the timing information included in the first information, and the second information.
4. The communication device according to claim 3, wherein the communication control circuit
controls the communication in a predetermined communication scheme in which the first frequency band has been used, on the basis of the second information when a predetermined number of navigation satellites can be captured, and
controls the communication in a predetermined communication scheme in which the first frequency band has been used, on the basis of the timing information included in the first information when the predetermined number of navigation satellites cannot be captured.

5. The communication device according to claim 1,
wherein the first information includes control information for instructing the communication device to perform control regarding communication, and
the communication control circuit controls the communication in a predetermined communication scheme in which the first frequency band has been used, on the basis of the control information.

6. The communication device according to claim 5, wherein the control information includes stop information for stopping radio wave transmission in which the first frequency band of the communication device has been used.

7. The communication device according to claim 5, wherein the control information includes schedule information for scheduling radio wave transmission in which the first frequency band of the communication device has been used.

8. The communication device according to claim 1,
wherein the first information includes control information for controlling the communication of the communication device, and
the communication control circuit controls the communication in a predetermined communication scheme in which the first frequency band has been used, on the basis of the timing information and the control information.

9. The communication device according to claim 8,
wherein the second frequency band includes a second band composed of a plurality of bands, and a first band that differs from the second band, the first band having a bandwidth wider than a bandwidth of one of the plurality of bands constituting the second band, and
the acquisition circuit acquires the first information including the timing information from the first band.

10. The communication device according to claim 1, wherein the first frequency band is a frequency band in which specific small power-saving radio is possible.

11. The communication device according to claim 1, wherein the first frequency band is a 920 MHz band.

12. The communication device according to claim 1, wherein the second frequency band is a VHF-High band.

13. The communication device according to claim 1, wherein the predetermined communication scheme is a communication scheme for low power wide area (LPWA) communication.

14. A communication method comprising:
acquiring first information for communication in which a first frequency band has been used, the first frequency band being an unlicensed band in which a plurality of communication schemes can be mixed, from a second frequency band different from the first frequency band; and
controlling communication in a predetermined communication scheme in which the first frequency band has been used, on the basis of the first information,
wherein the first information includes timing information that enables timings to be shared with other communication devices that use the first frequency band in a communication scheme different from the predetermined communication scheme,
wherein the communication method further includes controlling the communication in the predetermined communication scheme in which the first frequency band has been used, on the basis of the timing information,
wherein the timing information is information broadcast using the second frequency band, and
wherein the timing information is information broadcast from a terrestrial broadcasting station device using the second frequency band, the timing information being virtual satellite transmission information generated by imitating information transmitted from a navigation satellite.

15. A non-transitory communication product containing a program for causing a computer to function as:
an acquisition circuit configured to acquire first information for communication in which a first frequency band has been used, the first frequency band being an unlicensed band in which a plurality of communication schemes can be mixed, from a second frequency band different from the first frequency band; and
a communication control circuit configured to control communication in a predetermined communication scheme in which the first frequency band has been used, on the basis of the first information,
wherein the first information includes timing information that enables timings to be shared with other communication devices that use the first frequency band in a communication scheme different from the predetermined communication scheme,
wherein the communication control circuit controls the communication in the predetermined communication scheme in which the first frequency band has been used, on the basis of the timing information,
wherein the timing information is information broadcast using the second frequency band, and
wherein the timing information is information broadcast from a terrestrial broadcasting station device using the second frequency band, the timing information being virtual satellite transmission information generated by imitating information transmitted from a navigation satellite.

* * * * *